United States Patent [19]

Kanamori et al.

[11] Patent Number: 5,005,957
[45] Date of Patent: Apr. 9, 1991

[54] OBJECTIVE LENS SYSTEM FOR ENDOSCOPES

[75] Inventors: Iwao Kanamori, tokyo; Minoru Okabe, Kanagawa, both of Japan

[73] Assignee: Olympus Optical Co., Ltd., Tokyo, Japan

[21] Appl. No.: 403,480

[22] Filed: Sep. 6, 1989

[30] Foreign Application Priority Data

Sep. 7, 1988 [JP] Japan ................. 63-222215
Oct. 18, 1988 [JP] Japan ................. 63-262117
Apr. 10, 1989 [JP] Japan ................. 1-88115

[51] Int. Cl.$^5$ .................. G02B 13/18; G02B 21/02
[52] U.S. Cl. .................. 350/432; 350/414; 350/415
[58] Field of Search ................. 350/432–435, 350/415, 414

[56] References Cited

U.S. PATENT DOCUMENTS 4,662,725 5/1987 Nisioka ................. 350/432
4,674,844 6/1987 Nishioka et al. ........ 350/432 X
4,806,001 2/1989 Okabe et al. ........... 350/432

FOREIGN PATENT DOCUMENTS 59-226315 12/1984 Japan .

Primary Examiner—Scott J. Sugarman
Attorney, Agent, or Firm—Cushman, Darby & Cushman

[57] ABSTRACT

An objective lens system for endoscopes comprising, in the order from the object side, a first lens unit having negative refractive power and a second lens unit having positive refractive power, said first lens unit comprising a surface which is concave on the image side and satisfies the following condition (1), and an aspherical surface which is arranged on the object side and satisfies the following condition (2) at 50% or more of the effective area thereof.

$$|R_1| \leq 3f \quad (1)$$

$$\left| \frac{K_I - K_{0.5}}{K_{0.5}} \right| < |\cos \omega_1 - \cos \omega_{0.5}| \quad (2)$$

18 Claims, 45 Drawing Sheets

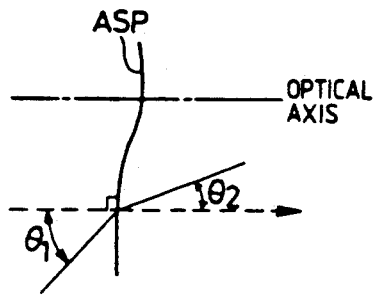
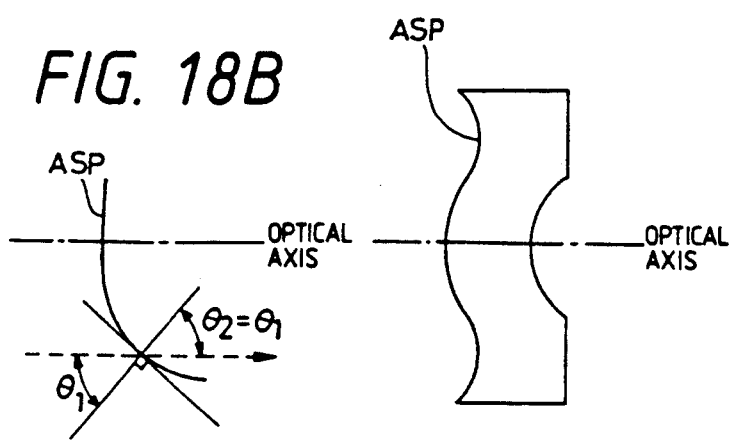
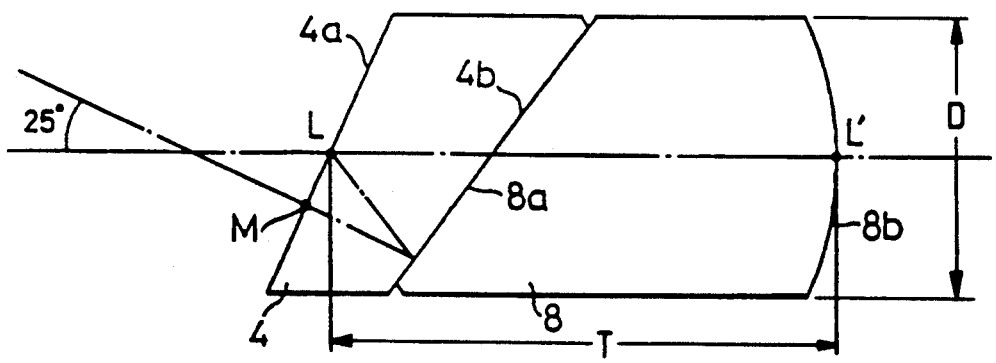
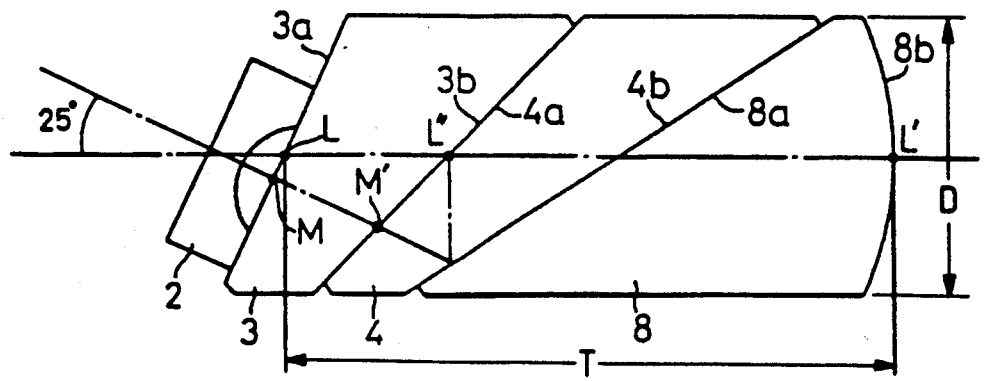

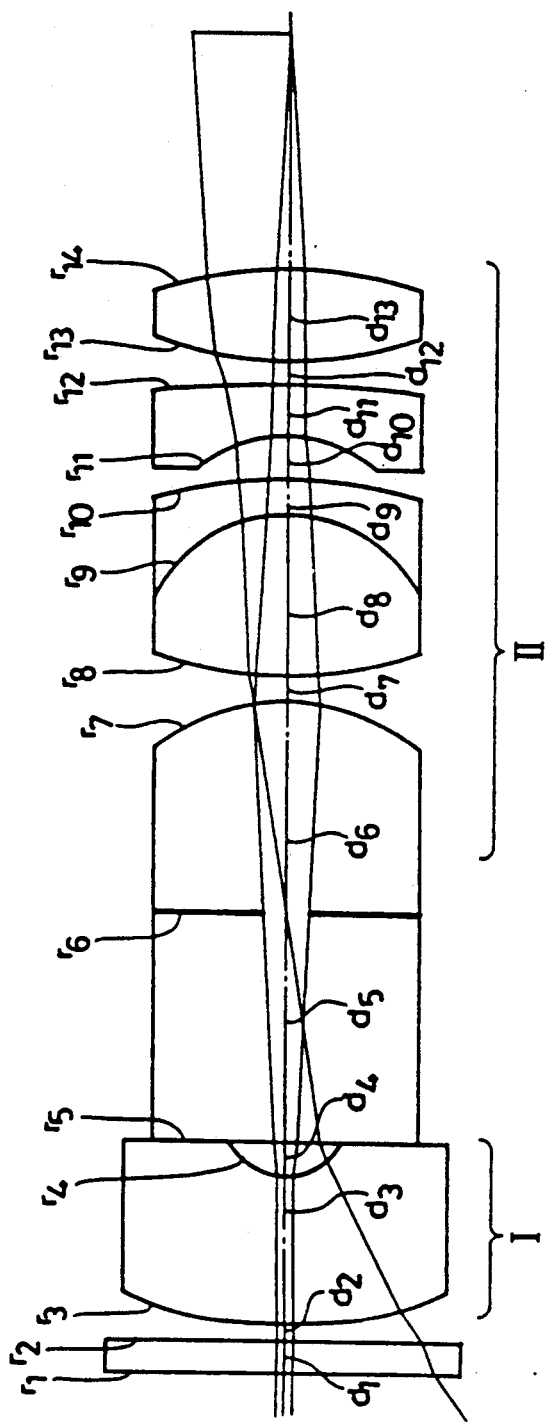
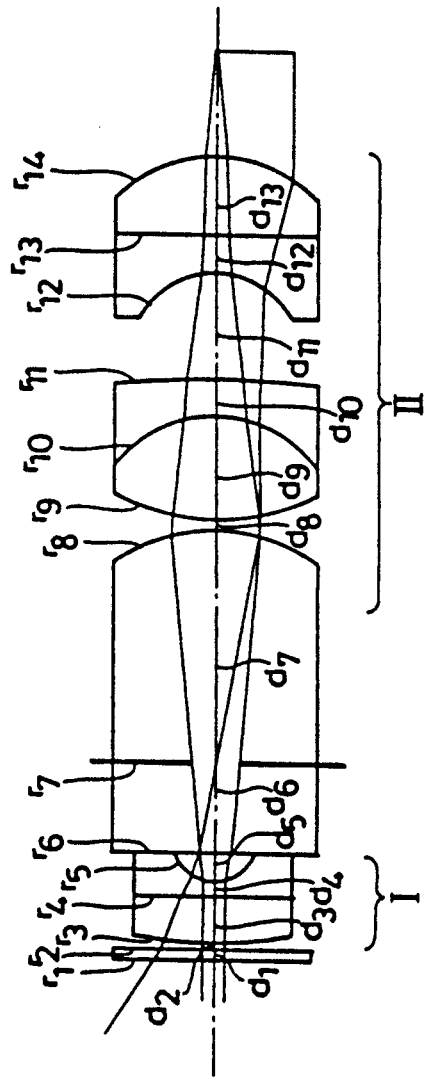
FIG. 26
FIG. 27

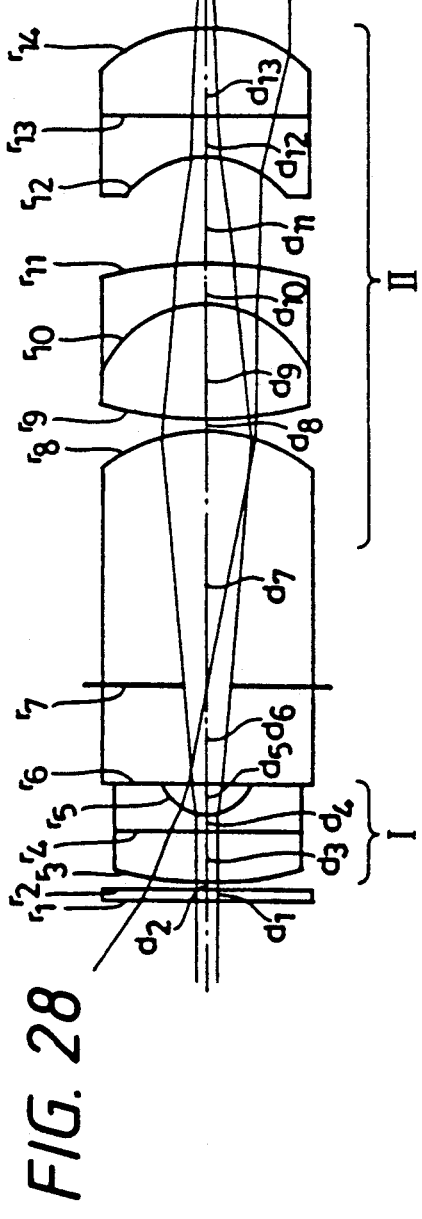
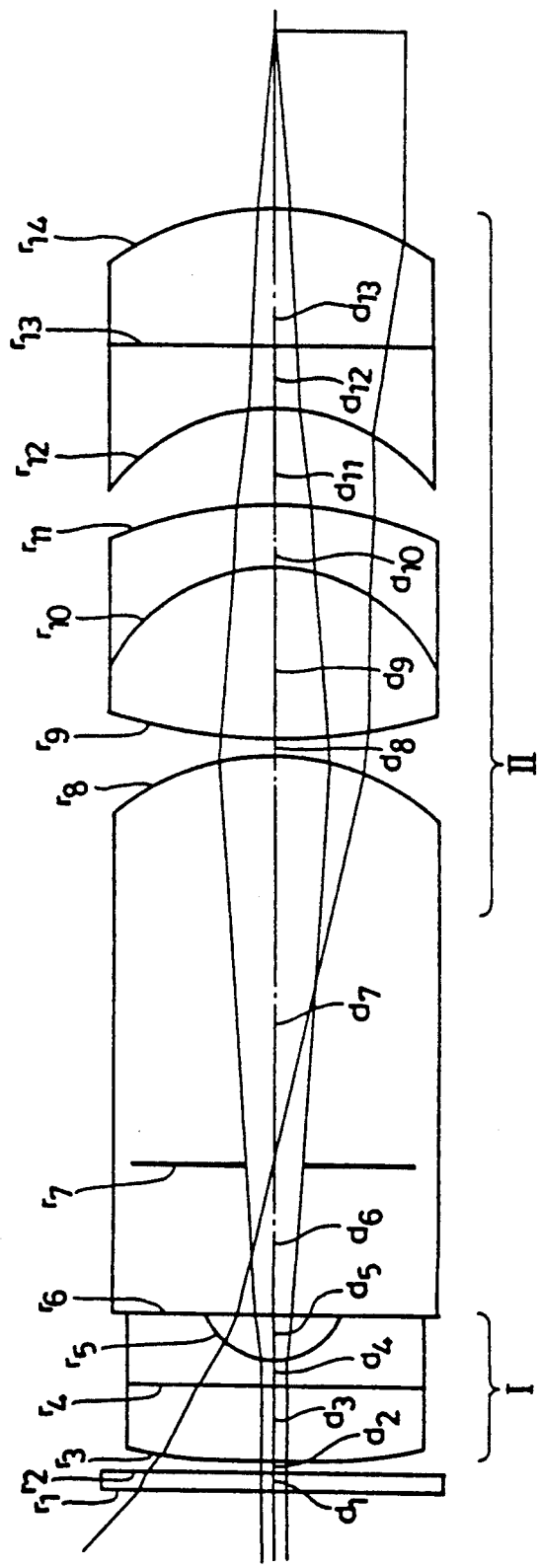
FIG. 28
FIG. 29

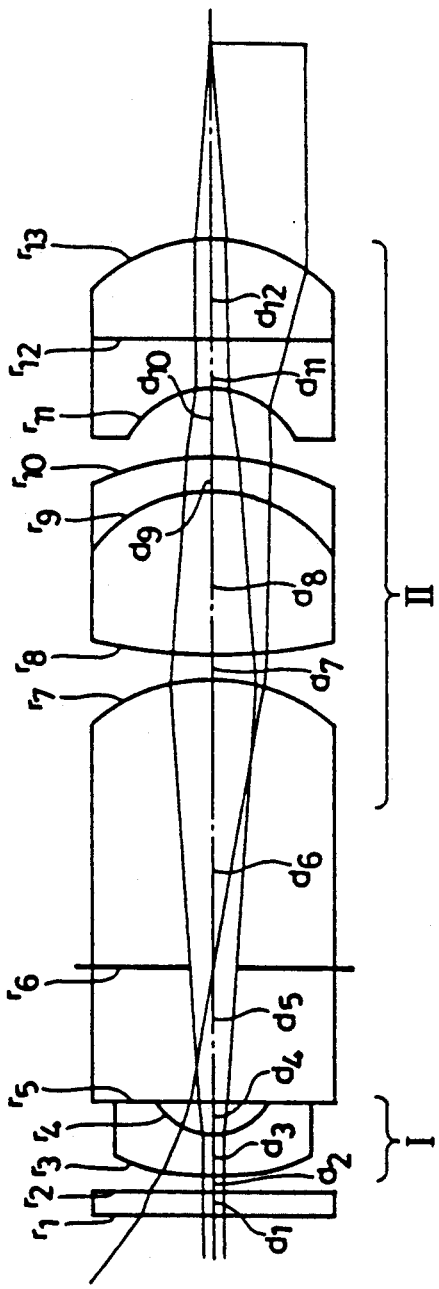
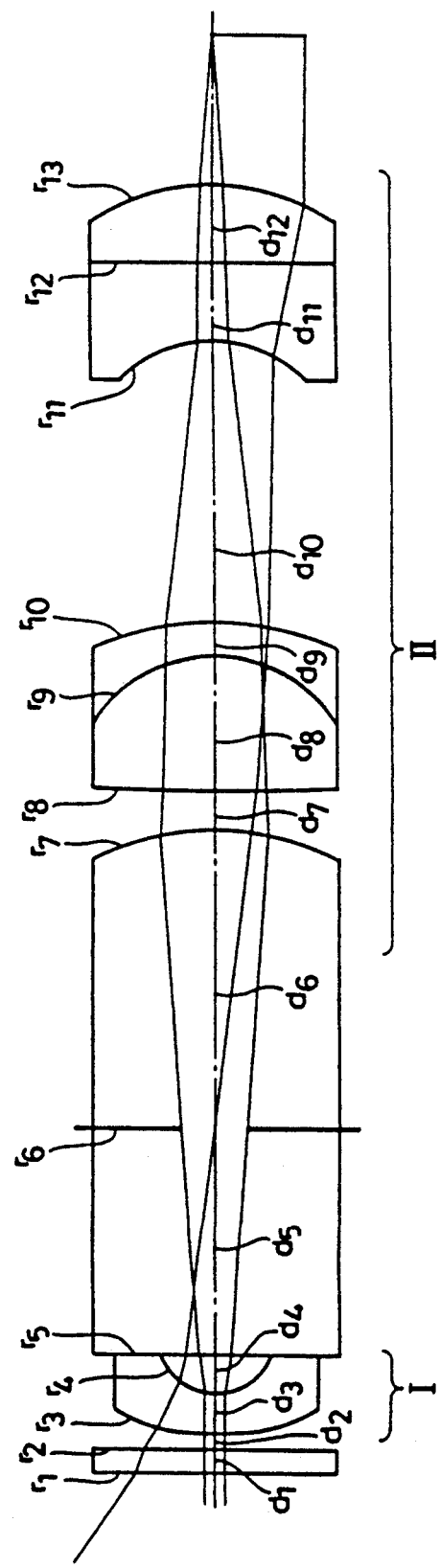
FIG. 32
FIG. 33

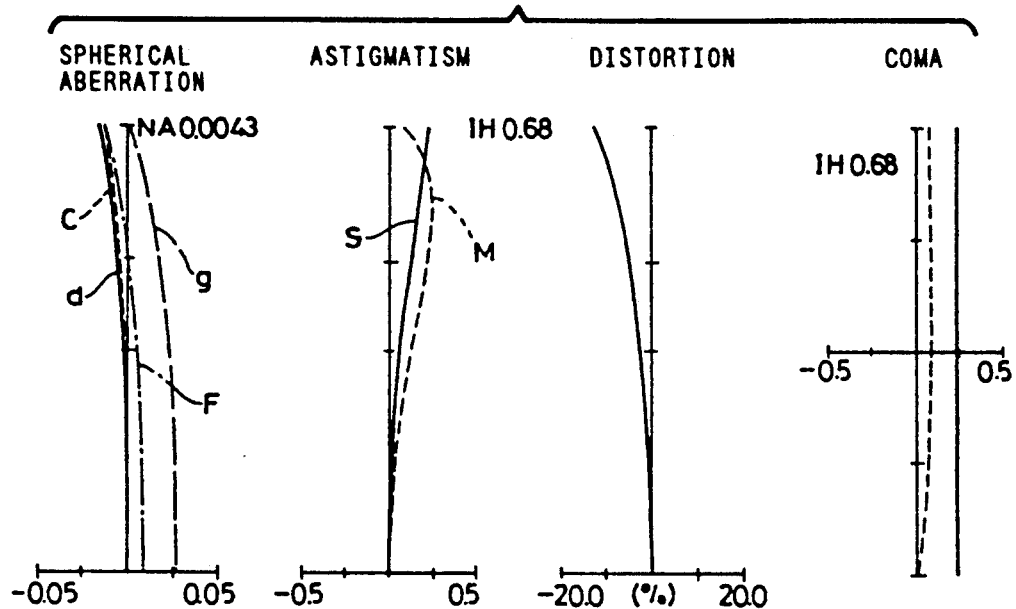
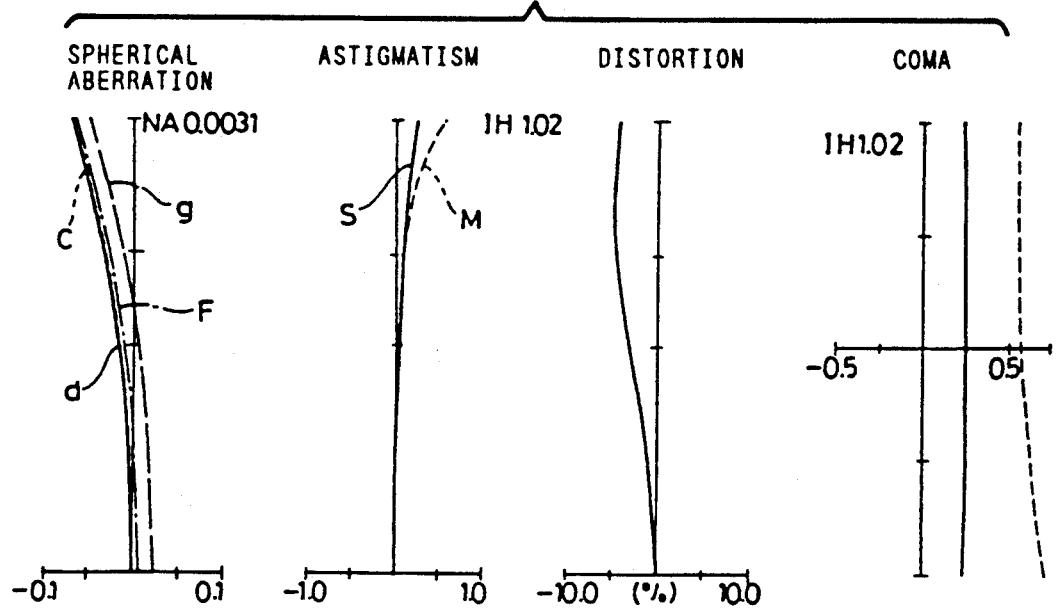

OBJECTIVE LENS SYSTEM FOR ENDOSCOPES

BACKGROUND OF THE INVENTION (a) Field of the Invention

The present invention relates to an objective lens system for endoscopes having favorably corrected aberrations, especially distortion.

(b) Description of the Prior Art

As one of the conventional objective lens systems for endoscopes, there is known the retrofocus type of lens system illustrated in FIG. 1.

The retrofocus type objective lens system for endoscopes comprises a lens unit $L_1$ having negative refractive power on the object side of an aperture stop S and a lens unit $L_2$ having total positive refractive power on the image side of the aperture stop. The lens unit $L_1$ has the negative refractive power for widening field angle of the objective lens system and the lens unit $L_2$ has an imaging function, thereby composing a telecentric optical system having the characteristics of the objective lens system for endoscopes to have a large visual field angle and to allow the principal ray P to be perpendicularly incident on the image surface regardless of image height.

The reason for the objective lens system for endoscopes to have the telecentric characteristics is that the angle of incidence is limited for the rays capable of falling on the end surface of an image guide composed of an optical fiber bundle, a solid-state image pickup device such as CCD or a relay lens system having entrance pupil thereof located at infinite distance when such a member is arranged on the image surface of the objective lens system. In other words, transmission efficiency is lowered and images are darkened when the principal ray emerging from the objective lens system falls obliquely on the image surface.

Further, the objective lens system for endoscopes having the above-described composition can easily be assembled and manufactured at a low cost though the lens system has a small diameter of several millimeter since the outside diameters of the lens units $L_1$ and $L_2$ are nearly equal to that of the image guide though the lens system has a large field angle, and the lens system is compact and comprises a small number of lens elements.

Illustrated in FIG. 2 is another conventional example of objective lens system for endoscopes disclosed by Japanese Unexamined Published Patent Application No. 226315/59.

This retrofocus type objective lens system for endoscopes comprises a lens unit $L_1'$ having negative refractive power on the object side of a pupil position S and a lens unit $L_2'$ on the image side of the pupil position S, and has a composition similar to that of the objective lens system shown in FIG. 1. Though the pupil is located with the lens unit $L_2'$, no inconvenience is caused by making discussion on an assumption that the lens unit $L_2'$ is located as a whole on the image side of the pupil S since the lens unit $L_2''$ arranged on the extremely object side in the lens unit $L_2'$ is composed of a plano-convex lens component having a plane surface on the side of incidence. However, the objective lens system shown in FIG. 2 uses, in the vicinity of the pupil S, a bar-shaped lens component $L_2''$ which is longer in the direction along the optical axis than the diameter thereof.

Endoscopes are classified into flexible endoscopes which can be flexed freely and non-flexible endoscopes which cannot be flexed. The flexible endoscopes permit freely changing direction of visual field for observation, whereas the non-flexible endoscopes allows observation only in a certain definite direction and the forward viewing objective lens system shown in FIG. 1 permits observing objects located only in the front direction. Therefore, side viewing, oblique viewing and backward viewing objective lens systems are separately necessary to observe objects located in different directions through the non-flexible endoscopes.

In contrast, the objective lens system shown in FIG. 2 enables to observe objects located in different directions by using, in the bar-shaped lens component $L_2''$, various types of field direction changing prisms such as shown in FIG. 3A, FIG. 3B and FIG. 3C.

In the objective lens system shown in FIG. 2, it is practically difficult to arrange an aperture stop having a light-shielding function at the pupil position S since it is to be located in the lens component $L_2'$.

FIG. 4 shows an optical system which is composed of the objective lens system shown in FIG. 2 combined with relay lens systems. In this optical system, an image of an object $O_1$ formed by the objective lens system is transmitted sequentially as $O_2$, $O_3$ and $O_4$ through relay lens systems $R_1$, $R_2$, $R_3$, . . . , and position of the pupil determining brightness is also transmitted simultaneously. Though S corresponds to the pupil position in the objective lens system, $S_1$, $S_2$ and $S_3$ correspond to pupil positions in the relay lens systems, and diameter of the relay lens systems is equal to that of the pupils $S_1$, $S_2$ and $S_3$ in most cases. For this reason, brightness of optical system is determined almost by outside diameter of the relay lens systems and it is not always necessary to arrange an aperture stops having the light-shielding effect at the pupil position S of the objective lens system.

When inclination angle relative to the optical axis $\theta$ of the principal ray P incident on the lens unit $L_1$ ($L_1'$) located on the object side of the aperture stop is compared with inclination angle relative to the optical axis $\theta'$ of the principal ray P emerging from the lens unit $L_1$ ($L_1'$) and incident on the lens unit $L_2$ ($L_2'$) arranged on the image side of the aperture stop in the objective lens systems shown in FIG. 1 and FIG. 2, $\theta'$ is far smaller than $\theta$. This is because the lens unit $L_1$ has negative refractive function for widening the visual field angle.

In such objective lens systems, there is established the following relationship between the small angle $\theta'$ and aberrations. Speaking concretely, curvature of field, astigmatism and distortion are produced in small quantities in Seidel's aberrations, whereas spherical aberration and coma are produced in relatively large quantities. This relationship is visualized in FIG. 6. Accordingly, it is sufficient to design the lens unit $L_2$ having positive refractive power in such a manner that it forms an image having spherical aberration and coma corrected on an assumption that the pupil S located between the lens unit $L_1$ and the lens unit $L_2$ is an object. The sine condition is known as the requirement for designing a lens unit for forming such an image. When image height is represented by I, focal length of the lens unit $L_2$ is designated by $f_2$ and the inclination angle relative to the optical axis of the principal ray P is denoted $\theta'$, the sine condition for the telecentric optical system wherein the principal ray P is incident perpendicularly on the image surface I can be expressed by the following formula:

$$I = f_2 \sin \theta'$$

Further, for the lens unit $L_1$, the sine condition is satisfied to a certain degree also on the front side of the aperture stop when the lens unit $L_1$ is composed of a single spherical lens element as shown in FIG. 7. Accordingly we obtain the following relationship:

$$I = f \sin \theta$$

wherein the reference symbol f represents focal length of the objective lens system as a whole and the reference symbol $\theta$ designates inclination angle relative to the optical axis of the principal ray P incident on the lens unit $L_1$.

Almost all the objective lens system for endoscopes which are used currently satisfy the abovementioned sine condition since the lens systems have small outside diameters and comprise small numbers of lens elements.

When the above-mentioned sine condition is satisfied, distortion is aggravated abruptly as field angle $\theta$ is enlarged as shown in FIG. 6. Relationship between distortion and field angle $\theta$ can be expressed by the following formula:

$$DT(\theta) = (\cos \theta - 1) \times 100 \ (\%)$$

wherein the reference symbol DT represents distortion which is given by the following formula:

$$DT = \frac{(y - y_0)}{y_0} \times 100 (\%)$$

wherein the reference symbol y represents size of an image deformed by distortion and the reference symbol $y_0$ designates size of an ideal image calculated by the paraxial theory.

When the sine condition is satisfied and distortion has the above-mentioned relationship with the inclination angle $\theta$, negative distortion (barrel-shaped distortion) is aggravated abruptly as the inclination angle $\theta$ is enlarged.

The conventional objective lens system for endoscopes shown in FIG. 2, for example, has the following sine condition:

$$I = 0.91$$

$$f \sin \theta = 1.27 \times \sin 45° = 0.898$$

Further, the above-mentioned objective lens system for endoscopes has distortion expressed below:

$$DT \ (\omega_1 = 45°) = -30\%$$

$$(\cos 45° - 1) \times 100 = -29.3\%$$

Further, in an objective lens system almost satisfying the sine condition of $I = f \sin \theta$ (hereinafter referred to as an objective lens system of $I = f \sin \theta$ type), $DT(\theta)$ has the values listed below at various values of $\theta$:

| Field angle ($2\theta$) | 40° | 60° | 80° | 100° | 120° | 140° |
|---|---|---|---|---|---|---|
| Distortion ($DT(\theta)$) | −6 | −13.5 | −23 | −36 | −50 | −66 (%) |

FIG. 8 and FIG. 9 exemplify how images affected by distortion actually look like. FIG. 9 visualized images of the lattice patterns arranged vertically and horizontally at equal intervals on a plane perpendicular to the optical axis shown in FIG. 8 which are formed by using objective lens systems having DT's of 0% to 30% at the maximum image height.

As is understood from the foregoing description, the conventional objective lens systems have remarkable negative distortion though the lens systems have wide field angles which are indispensable for these objective lens systems for endoscopes, are designed as telecentric lens systems, and satisfy the requirements of favorably corrected aberrations and compact design.

The objective lens systems for endoscopes having distortion form images of marginal portions of an object which are smaller and more distorted than the images of central portions. Accordingly, it is impossible to measure or analyze shapes accurately by applying the objective lens system having distortion to inspection of industrial products, or erroneous diagnoses may be made by using such objective lens system in the field of medicine.

Further, in a wide-angle photographic lens system having little distortion and a wide angle as shown in FIG. 10, for example, the following relationship establishes:

$$I = f \tan \theta$$

In an objective lens system satisfying the abovementioned relationship, light quantity reduces on the image surface thereof at a rate of $\cos^4 \theta$ as $\theta$ has larger values. In the conventional objective lens system for endoscopes having the remarkable negative distortion, on the other hand, images of the marginal portions are smaller than those of the central portions when portions of the same size over the entire range from the center to the marginal areas are observed, and the reduction of the image size cancels the reduction of light quantity at the rate of $\cos^4 \theta$. Accordingly, in the objective lens systems satisfying the relationship of $I = f \sin \theta$, brightness is not reduced as inclination angle $\theta$ is enlarged but uniform over the entire range from the center to the marginal areas. In other words, the objective lens systems for endoscopes satisfying the sine condition have the above-described defect due to the distortion though such lens system can provide uniform brightness.

Furthermore, it is possible to compose oblique viewing, side viewing and backward viewing objective lens systems for endoscopes by combining the objective lens systems for endoscopes with the field direction changing prisms shown in FIG. 3A, FIG. 3B and FIG. 3C as already described.

When the field direction changing prisms are arranged at positions slightly deviated, however, these prisms adversely affect images formed by the objective lens systems.

A field direction changing optical system for oblique viewing is exemplified in FIG. 11 wherein a correcting prism 2 is arranged before a field direction changing prism 1 for correcting astigmatism. In addition, the negative lens unit $L_1$ is arranged on the object side of the correcting prism 2.

In this field direction changing optical system, the center of the light bundle emerging from the exit surface 1a of the prism 1 shown in FIG. 11 is deviated from the optical axis of the lens unit $L_2$ due to deviation of arrangement location of the prism caused at the stage of assembly and/or manufacturing error of the prism shape. When the center of the emerging light bundle is deviated from the optical axis of the lens unit $L_2$ as described above, the light l which is to travel in alignment with the optical axis of the lens unit $L_2$ is incident on the lens unit $L_1$ at an angle of $\theta$ relative to the optical axis of the lens unit $L_1$, thereby degrading image quality. Further, image quality is degraded also when the prism 1 is arranged in a position inclined relative to the lens unit $L_2$.

SUMMARY OF THE INVENTION

A primary object of the present invention is to provide an objective lens system for endoscopes having a large field angle and distortion sufficiently corrected, and forming images whose brightness is uniform over the entire range from the center thereof to the marginal portions thereof.

Another object of the present invention is to provide an objective lens system for endoscopes comprising a field direction changing optical system arranged between the lens units composing the objective lens system.

A third object of the present invention is to provide an objective lens system having such a composition as to facilitate to arrange the field direction changing optical system with little eccentricity relative to the optical axis.

The objective lens system for endoscopes according to the present invention has the composition illustrated, for example, in FIG. 3, comprises, in the order from the object side, a first lens unit $L_1$ which comprises a negative lens component having a concave surface on the image side and has negative refractive power, and a second lens unit $L_2$ which has positive refractive power, and is so designed in such a manner that the image side surface of said negative lens component satisfies the following condition (1):

$$|R_1| \leq 3f \tag{1}$$

wherein the reference symbol f represents focal length of the objective lens system as a whole and the reference symbol $R_1$ designates radius of curvature on said concave surface.

If $|R_1|$ has a value large enough to exceed the range defined by the condition (1), it will be necessary to increase the number of the surfaces having negative refractive powers in the first lens unit $L_1$ for obtaining a large visual field, thereby enlarging outside diameter of the objective lens system. When the objective lens system has such a large diameter, the lens machining and assembly works for arranging the lens units within a space having an outside diameter of at most several millimeters of endoscopes will become tedious, thereby enhancing manufacturing cost of the objective lens system. Further, it will be impossible to obtain performance of the objective lens system sufficient for practical use due to variations of individual component members which are used in an increased number and to reserve a space for arranging the field direction changing prism, thereby making the objective lens system unsuited for use with endoscopes.

Further, the objective lens system for endoscopes according to the present invention comprises, as at least one of the object side surfaces of the first lens unit $L_1$, at least one aspherical surface satisfying the following condition (2) at 50% or more of the effective area of the lens surface determined by the light bundle having the maximum image height, i.e., the area of the lens surface indicated by ES in FIG. 17:

$$\left| \frac{K_I - K_{0.5}}{K_{0.5}} \right| < |\cos \omega_I - \cos \omega_{0.5}| \tag{2}$$

wherein the reference symbols $\omega_I$ and $\omega_{0.5}$ represent field angles at an image height of I and $\frac{1}{2}$ of the maximum image height respectively, the reference symbol $K_I$ designates, when K is defined as $K = \sin \theta_2 / \tan \theta_1$, value of K at the image height I, the reference symbol $K_{0.5}$ denotes value of K at $\frac{1}{2}$ of the maximum image height, the reference symbol $\theta_1$ represents angle formed between the optical axis and the principal ray incident from the object side on the aspherical surface arranged on the extremely object side, and the reference symbol $\theta_2$ designates angle formed between the optical axis and the principal ray immediately after said ray is refracted by the aspherical surface located on the extremely image side.

When the objective lens system for endoscopes according to the present invention comprises only one aspherical surface, however, the reference symbol $\theta_1$ represents angle formed between the optical axis and the principal ray incident on said aspherical surface, and the reference symbol $\theta_2$ designates angle formed between the optical axis and the principal ray refracted by said aspherical surface.

In order to accomplish the above-mentioned objects, the objective lens system according to the present invention is so designed as to satisfy the following formulae (i) and (ii) in FIG. 13:

$$I = f_2 \sin \theta_3 \tag{i}$$

$$I = f \tan \theta_1 \tag{ii}$$

wherein the reference symbol f represents focal length of the objective lens system as a whole, the reference symbol $ef_2$ designates total focal length of the second lens unit $L_2$ and the reference symbol $\theta_3$ denotes angle formed between the optical axis and the principal ray incident on the second lens unit $L_2$.

The formula (i) is a condition necessary for favorably correcting spherical aberration, coma and so on, and satisfied by a lens system wherein the second lens unit $L_2$ has positive refractive power. When angle $\theta_3$ is enlarged in the second lens unit $L_2$, distortion is produced but poses no problem since the angle $\theta_3$ is small. Further, the lens system satisfying the formula (i) can provide uniform brightness over the entire range from the center to marginal portions of an image regardless of enlargement of the angle $\theta_3$. The formula (ii) is satisfied by an optical system free from distortion. Accordingly, the objective lens system for endoscopes according to the present invention is so designed, unlike the conventional objective lens systems satisfying $I = f \sin \theta_1$, as to correct distortion and provide an image having uniform brightness over the entire range from the center to the marginal portions thereof by modifying composition of the optical system in such a manner that $I = f \tan \theta_1$ for the objective lens system as a whole is satisfied by the first lens unit $L_1$ while satisfying the sine condition for the second lens unit $L_2$.

In case of a lens system for which outside diameter thereof and number of lens components therein are limited like an objective lens system for endoscopes, it is necessary to use at least one aspherical surface for modifying the first lens unit $L_1$ as described above.

Now, description will be made on the aspherical surface to be used for this purpose.

When attention is paid to the principal ray P at an optional image height in FIG. 13, I and $\theta_1$ must satisfy the formula (ii) on the object side of the aspherical surface ASP. For I and $\theta_2$ of the principal ray immediately after emerging from the aspherical surface ASP, on the other hand, the following formula (iii) establishes since the second lens unit $L_2$ satisfies the sine condition:

$$I \propto f \sin \theta_2 \tag{iii}$$

In order to correct distortion not only at an optional image height but also over the entire range from the center to the marginal portions of an image, the above-mentioned formulae (i) and (iii) must establish for the rays at all the image heights. From the formulae (i) and (iii), the following formula (iv) can be obtained:

$$f \tan \theta_1 \propto f \sin \theta_2$$
$$\sin \theta_2 / \tan \theta_1 = K \tag{iv}$$

That is to say, K must be constant in the formula (iv) for correcting distortion at all the image heights.

Let us assume here that K varies in the formula (iv). Relationship between the principal ray and the aspherical surface ASP is visualized in FIG. 14A and FIG. 14B. In these drawings, the angle $\theta_2$ is equal on both the aspherical surface having a large value of K shown in FIG. 14A and the aspherical surface having a small value of K shown in FIG. 14B.

When the principal ray P is assumed to be at an optional image height in FIG. 14A and FIG. 14B respectively, positive distortion is produced by the principal ray travelling to the area at which value of K is enlarged from the center of an image toward the marginal portion thereof. In contrast, negative distortion is produced by the principal ray to the area at which value of K becomes smaller from the center of an image toward the marginal portion thereof. That is to say, positive distortion is produced at the area at which value of K increases toward the marginal portion of an image, whereas negative distortion is produced at the area at which value of K decrease toward the marginal portion of an image. Relationship between value of K and nature of distortion produced at that value of K is summarized as the following (a) through (d):

$$K_0 > K_{0.5} > K_1 \tag{a}$$

$$K_0 < K_{0.5} < K_1 \tag{b}$$

$$K_0 < K_{0.5} > K_1 \tag{c}$$

$$K_0 > K_{0.5} < K_1 \tag{d}$$

wherein the reference symbol $K_0$ represents value of K at a location of image height 0, the reference symbol $K_{0.5}$ designates value of K at location of ½ of the maximum image height and the reference symbol $K_1$ denotes value of K at a location of the maximum image height.

When $K_0$, $K_{0.5}$ and $K_1$ are in the relationship summarized in (a) through (d) above, images look like as illustrated in FIG. 15A, FIG. 15B, FIG. 15C and FIG. 15D respectively.

In most cases where objects are observed through endoscopes, the surfaces thereof are rarely planes perfectly, but are mostly concave, convex or tubular. Therefore, it is not always necessary that value of K is constant over the entire range from the center of an image to marginal portion thereof, and variations as summarized in (a) through (d) may be desirable for practical use.

When the conventional objective lens system for endoscopes is considered as illustrated in FIG. 13, the following formulae (v) and (vi) establish:

$$I = f \sin \theta_1 \tag{v}$$

$$I = f_2 \sin \theta_3 \tag{vi}$$

On the other hand, the following formulae (vii) and (i) establish for an optical system having aberrations corrected at all image heights:

$$I = f \tan \theta_1 \tag{vii}$$

$$I = f_2 \sin \theta_2 \tag{i}$$

In the similar way as that described above, it is possible to express K' as $K' = \sin \theta_3 / \sin \theta_1$ from the formulae (v) and (vi), and K as $K = \sin \theta_3 / \tan \theta_1$. Since K and K' can be expressed in the same form of $f_1/f_2$, it is possible to express difference between K' of the conventional optical system and K of an optical system having corrected aberrations in the following form of a ratio between K' and K:

$$K'/K = \sin \theta_1 / \tan \theta_1 = \cos \theta_1$$

This means that value of K varies at a rate of $\cos \theta_1$ in the conventional objective lens systems for endoscopes. When value of K at the center of an image is represented by $K_0$, it is therefore possible to express the value of K at a field angle of $\theta_1$ as follows:

$$K_0 \times \cos \theta_1 \tag{viii}$$

Accordingly, in order to reduce distortion over the range from the center of image to the marginal portion thereof, for example, it is necessary that difference $\Delta k_{0-1}$ in value of K between the center of an image and the marginal portion thereof satisfies the following relationship:

$$\Delta K_{0-1} < K_0 (1 - \cos \omega_1)$$

wherein the reference symbol $\omega_1$ represents field angle at the maximum image height.

However, the objective lens system satisfying the sine condition tends to aggravate distortion abruptly toward the marginal portion of an image as is seen from FIG. 9 and the aberration characteristics (FIG. 51) of the conventional optical system illustrated in FIG. 4. Accordingly, deformation of an image due to distortion is sufficiently little within the range up to ½ of the maximum image height. It is therefore sufficient to select the range from ½ of the maximum image height to the marginal portion of an image as the range for correcting distortion, and correction of distortion is important within this range.

In view the fact described above, it is sufficient to satisfy the above-mentioned condition (2) for correcting distortion sufficiently favorably. If the condition (2) is not satisfied, distortion will be produced, thereby making the objective lens system for endoscopes unsuited for industrial or medical use.

For the aspherical surface adopted for satisfying the condition (2), it is sufficient to satisfy the condition (2) at least 50% of the effective surface area determined depending on the light bundle having the maximum image height. When the condition (2) is satisfied at an effective surface area less than 50%, the objective lens system will be undesirable because distortion is corrected only at narrow area.

When the maximum image height is represented by $I_{max}$ and height of principal ray on the first surface to attain to the maximum image height is designated by $h_1$ in the objective lens system for endoscopes according to the present invention, it is desirable to design the lens system so as to satisfy the following condition (3):

$$h_1/I_{max} \leq 2 \qquad (3)$$

FIG. 16 shows a sectional view of the objective lens system for endoscopes according to the present invention which is to be used in a non-flexible endoscope and comprises an oblique viewing prism. In this drawing, the reference symbol C represents a cover glass, and the non-flexible endoscope contains an objective lens system which comprises a first lens unit $L_1$ consisting of a negative meniscus cemented doublet, and a second lens unit $L_2$ consisting of a positive lens component 5 serving also as a field direction changing prism, cemented doublet 6 and a meniscus cemented doublet 7. The first lens unit $L_1$ is cemented to the surface of incidence of the positive lens component 5, whereas the positive lens component 6 is cemented on the side surface thereof to the tip of an inner tube 10. The positive lens component 1 and the cemented doublet 6 are positioned relatively to each other with a spacing ring 8, whereas the cemented doublet 6 and the meniscus cemented doublet 7 are positioned relatively to each other with a spacing ring 9. Further, the spacing ring 9 has an edge 9a which extends inward and serves as a flare stop. The reference symbol LG represents a light guide. The endoscope is restricted in the outside diameter thereof and, on the other hand, must allow the cover glass to reserve a margin for the rays to pass therethrough. If the cover glass has no margin, light quantity will be insufficient at marginal portions of an image and the image will be affected by detrimental rays.

In view of this point, the condition (3) defines relationship between the maximum image height and the first surface of the objective lens system for endoscopes. If the condition (3) is not satisfied, a small value of $I_{max}$ for a large value of h: will make an image too small for favorable observation. Further, field angle will be narrowed undesirably for the objective lens system for endoscopes which should preferably have a wide angle.

When focal length of the second lens unit $L_2$ is designated by $f_2$, and the surface having the smallest radius of curvature out of the surfaces which are concave on the image side and arranged in the first lens unit is represented by $R_{min}$, it is desirable to design the objective lens system for endoscopes according to the present invention so as to satisfy the following condition (4) and (5):

$$f \leq f_2 \leq 10f \qquad (4)$$

$$|R_{min}| \leq 1.5f \qquad (5)$$

In the objective lens system for endoscopes, the formula (i) establishes for focal length of the second lens unit $L_2$. If $f_2$ is smaller than the lower limit of the condition (4) in this objective lens system, $\theta_2$ will be large so long as value of I is constant. When it is necessary to reserve a space for arranging the field direction changing prism between the first lens unit $L_1$ and the second lens unit $L_2$ as shown in FIG. 13, the angle formed between the optical axis and the off axial ray is large in this space, thereby undesirably making it difficult to satisfy the condition (3). If $f_2$ is larger than the upper limit of the condition (4), in contrast, $\theta_2$ will be small at a constant value of I. When it is attempted to enlarge the field angle of the objective lens system as a whole, it will be obliged to strengthen the negative refractive power of the first lens unit $L_1$, and correction of aberrations and adjustment of eccentricity at the assembly stage will undesirably be difficult.

When focal length $f_2$ of the second lens unit $L_2$ is set within the range defined by the condition (4), it is necessary to relatively strengthen the negative refractive power of the first lens unit $L_1$ for widening the field angle. In the composition illustrated in FIG. 4, however, it is difficult to arrange a plural number of lens components having negative refractive powers in the first lens unit $L_1$. Accordingly, it is necessary for widening the field angle to design the concave surface having negative refractive power in the first lens unit $L_1$ so as to satisfy the condition (5). If the condition (5) is not satisfied, it will be difficult to widen the field angle.

It is possible to design the objective lens system for endoscopes satisfying the conditions (4) and (5) so as to be separable in the vicinity of the pupil position between the first lens unit $L_1$ and the second lens unit $L_2$, and selectively use plural numbers of different first lens units and second lens units having various refractive powers and viewing directions in accordance with purposes of practical application.

When the aspherical surface satisfying the condition (2) to be used on the first lens unit $L_1$ of the objective lens system for endoscopes according to the present invention is a surface located on the object side, it is more desirable to design the aspherical surface so as to have a shape satisfying the following condition (6);

$$0 \leq \tan \alpha \leq \tan \omega_1 \qquad (6)$$

wherein the reference symbol o represents angle formed between the aspherical surface and the plane perpendicular to the optical axis at the intersection between the principal ray having the maximum image height $I_{max}$ and said aspherical surface. In addition, sign of $\alpha$ is regarded as positive when the aspherical surface is inclined on the image side as illustrated in FIG. 17.

In FIG. 17, Snell's law allows the following formula to establish for the ray incident on the above-mentioned intersection:

$$\sin(\theta_1 - \alpha) = n \sin(\theta_2 - \alpha)$$

Wherein the reference symbol n represents refractive index of the aspherical lens on an assumption that air is located on the object side of the aspherical surface.

The above-mentioned formula can be developed as follows:

$$\sin \theta_1 - \cos \theta_1 \tan \alpha = n \sin \theta_2 - n \cos \theta_2 \tan \alpha \qquad (ix)$$

In the above formula (ix), tan $\alpha$ represents angle formed between the aspherical surface and the plane perpendicular to the optical axis at the above-mentioned intersection, and the following formula (x) can be obtained from the above-mentioned formula (ix):

$$\tan \alpha = (n \sin \theta_2 - \sin \theta_1)/(n \cos \theta_2 - \cos \theta_1) \qquad (x)$$

Further, the formula (iv) $k = \sin \theta_2/\tan \theta_1$ gives the following relations:

$$\sin \theta_2 = K \tan \theta_1$$

$$\cos \theta_2 = \sqrt{1 - K^2 \tan^2 \theta_1}$$

By using these relations in the formula (x), we obtain:

$$\tan \alpha = (n K \tan \theta_1 - \sin \theta_1)/(n \sqrt{1 - K^2 \tan^2 \theta_1} - \cos \theta_1) \qquad (xi)$$

As is seen from the formula (xi), tan $\alpha$ is enlarged as K has a larger value. That is to say, the aspherical surface is inclined on the image side at a larger angle as K has a larger value, and vice versa. Further, when tan $\alpha$ is zero, the aspherical surface is perpendicular to the optical axis at the above-mentioned intersection and the aspherical surface having $K_I - K_{0.5}$ satisfying the condition (2) at this time has the shape shown in FIG. 18A. Furthermore, at tan $\alpha < 0$, the aspherical surface has such a shape as to be concave on the object side at higher carvature as the surface portions are closer to the optical axis, which is undesirable since such a surface maKes it difficult to correct aberrations.

Moreover, at tan $\alpha =$ tan $\omega_1$, the principal ray is incident perpendicularly on the aspherical surface at the above-mentioned intersection and travels straight without being refracted by the aspherical surface. When $K_I - K_{0.5}$ satisfies the condition (2) at this time, the aspherical surface is shaped as shown in FIG. 18B. At tan $\alpha =$ tan $\omega_1$, the aspherical surface has such a shape as to be convex on the object side at higher curvature as the surface portions are farther from the optical axis, thereby maKing it difficult to enlarge the field angle. Since the ray refracted by this aspherical surface has a large angle relative to the optical axis and the ray incident on the second lens unit $L_2$ has a sufficiently small angle relative to the optical axis, the negative function of the first lens unit $L_1$ is strengthened. Accordingly, the surface concave on the image side on the first lens unit $L_1$ has curvature of smaller absolute value and the number of the lens components having negative refractive powers in the first lens unit $L_1$ must be increased, thereby producing undesirable effects on correction of aberrations and assembly worKs of the objective lens system.

Accordingly, it is desirable that tan $\alpha$ satisfies the condition (6).

When shape of the aspherical surface satisfying the above-mentioned condition (2) to be used in the first lens unit $L_1$ of the objective lens system according to the present invention is expressed by the formula given below, it is desirable to satisfy at least either one of the conditions that at least one of the aspherical surface coefficients of the fourth and higher orders E, F, G, H, ... is positive when said aspherical surface is located on the object side and that at least one of the aspherical surface coefficients is negative when said aspherical surface is located on the image side:

$$x = \frac{cy^2}{1 + \sqrt{1 - pc^2y^2}} + Ey^4 + Fy^6 + Gy^8 + Hy^{10} + \ldots$$

the reference symbols x and y represent values of coordinates on which the direction along the optical axis is regarded as the x axis taKing the direction toward an image as positive, intersection between the aspherical surface and the optical axis is considered as the origin, and the direction perpendicular to the axis is considered as y axis, and the reference symbol C designates an inverse number of radius of curvature of a circle in contact with the aspherical surface in the vicinity of the optical axis.

The aspherical surface to be used in the objective lens system for endoscopes according to the present invention is sufficient so far as it satisfies the condition (2) and at least one of the aspherical surface coefficients E, F, G, ..., which may have various values, must have a positive value.

When a prism or mirror for changing field direction by bending the optical axis for side viewing is to be arranged between the first lens unit and the second lens unit in the objective lens system for endoscopes according to the present invention, it is desirable to design the lens system so as to satisfy the following condition (10):

$$2 \leq \frac{d}{I_{max}} \leq 8 \qquad (10)$$

wherein the reference symbol d represents distance as measured from the surface located on the extremely image side out of the surfaces having refractive powers in the first lens unit to the surface located on the extremely object side out of the surfaces having refractive powers in the second lens unit.

If d has a value smaller than the lower limit of the condition (10), the objective lens system will not permit reserving the airspace for arranging said prism or mirror. If d has a value larger than the upper limit of the condition (10), in contrast, the airspace reserved between the first lens unit and the second lens unit will be wide, thereby maKing it difficult to correct aberrations favorably.

It is possible by changing shape of said prism to compose objective lens systems having various field directions. Examples of said prism are shown in FIG. 3 (A), FIG. 3 B and FIG. 3 C wherein the reflecting surfaces are designed as totally reflecting surfaces or surfaces coated with metallic films for reflecting the effective rays. In FIG. 3 C, the reference symbol S represents a stop fixed to a prism.

Further, it is difficult to shape, by grinding, the lens element having the aspherical surface on the object side and to be arranged in the first lens unit. Accordingly, the aspherical lens element is to be shaped by molding or cutting. It is therefore desirable to design the aspherical lens element so as to have a shape manufacturable relatively easily. Hence, the aspherical lens element should desirably have an image side surface which is plane or has a relatively large radius of curvature as shown in FIG. 19. And, it is also desirable to design the first lens unit so as to have such a composition wherein a lens element having negative refractive power is located in the vicinity of the image side surface or cemented thereto.

By selecting adequate refractive indices and dispersing powers for the plural number of lens elements arranged in the vicinity of each other or cemented to each other as described above in the first lens unit, it is possible to correct chromatic aberration and other aberrations favorably.

Furthermore, though glass, plastics and optical crystals such as sapphire may be considered as materials for the aspherical lens element, it is desirable to select glass from the viewpoints of manufacturing cost and resistance to temperature, humidity, chemicals, etc., and shape the aspherical lens component by molding glass.

Moreover, the objective lens system for endoscopes according to the present invention is designed in such a manner that optical path length $z$: between the surface located on the extremely image side out of the surfaces having negative refractive powers in the first lens unit L: and the surface located on the extremely object side out of the surfaces having positive refractive powers in the second lens unit $L_2$ satisfies the following condition (7):

$$z_1/f \geq 1 \tag{7}$$

In the objective lens system for endoscopes according to the present invention, the first lens unit $L_1$ comprises at least one aspherical surface for correcting distortion sufficiently. The surface concave on the object side and Kept in contact with air in the second lens unit $L_2$ has a function to produce positive curvature of field in the objective lens system and is capable of correcting sufficiently favorably the curvature of field to be produced by the relay lens system.

Further, the condition (7) is required to reserve a space allowing to arrange a field direction changing system between the first lens unit $L_1$ and the second lens unit $L_2$. If the condition (7) is not satisfied, it will be impossible to arrange a field direction changing system in the objective lens system for endoscopes according to the present invention, thereby disabling to accomplish one of the objects of the present invention. It is desirable for composing the field direction changing system to use a glass material having relatively high refractive index so as to provide a long optical path length.

Furthermore, in order to shorten outside diameter of the objective lens system by lowering height of the principal ray, it is desirable to design the objective lens system so as to satisfy the following condition (8):

$$z_2/z_1 \leq 0.8 \tag{8}$$

wherein the reference symbol $z_2$ represents optical path length as measured from the surface arranged on the extremely image side out of the surfaces having negative refractive powers in the first lens unit $L_1$ to the front focal point of the second lens unit $L_2$.

Since a non-flexible endoscope has the shape of a long bar, outside diameters must be nearly the same between the objective lens system and the relay lens systems to be used in the non-flexible endoscope.

It is necessary also for the objective lens system for endoscopes according to the present invention to prevent heights of rays from being too high on the respective lens elements.

In order to minimize loss of light quantity at the stage of incidence on the relay lens systems, the objective lens system for endoscopes is designed in such a manner that the principal ray is perpendicular to the image surface as described above. For this purpose, the objective lens system for endoscopes according to the present invention is so composed as to allow the principal ray to intersect with the optical axis in the vicinity of the front focal point of the second lens unit $L_2$. Accordingly, it is possible to lower height of the principal ray on the first lens unit $L_1$ by shortening the optical path length as measured from the surface arranged on the extremely image side out of the surfaces having negative refractive powers in the first lens unit $L_1$ to the front focal point of the second lens unit $L_2$.

If the condition (8) is not satisfied, height of the principal ray will be increased on the first lens unit $L_1$, thereby enlarging outside diameter of the first lens unit $L_1$ and maKing the objective lens unsuited for use with endoscopes.

In order to reduce distortion at a wide field angle, it is desirable to design the objective lens system for endoscopes according to the present invention so as to satisfy the following condition (9):

$$|f_2/f_1| \leq 8 \tag{9}$$

wherein the reference symbols $f_1$ and $f_2$ represent focal lengths of the first lens unit $L_1$ and the second lens unit $L_2$ respectively.

Distortion is produced due to the fact that the principal ray is refracted in the direction to widen the field angle by the negative strong refractive power of the first lens unit $L_1$. In order to minimize distortion at a wide field angle, it is therefore desirable to relatively weaKen the negative strong refractive power of the first lens unit $L_1$ and relatively strengthen the positive refractive power of the second lens unit $L_2$. This means relatively increases the inclination, with regard to the optical axis, of the principal ray between the first lens unit $L_1$ and the second lens unit $L_2$.

If $f_2$ is too long to satisfy the condition (9), the objective lens system as a whole will have too weaK refractive power and cannot have a wide field angle, or if $f_1$ is too short to satisfy the condition (9), the first lens unit $L_1$ will have too strong negative refractive power, thereby maKing it difficult to correct distortion.

The objective lens system for endoscopes according to the present invention comprises, on the extremely object side in the second lens unit $L_2$, a bar-shaped lens component which is longer in the direction along the optical axis than in the diametrical direction. It is possible to arrange the field direction changing optical system by utilizing a portion of the bar-shaped lens component. The objective lens system for endoscopes according to the present invention has such a composition as to accurately locate the field direction changing optical system. The field direction changing optical system to be used in the objective lens system for endoscopes according to the present invention consists, for example, of a field direction changing prism having a refracting surface and a reflecting surface, and a stabilizing optical element capable of arranging said prism at an accurately positioned state. The field direction changing prism refracts the rays incident thereon by the refracting surface thereof, reflects the rays by the reflecting surface thereof, reflects the rays by said refracting surface and then allows the rays to emerge from the emerging surface thereof. The prism changes the field direction by differenciating the direction of the incident rays from that of the emerging rays. Further, the rays emerging from the field direction changing prism fall on the stabilizing optical element. In the field direction changing optical system, the field direction changing prism and the stabilizing optical element are arranged in such a manner that the shapes and sizes of a sectional surfaces perpendicular to the optical axis are the same between the field direction changing prism and the stabilizing optical element, that the surface of emergence of the field direction changing prism is parallel to the surface of incidence of the stabilizing optical element, and that both the surfaces are Kept in contact with each other or located in the vicinity of each other.

FIG. 20 illustrates a fundamental composition of the field direction changing optical system to be used in the objective lens system for endoscopes according to the present invention. The field direction changing optical system consists of a field direction changing prism 1 and a stabilizing optical element 3 and is adapted in such a manner that an oblique ray 1 is refracted by a refracting surface $1_b$, reflected by a reflecting surface $1_a$, reflected by the refractive surface $1_b$, emerges from the emerging surface (reflecting surface $1_a$) and then falls on the stabilizing optical element 3.

The sectional shape and size of the field direction changing prism 1 are the same as those of the stabilizing optical system so that the outer circumferential surfaces of these member form a continuous surface as shown in FIG. 20. That is to say, it is possible to form the field direction changing prism and the stabilizing optical element by cutting, along a surface inclined with regard to the optical axis, the bar-shaped lens component to be used in the objective lens system for endoscopes according to the present invention. Accordingly, it is possible, when the outer circumferential surfaces of the field direction changing prism 1 and the stabilizing optical element 3 (i.e., the bar-shaped lens component) is preliminarily matched accurately with the inner surface of a distal end frame of an endoscope, to correctly position these members simply by sequentially setting these members into the distal end frame of the endoscope with no misalignment between the central axes thereof nor inclination of the cemented surfaces thereof.

FIG. 21 exemplifies a case where a correcting prism 2 is arranged in addition to the field direction changing prism 1. Also in this case, the component members of the field direction optical system can be arranged correctly in the procedures similar to those described with reference to FIG. 20.

When diameter of the sectional surface perpendicular to the longitudinal axis of the endoscope is represented by D and length of the longitudinal center axis is designated by T, it is desirable for the field direction changing optical systems shown in FIG. 20 and FIG. 21 to satisfy the following condition:

$$1.2 < T/D < 4$$

If T/D is smaller than 1.2, the field direction changing prism allows remarKable positional deviation, thereby undesirably deviating the field direction and producing astigmatism. If T/D is larger than 4, the optical path length will be prolonged in the prism and rays will be diverged to enhance height of rays on the surface of emergency of the stabilizing optical element, thereby allowing the rays to be eclipsed and images to be darKened in the endoscope which cannot have a large outside diameter.

In addition, the field direction changing optical systems shown in FIG. 20 and FIG. 21 can be prepared, for example, by modifying the second lens unit $L_2$ shown in FIG. 13. SpeaKing concretely, the positive lens component arranged on the extremely object side in the second lens unit $L_2$ can be composed of three blocKs of the correcting prism 2, the field direction changing prism 1 and the stabilizing optical element 3.

BRIEF DESCRIPTION OF THE DRAWINGS

FIG. 18A and FIG. 18B show diagrams illustrating condition of the principal ray refracted by the aspherical surface used in the objective lens system according to the present invention;

FIG. 19 show a diagram exemplifying shape of the aspherical surface;

FIG. 20 and FIG. 21 show sectional views illustrating field direction changing optical systems to be arranged in the objective lens system according to the present invention;

FIG. 22 through FIG. 53 show sectional views illustrating Embodiments 1 through 32 of the objective lens system for endoscopes according to the present invention; and FIG. 54 through FIG. 85 show graphs illustrating aberration characteristics of the Embodiments 1 through 32.

DETAILED DESCRIPTION OF THE PREFERRED EMBODIMENTS

Figure 1:
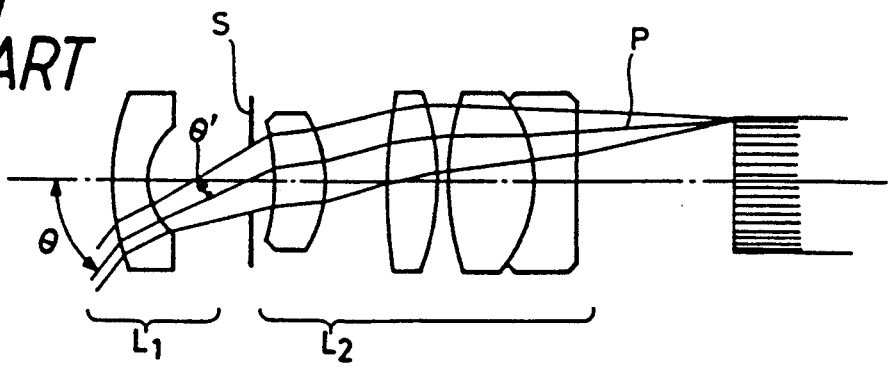
FIG. 1 and FIG. 2 show sectional views illustrating the conventional objective lens systems for endoscopes.
Figure 2:
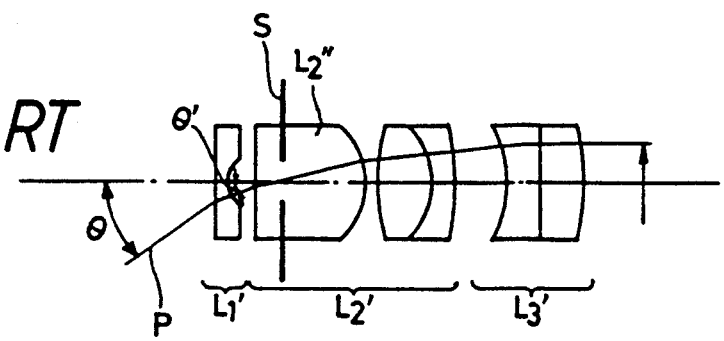

Now, the present invention will be described more detailedly below with reference to the accompanying drawings and the numerical data shown below in the form of numerical data:

Embodiment 1
$f = 1.000$, $F/5.163$, $2\omega = 67.31°$
$IH = 0.68$, object distance $= -8.8496$

| | | | |
|---|---|---|---|
| $r_1 = \infty$ | | | |
| | $d_1 = 0.0885$ | $n_1 = 1.76900$ | $\nu_1 = 64.15$ |
| $r_2 = \infty$ | | | |
| | $d_2 = 0.0590$ | | |
| $r_3 = 4.8865$ (aspherical surface) | | | |
| | $d_3 = 0.3835$ | $n_2 = 1.78472$ | $\nu_2 = 25.71$ |
| $r_4 = \infty$ | | | |
| | $d_4 = 0.1180$ | $n_3 = 1.58144$ | $\nu_3 = 40.75$ |
| $r_5 = 0.3540$ | | | |
| | $d_5 = 0.2360$ | | |
| $r_6 = \infty$ | | | |
| | $d_6 = 0.7563$ | $n_4 = 1.80610$ | $\nu_4 = 40.95$ |
| $r_7 = \infty$ (stop) | | | |
| | $d_7 = 2.0048$ | $n_5 = 1.80610$ | $\nu_5 = 40.95$ |
| $r_8 = -1.2746$ | | | |
| | $d_8 = 0.0885$ | | |
| $r_9 = 2.4460$ | | | |
| | $d_9 = 0.8850$ | $n_6 = 1.60311$ | $\nu_6 = 60.70$ |
| $r_{10} = -0.9310$ | | | |
| | $d_{10} = 0.2950$ | $n_7 = 1.84666$ | $\nu_7 = 23.88$ |
| $r_{11} = -4.0838$ | | | |
| | $d_{11} = 0.8348$ | | |
| $r_{12} = -0.8024$ | | | |
| | $d_{12} = 0.2950$ | $n_8 = 1.58144$ | $\nu_8 = 40.75$ |
| $r_{13} = \infty$ | | | |
| | $d_{13} = 0.6785$ | $n_9 = 1.60311$ | $\nu_9 = 60.70$ |
| $r_{14} = -1.1749$ | | | | aspherical coefficient
$E = 0.22613$, $F = -0.16693$  $p = 1$
$|R_1| = 0.354$, $\Delta K = 0.037$ $\left|\dfrac{K_I - K_{0.5}}{K_{0.5}}\right| = 0.061$, $|\cos\omega_1 - \cos\omega_{0.5}| = 0.119$ $h_1/I_{max} = 0.677$, $|R_{min}| = 0.354$, $f_2 = 1.802$
$\tan\alpha = 0.1485$, $\tan\omega_1 = 0.666$

Embodiment 2
$f = 1.000$, $F/6.081$, $2\omega = 69.97°$
$IH = 0.6686$, object distance $= -17.2911$

| | | | |
|---|---|---|---|
| $r_1 = \infty$ | | | |
| | $d_1 = 0.2305$ | $n_1 = 1.76900$ | $\nu_1 = 64.15$ |
| $r_2 = \infty$ | | | |
| | $d_2 = 0.1153$ | | |
| $r_3 = 2.1028$ (aspherical surface) | | | |
| | $d_3 = 0.2882$ | $n_2 = 1.80610$ | $\nu_2 = 40.95$ |
| $r_4 = 0.4496$ | | | |
| | $d_4 = 0.2305$ | | |
| $r_5 = \infty$ | | | |
| | $d_5 = 0.7927$ | $n_3 = 1.80610$ | $\nu_3 = 40.95$ |
| $r_6 = \infty$ (stop) | | | |
| | $d_6 = 2.2044$ | $n_4 = 1.80610$ | $\nu_4 = 40.95$ |
| $r_7 = -1.2922$ | | | |
| | $d_7 = 0.1729$ | | |
| $r_8 = 2.8519$ | | | |
| | $d_8 = 1.0663$ | $n_5 = 1.60311$ | $\nu_5 = 60.70$ |
| $r_9 = -1.0767$ | | | |
| | $d_9 = 0.2305$ | $n_6 = 1.84666$ | $\nu_6 = 23.78$ |
| $r_{10} = -3.0726$ | | | |
| | $d_{10} = 0.2882$ | | |
| $r_{11} = -0.9798$ | | | |
| | $d_{11} = 0.3458$ | $n_7 = 1.84666$ | $\nu_7 = 23.78$ |
| $r_{12} = -9.2888$ | | | |
| | $d_{12} = 0.1556$ | | |
| $r_{13} = 2.6974$ | | | |
| | $d_{13} = 0.6282$ | $n_8 = 1.65160$ | $\nu_8 = 58.52$ |
| $r_{14} = -2.6974$ | | | | aspherical coefficient
$E = 0.20175$, $F = -0.65172 \times 10^{-2}$, $p = 1$
$|R_1| = 0.4496$, $\Delta K = 0.058$ $\left|\dfrac{K_I - K_{0.5}}{K_{0.5}}\right| = 0.089$, $|\cos\omega_1 - \cos\omega_{0.5}| = 0.128$ $h_1/I_{max} = 0.542$, $|R_{min}| = 0.4496$, $f_2 = 1.697$
$\tan\alpha = 0.2137$, $\tan\omega_1 = 0.700$

Embodiment 3
$f = 1.000$, $F/6.109$, $2\omega = 70.14°$
$IH = 0.67$, object distance $= -17.3110$

| | | | |
|---|---|---|---|
| $r_1 = \infty$ | | | |
| | $d_1 = 0.2308$ | $n_1 = 1.76900$ | $\nu_1 = 64.15$ |
| $r_2 = \infty$ | | | |
| | $d_2 = 0.1154$ | | |
| $r_3 = 2.1052$ (aspherical surface) | | | |
| | $d_3 = 0.2885$ | $n_2 = 1.78472$ | $\nu_2 = 25.71$ |
| $r_4 = 0.4385$ | | | |
| | $d_4 = 0.2308$ | | |
| $r_5 = \infty$ | | | |
| | $d_5 = 0.7933$ | $n_3 = 1.80610$ | $\nu_3 = 40.95$ |
| $r_6 = \infty$ (stop) | | | |
| | $d_6 = 2.2073$ | $n_4 = 1.80610$ | $\nu_4 = 40.95$ |
| $r_7 = -1.2937$ | | | |
| | $d_7 = 0.1731$ | | |
| $r_8 = 2.8552$ | | | |
| | $d_8 = 1.0675$ | $n_5 = 1.60311$ | $\nu_5 = 60.70$ |
| $r_9 = -1.0779$ | | | |
| | $d_9 = 0.2308$ | $n_6 = 1.84666$ | $\nu_6 = 23.78$ |
| $r_{10} = -3.0744$ | | | |
| | $d_{10} = 0.2885$ | | |
| $r_{11} = -0.9781$ | | | |
| | $d_{11} = 0.3462$ | $n_7 = 1.84666$ | $\nu_7 = 23.78$ |
| $r_{12} = -9.2995$ | | | |
| | $d_{12} = 0.1558$ | | |
| $r_{13} = 2.7005$ | | | |
| | $d_{13} = 0.6290$ | $n_8 = 1.65160$ | $\nu_8 = 58.67$ |
| $r_{14} = -2.7005$ | | | | aspherical coefficient
$E = 0.20105$, $F = -0.64797 \times 10^{-2}$, $p = 1$
$|R_1| = 0.4385$, $\Delta K = 0.059$ $\left|\dfrac{K_I - K_{0.5}}{K_{0.5}}\right| = 0.090$, $|\cos\omega_1 - \cos\omega_{0.5}| = 0.129$ $h_1/I_{max} = 0.544$, $|R_{min}| = 0.4385$, $f_2 = 1.699$
$\tan\alpha = 0.2143$, $\tan\omega_1 = 0.702$

Embodiment 4
$f = 1.000$, $F/7.153$, $2\omega = 70.14°$
$IH = 0.67$, object distance $= -17.4331$

| | | | |
|---|---|---|---|
| $r_1 = \infty$ | | | |
| | $d_1 = 0.2324$ | $n_1 = 1.76900$ | $\nu_1 = 64.15$ |
| $r_2 = \infty$ | | | |
| | $d_2 = 0.1162$ | | |
| $r_3 = 2.7796$ (aspherical surface) | | | |
| | $d_3 = 0.5035$ | $n_2 = 1.78472$ | $\nu_2 = 25.71$ |
| $r_4 = 0.4416$ | | | |
| | $d_4 = 0.2324$ | | |
| $r_5 = \infty$ | | | |
| | $d_5 = 1.2018$ | $n_3 = 1.80610$ | $\nu_3 = 40.95$ |
| $r_6 = \infty$ (stop) | | | |
| | $d_6 = 1.8199$ | $n_4 = 1.80610$ | $\nu_4 = 40.95$ |
| $r_7 = -1.3028$ | | | |
| | $d_7 = 0.1743$ | | |
| $r_8 = 2.8753$ | | | |
| | $d_8 = 1.0750$ | $n_5 = 1.60311$ | $\nu_5 = 60.70$ |
| $r_9 = -1.0855$ | | | |
| | $d_9 = 0.2324$ | $n_6 = 1.84666$ | $\nu_6 = 23.78$ |
| $r_{10} = -3.0961$ | | | |
| | $d_{10} = 0.2906$ | | |
| $r_{11} = -0.9850$ | | | |
| | $d_{11} = 0.3487$ | $n_7 = 1.84666$ | $\nu_7 = 23.78$ |
| $r_{12} = -9.3650$ | | | |
| | $d_{12} = 0.1569$ | | |

-continued $r_{13} = 2.7196$ $d_{13} = 0.6334 \quad n_8 = 1.65160 \quad \nu_8 = 58.67$ $r_{14} = -2.7196$
aspherical coefficient
$E = 0.14395, \quad F = -0.62561 \times 10^{-2}, \quad p = 1$
$|R_1| = 0.4416, \quad \Delta K = 0.037$ $\left|\dfrac{K_I - K_{0.5}}{K_{0.5}}\right| = 0.056, \quad |\cos \omega_I - \cos \omega_{0.5}| = 0.128$ $h_1/I_{max} = 0.769, \quad |R_{min}| = 0.4416, \quad f_2 = 1.711$
$\tan \alpha = 0.2686, \quad \tan \omega_1 = 0.702$

Embodiment 5
$f = 1.000, \quad F/8.155, \quad 2\omega = 70.14°$
$IH = 0.68, \quad \text{object distance} = -17.5213$

| | | | |
|---|---|---|---|
| $r_1 = \infty$ | | | |
| | $d_1 = 0.2336$ | $n_1 = 1.76900$ | $\nu_1 = 64.15$ |
| $r_2 = \infty$ | | | |
| | $d_2 = 0.1168$ | | |
| $r_3 = 4.2913$ (aspherical surface) | | | |
| | $d_3 = 1.0121$ | $n_2 = 1.78472$ | $\nu_2 = 25.71$ |
| $r_4 = 0.4439$ | | | |
| | $d_4 = 0.2336$ | | |
| $r_5 = \infty$ | | | |
| | $d_5 = 1.5341$ | $n_3 = 1.80610$ | $\nu_3 = 40.95$ |
| $r_6 = \infty$ (stop) | | | |
| | $d_6 = 1.5029$ | $n_4 = 1.80610$ | $\nu_4 = 40.95$ |
| $r_7 = -1.3094$ | | | |
| | $d_7 = 0.1752$ | | |
| $r_8 = 2.8898$ | | | |
| | $d_8 = 1.0805$ | $n_5 = 1.60311$ | $\nu_5 = 60.70$ |
| $r_9 = -1.0910$ | | | |
| | $d_9 = 0.2336$ | $n_6 = 1.84666$ | $\nu_6 = 23.78$ |
| $r_{10} = -3.1118$ | | | |
| | $d_{10} = 0.2920$ | | |
| $r_{11} = -0.9900$ | | | |
| | $d_{11} = 0.3504$ | $n_7 = 1.84666$ | $\nu_7 = 23.78$ |
| $r_{12} = -9.4124$ | | | |
| | $d_{12} = 0.1577$ | | |
| $r_{13} = 2.7333$ | | | |
| | $d_{13} = 0.6366$ | $n_8 = 1.65160$ | $\nu_8 = 58.67$ |
| $r_{14} = -2.7333$ | | | | aspherical coefficient
$E = 0.59647 \times 10^{-1}, \quad F = -0.61002 \times 10^{-2}, \quad p = 1$
$|R_1| = 0.4439, \quad \Delta K = 0.023$ $\left|\dfrac{K_I - K_{0.5}}{K_{0.5}}\right| = 0.035, \quad |\cos \omega_I - \cos \omega_{0.5}| = 0.128$ $h_1/I_{max} = 1.176, \quad |R_{min}| = 0.4439, \quad f_2 = 1.720$
$\tan \alpha = 0.2973, \quad \tan \omega_1 = 0.702$

Embodiment 6
$f = 1.000, \quad F/5.200, \quad 2\omega = 66.99°$
$IH = 0.6062, \quad \text{object distance} = -8.3426$

| | | | |
|---|---|---|---|
| $r_1 = \infty$ | | | |
| | $d_1 = 0.0834$ | $n_1 = 1.76900$ | $\nu_1 = 64.15$ |
| $r_2 = \infty$ | | | |
| | $d_2 = 0.0556$ | | |
| $r_3 = 4.6851$ (aspherical surface) | | | |
| | $d_3 = 0.3615$ | $n_2 = 1.78472$ | $\nu_2 = 25.71$ |
| $r_4 = \infty$ | | | |
| | $d_4 = 0.1112$ | $n_3 = 1.58144$ | $\nu_3 = 40.75$ |
| $r_5 = 0.3337$ | | | |
| | $d_5 = 0.2225$ | | |
| $r_6 = \infty$ | | | |
| | $d_6 = 0.7131$ | $n_4 = 1.80610$ | $\nu_4 = 40.95$ |
| $r_7 = \infty$ (stop) | | | |
| | $d_7 = 1.8898$ | $n_5 = 1.80610$ | $\nu_5 = 40.95$ |
| $r_8 = -1.2954$ | | | |
| | $d_8 = 0.0834$ | | |
| $r_9 = 1.7066$ | | | |
| | $d_9 = 0.8343$ | $n_6 = 1.60311$ | $\nu_6 = 60.70$ |
| $r_{10} = -0.9557$ | | | |
| | $d_{10} = 0.2781$ | $n_7 = 1.84666$ | $\nu_7 = 23.88$ |
| $r_{11} = -7.5841$ | | | |
| | $d_{11} = 0.8089$ | | |

-continued

| | | | |
|---|---|---|---|
| $r_{12} = -0.6839$ | | | |
| | $d_{12} = 0.2781$ | $n_8 = 1.58144$ | $\nu_8 = 40.75$ |
| $r_{13} = \infty$ | | | |
| | $d_{13} = 0.6396$ | $n_9 = 1.60311$ | $\nu_9 = 60.70$ |
| $r_{14} = -1.0340$ | | | | aspherical coefficient
$E = 0.20085, \quad F = -0.22420, \quad p = 1$
$|R_1| = 0.3337, \quad \Delta K = 0.051$ $\left|\dfrac{K_I - K_{0.5}}{K_{0.5}}\right| = 0.085, \quad |\cos \omega_I - \cos \omega_{0.5}| = 0.122$ $h_1/I_{max} = 0.652, \quad |R_{min}| = 0.3337, \quad f_2 = 1.733$
$\tan \alpha = 0.1213, \quad \tan \omega_1 = 0.661$

Embodiment 7
$f = 1.000, \quad F/5.210, \quad 2\omega = 67.67°$
$IH = 0.6714, \quad \text{object distance} = -9.2393$

| | | | |
|---|---|---|---|
| $r_1 = \infty$ | | | |
| | $d_1 = 0.0924$ | $n_1 = 1.76900$ | $\nu_1 = 64.15$ |
| $r_2 = \infty$ | | | |
| | $d_2 = 0.0616$ | | |
| $r_3 = 6.0741$ (aspherical surface) | | | |
| | $d_3 = 0.4004$ | $n_2 = 1.78472$ | $\nu_2 = 25.71$ |
| $r_4 = \infty$ | | | |
| | $d_4 = 0.1232$ | $n_3 = 1.58144$ | $\nu_3 = 40.75$ |
| $r_5 = 0.3696$ | | | |
| | $d_5 = 0.2464$ | | |
| $r_6 = \infty$ | | | |
| | $d_6 = 0.7894$ | $n_4 = 1.80610$ | $\nu_4 = 40.95$ |
| $r_7 = \infty$ (stop) | | | |
| | $d_7 = 2.0932$ | $n_5 = 1.80610$ | $\nu_5 = 40.95$ |
| $r_8 = -1.2770$ | | | |
| | $d_8 = 0.0924$ | | |
| $r_9 = 3.0909$ | | | |
| | $d_9 = 0.9239$ | $n_6 = 1.60311$ | $\nu_6 = 60.70$ |
| $r_{10} = -0.9192$ | | | |
| | $d_{10} = 0.3080$ | $n_7 = 1.84666$ | $\nu_7 = 23.88$ |
| $r_{11} = -3.2067$ | | | |
| | $d_{11} = 0.8442$ | | |
| $r_{12} = -0.7998$ | | | |
| | $d_{12} = 0.3080$ | $n_8 = 1.58144$ | $\nu_8 = 40.75$ |
| $r_{13} = \infty$ | | | |
| | $d_{13} = 0.7083$ | $n_9 = 1.60311$ | $\nu_9 = 60.70$ |
| $r_{14} = -1.2141$ | | | | aspherical coefficient
$E = 0.23807, \quad F = -0.13456, \quad p = 1$
$|R_1| = 0.3696, \quad \Delta K = 0.027$ $\left|\dfrac{K_I - K_{0.5}}{K_{0.5}}\right| = 0.045, \quad |\cos \omega_I - \cos \omega_{0.5}| = 0.117$ $h_1/I_{max} = 0.684, \quad |R_{min}| = 0.3696, \quad f_2 = 1.865$
$\tan \alpha = 0.1514, \quad \tan \omega_1 = 0.670$

Embodiment 8
$f = 1.000, \quad F/5.240, \quad 2\omega = 87.49°$
$IH = 0.9152, \quad \text{object distance} = -12.5945$

| | | | |
|---|---|---|---|
| $r_1 = \infty$ | | | |
| | $d_1 = 0.1259$ | $n_1 = 1.76900$ | $\nu_1 = 64.15$ |
| $r_2 = \infty$ | | | |
| | $d_2 = 0.0840$ | | |
| $r_3 = -647.3792$ (aspherical surface) | | | |
| | $d_3 = 0.5458$ | $n_2 = 1.78472$ | $\nu_2 = 25.71$ |
| $r_4 = \infty$ | | | |
| | $d_4 = 0.1679$ | $n_3 = 1.58144$ | $\nu_3 = 40.75$ |
| $r_5 = 0.5038$ | | | |
| | $d_5 = 0.3359$ | | |
| $r_6 = \infty$ | | | |
| | $d_6 = 1.0759$ | $n_4 = 1.80610$ | $\nu_4 = 40.95$ |
| $r_7 = \infty$ (stop) | | | |
| | $d_7 = 2.8535$ | $n_5 = 1.80610$ | $\nu_5 = 40.95$ |
| $r_8 = -1.7455$ | | | |
| | $d_8 = 0.1259$ | | |
| $r_9 = 4.0568$ | | | |
| | $d_9 = 1.2594$ | $n_6 = 1.60300$ | $\nu_6 = 65.48$ |
| $r_{10} = -1.2564$ | | | |
| | $d_{10} = 0.4198$ | $n_7 = 1.84666$ | $\nu_7 = 23.88$ |

-continued

| | | |
|---|---|---|
| $r_{11} = -3.0412$ | | |
| | $d_{11} = 0.6504$ | |
| $r_{12} = -1.4735$ | | |
| | $d_{12} = 0.4198$ $n_8 = 1.59270$ $\nu_8 = 35.29$ | |
| $r_{13} = \infty$ | | |
| | $d_{13} = 0.9656$ $n_9 = 1.51728$ $\nu_9 = 69.56$ | |
| $r_{14} = -1.9745$ | | | aspherical coefficient
$E = 0.10039$, $F = -0.28591 \times 10^{-1}$, $p = 1$
$|R_1| = 0.5038$, $\Delta K = 0.052$ $\left|\dfrac{K_I - K_{0.5}}{K_{0.5}}\right| = 0.098$, $|\cos \omega_I - \cos \omega_{0.5}| = 0.182$ $h_1/I_{max} = 0.858$, $|R_{min}| = 0.5038$, $f_2 = 2.139$
$\tan \alpha = 0.1443$, $\tan \omega_1 = 0.957$ Embodiment 9
$f = 1.000$, F/5.062, $2\omega = 87.10°$
IH = 0.8613, object distance = −11.8530

| | | |
|---|---|---|
| $r_1 = \infty$ | | |
| | $d_1 = 0.1185$ $n_1 = 1.76900$ $\nu_1 = 64.15$ | |
| $r_2 = \infty$ | | |
| | $d_2 = 0.0790$ | |
| $r_3 = -56.3732$ (aspherical surface) | | |
| | $d_3 = 0.5136$ $n_2 = 1.78472$ $\nu_2 = 25.71$ | |
| $r_4 = \infty$ | | |
| | $d_4 = 0.1580$ $n_3 = 1.58144$ $\nu_3 = 40.75$ | |
| $r_5 = 0.4741$ | | |
| | $d_5 = 0.3161$ | |
| $r_6 = \infty$ | | |
| | $d_6 = 1.0124$ $n_4 = 1.80610$ $\nu_4 = 40.95$ | |
| $r_7 = \infty$ (stop) | | |
| | $d_7 = 2.6857$ $n_5 = 1.80610$ $\nu_5 = 40.95$ | |
| $r_8 = -1.7177$ | | |
| | $d_8 = 0.1185$ | |
| $r_9 = 2.9925$ | | |
| | $d_9 = 1.1853$ $n_6 = 1.60300$ $\nu_6 = 65.48$ | |
| $r_{10} = -1.3612$ | | |
| | $d_{10} = 0.3951$ $n_7 = 1.84666$ $\nu_7 = 23.88$ | |
| $r_{11} = -3.8561$ | | |
| | $d_{11} = 0.6970$ | |
| $r_{12} = -1.1928$ | | |
| | $d_{12} = 0.3951$ $n_8 = 1.59270$ $\nu_8 = 35.29$ | |
| $r_{13} = \infty$ | | |
| | $d_{13} = 0.9087$ $n_9 = 1.51728$ $\nu_9 = 69.56$ | |
| $r_{14} = -1.6083$ | | | aspherical coefficient
$E = 0.11335$, $F = -0.38725 \times 10^{-1}$, $p = 1$
$|R_1| = 0.4741$, $\Delta K = 0.063$ $\left|\dfrac{K_I - K_{0.5}}{K_{0.5}}\right| = 0.120$, $|\cos \omega_I - \cos \omega_{0.5}| = 0.188$ $h_1/I_{max} = 0.821$, $|R_{min}| = 0.4741$, $f_2 = 2.090$
$\tan \alpha = 0.1316$, $\tan \omega_1 = 0.951$ Embodiment 10
$f = 1.000$, F/5.259, $2\omega = 87.99°$
IH = 0.9629, object distance = −13.2509

| | | |
|---|---|---|
| $r_1 = \infty$ | | |
| | $d_1 = 0.1325$ $n_1 = 1.76900$ $\nu_1 = 64.15$ | |
| $r_2 = \infty$ | | |
| | $d_2 = 0.0883$ | |
| $r_3 = -12.8271$ (aspherical surface) | | |
| | $d_3 = 0.5742$ $n_2 = 1.78472$ $\nu_2 = 25.71$ | |
| $r_4 = \infty$ | | |
| | $d_4 = 0.1767$ $n_3 = 1.58144$ $\nu_3 = 40.75$ | |
| $r_5 = 0.5300$ | | |
| | $d_5 = 0.3534$ | |
| $r_6 = \infty$ | | |
| | $d_6 = 1.1318$ $n_4 = 1.80610$ $\nu_4 = 40.95$ | |
| $r_7 = \infty$ (stop) | | |
| | $d_7 = 3.0025$ $n_5 = 1.80610$ $\nu_5 = 40.95$ | |
| $r_8 = -1.6269$ | | |
| | $d_8 = 0.1325$ | |
| $r_9 = 5.9867$ | | |
| | $d_9 = 1.3251$ $n_6 = 1.60300$ $\nu_6 = 65.48$ | |

-continued

| | | |
|---|---|---|
| $r_{10} = -1.0538$ | | |
| | $d_{10} = 0.4417$ $n_7 = 1.84666$ $\nu_7 = 23.88$ | |
| $r_{11} = -2.8854$ | | |
| | $d_{11} = 0.6843$ | |
| $r_{12} = -1.4437$ | | |
| | $d_{12} = 0.4417$ $n_8 = 1.59270$ $\nu_8 = 35.29$ | |
| $r_{13} = \infty$ | | |
| | $d_{13} = 1.0159$ $n_9 = 1.51728$ $\nu_9 = 69.56$ | |
| $r_{14} = -1.8947$ | | | aspherical coefficient
$E = 0.10389$, $F = -0.22176 \times 10^{-1}$, $p = 1$
$|R_1| = 0.5300$, $\Delta K = 0.039$ $\left|\dfrac{K_I - K_{0.5}}{K_{0.5}}\right| = 0.078$, $|\cos \omega_I - \cos \omega_{0.5}| = 0.177$ $h_1/I_{max} = 0.836$, $|R_{min}| = 0.5300$, $f_2 = 2.301$
$\tan \alpha = 0.2344$, $\tan \omega_1 = 0.966$ Embodiment 11
$f = 1.000$, F/6.051, $2\omega = 69.86°$
IH = 0.6674, object distance = −17.2612

| | | |
|---|---|---|
| $r_1 = \infty$ | | |
| | $d_1 = 0.1726$ $n_1 = 1.76900$ $\nu_1 = 64.15$ | |
| $r_2 = \infty$ | | |
| | $d_2 = 0.1151$ | |
| $r_3 = 2.4550$ (aspherical surface) | | |
| | $d_3 = 0.2877$ $n_2 = 1.80610$ $\nu_2 = 40.95$ | |
| $r_4 = 0.4488$ | | |
| | $d_4 = 0.2301$ | |
| $r_5 = \infty$ | | |
| | $d_5 = 0.9394$ $n_3 = 1.80610$ $\nu_3 = 40.95$ | |
| $r_6 = \infty$ (stop) | | |
| | $d_6 = 2.0525$ $n_4 = 1.80610$ $\nu_4 = 40.95$ | |
| $r_7 = -1.2900$ | | |
| | $d_7 = 0.1726$ | |
| $r_8 = 3.7635$ | | |
| | $d_8 = 1.1507$ $n_5 = 1.60311$ $\nu_5 = 60.70$ | |
| $r_9 = -1.0598$ | | |
| | $d_9 = 0.2301$ $n_6 = 1.84666$ $\nu_6 = 23.78$ | |
| $r_{10} = -1.9350$ | | |
| | $d_{10} = 0.4603$ | |
| $r_{11} = -0.6904$ | | |
| | $d_{11} = 0.3452$ $n_7 = 1.78472$ $\nu_7 = 25.71$ | |
| $r_{12} = \infty$ | | |
| | $d_{12} = 0.7250$ $n_8 = 1.69680$ $\nu_8 = 55.52$ | |
| $r_{13} = -1.1438$ | | | aspherical coefficient
$E = 0.19848$, $F = 0.39318 \times 10^{-5}$, $p = 1$
$|R_1| = 0.4488$, $\Delta K = 0.055$ $\left|\dfrac{K_I - K_{0.5}}{K_{0.5}}\right| = 0.087$, $|\cos \omega_I - \cos \omega_{0.5}| = 0.127$ $H_1/I_{max} = 0.550$, $|R_{min}| = 0.4488$, $f_2 = 1.964$
$\tan \alpha = 0.1902$, $\tan \omega_1 = 0.698$ Embodiment 12
$f = 1.000$, F/6.080, $2\omega = 70.02°$
IH = 0.6686, object distance = −28.8184

| | | |
|---|---|---|
| $r_1 = \infty$ | | |
| | $d_1 = 0.1729$ $n_1 = 1.76900$ $\nu_1 = 64.15$ | |
| $r_2 = \infty$ | | |
| | $d_2 = 0.1153$ | |
| $r_3 = 3.0173$ (aspherical surface) | | |
| | $d_3 = 0.2882$ $n_2 = 1.80610$ $\nu_2 = 40.95$ | |
| $r_4 = 0.4233$ | | |
| | $d_4 = 0.2882$ | |
| $r_5 = \infty$ | | |
| | $d_5 = 1.7036$ $n_3 = 1.80610$ $\nu_3 = 40.95$ | |
| $r_6 = \infty$ (stop) | | |
| | $d_6 = 2.1786$ $n_4 = 1.80610$ $\nu_4 = 40.95$ | |
| $r_7 = -1.9237$ | | |
| | $d_7 = 0.2882$ | |
| $r_8 = 23.0048$ | | |
| | $d_8 = 1.0029$ $n_5 = 1.64000$ $\nu_5 = 60.09$ | |
| $r_9 = -1.0650$ | | |
| | $d_9 = 0.2478$ $n_6 = 1.84666$ $\nu_6 = 23.88$ | |

-continued

| | | | |
|---|---|---|---|
| $r_{10} = -2.1708$ | | | |
| | $d_{10} = 2.0402$ | | |
| $r_{11} = -0.9691$ | | | |
| | $d_{11} = 0.5764$ | $n_7 = 1.64769$ | $\nu_7 = 33.80$ |
| $r_{12} = \infty$ | | | |
| | $d_{12} = 0.5648$ | $n_8 = 1.78800$ | $\nu_8 = 47.38$ |
| $r_{13} = -1.6391$ | | | | aspherical coefficient
$E = 0.27896$, $F = 0.17497 \times 10^{-5}$, $p = 1$
$|R_1| = 0.4233$, $\Delta K = 0.029$ $\left|\dfrac{K_I - K_{0.5}}{K_{0.5}}\right| = 0.046$, $|\cos\omega_I - \cos\omega_{0.5}| = 0.128$ $h_1/I_{max} = 0.629$, $|R_{min}| = 0.4233$, $f_2 = 2.805$
$\tan\alpha = 0.2272$, $\tan\omega_1 = 0.701$

Embodiment 13
$f = 1.000$, F/5.965, $2\omega = 73.60°$
$IH = 0.7432$, object distance $= -18.1269$

| | | | |
|---|---|---|---|
| $r_1 = \infty$ | | | |
| | $d_1 = 0.2417$ | $n_1 = 1.76900$ | $\nu_1 = 64.15$ |
| $r_2 = \infty$ | | | |
| | $d_2 = 0.1208$ | | |
| $r_3 = 1.7634$ (aspherical surface) | | | |
| | $d_3 = 0.3021$ | $n_2 = 1.80610$ | $\nu_2 = 40.95$ |
| $r_4 = 0.4713$ | | | |
| | $d_4 = 0.2417$ | | |
| $r_5 = \infty$ | | | |
| | $d_5 = 0.8472$ | $n_3 = 1.80610$ | $\nu_3 = 40.95$ |
| $r_6 = \infty$ (stop) | | | |
| | $d_6 = 2.2948$ | $n_4 = 1.80610$ | $\nu_4 = 40.95$ |
| $r_7 = -1.5109$ | | | |
| | $d_7 = 0.1813$ | | |
| $r_8 = 4.3329$ | | | |
| | $d_8 = 1.1178$ | $n_5 = 1.60311$ | $\nu_5 = 60.70$ |
| $r_9 = -1.2674$ | | | |
| | $d_9 = 0.2417$ | $n_6 = 1.84666$ | $\nu_6 = 23.78$ |
| $r_{10} = -1.8784$ | | | |
| | $d_{10} = 0.3021$ | | |
| $r_{11} = -1.2270$ | | | |
| | $d_{11} = 0.3625$ | $n_7 = 1.84666$ | $\nu_7 = 23.78$ |
| $r_{12} = -5.7567$ | | | |
| | $d_{12} = 0.1631$ | | |
| $r_{13} = 6.2536$ | | | |
| | $d_{13} = 0.6586$ | $n_8 = 1.65160$ | $\nu_8 = 58.52$ |
| $r_{14} = -3.4067$ | | | | aspherical coefficient
$E = 0.17732$, $F = -0.51470 \times 10^{-2}$, $p = 1$
$|R_1| = 0.4713$, $\Delta K = 0.060$ $\left|\dfrac{K_I - K_{0.5}}{K_{0.5}}\right| = 0.090$, $|\cos\omega_I - \cos\omega_{0.5}| = 0.136$ $h_1/I_{max} = 0.579$, $|R_{min}| = 0.4713$, $f_2 = 1.757$
$\tan\alpha = 0.3070$, $\tan\omega_1 = 0.748$

Embodiment 14
$f = 1.000$, F/6.564, $2\omega = 74.77°$
$IH = 0.6718$, object distance $= -16.3845$

| | | | |
|---|---|---|---|
| $r_1 = \infty$ | | | |
| | $d_1 = 0.1638$ | $n_1 = 1.76900$ | $\nu_1 = 64.15$ |
| $r_2 = \infty$ | | | |
| | $d_2 = 0.1092$ | | |
| $r_3 = 3.8668$ (aspherical surface) | | | |
| | $d_3 = 0.2731$ | $n_2 = 1.80610$ | $\nu_2 = 40.95$ |
| $r_4 = 0.4260$ | | | |
| | $d_4 = 0.2185$ | | |
| $r_5 = \infty$ | | | |
| | $d_5 = 0.8806$ | $n_3 = 1.80610$ | $\nu_3 = 40.95$ |
| $r_6 = \infty$ (stop) | | | |
| | $d_6 = 1.9593$ | $n_4 = 1.80610$ | $\nu_4 = 40.95$ |
| $r_7 = -1.7675$ | | | |
| | $d_7 = 0.1638$ | | |
| $r_8 = 2.7768$ | | | |
| | $d_8 = 1.0923$ | $n_5 = 1.60311$ | $\nu_5 = 60.70$ |
| $r_9 = -0.9650$ | | | |
| | $d_9 = 0.2185$ | $n_6 = 1.84666$ | $\nu_6 = 23.78$ |

-continued

| | | | |
|---|---|---|---|
| $r_{10} = -1.5214$ | | | |
| | $d_{10} = 0.9508$ | | |
| $r_{11} = -0.5796$ | | | |
| | $d_{11} = 0.3277$ | $n_7 = 1.78472$ | $\nu_7 = 25.77$ |
| $r_{12} = \infty$ | | | |
| | $d_{12} = 0.6881$ | $n_8 = 1.69680$ | $\nu_8 = 55.52$ |
| $r_{13} = -1.0103$ | | | | aspherical coefficient
$E = 0.15361$, $F = 0.49078 \times 10^{-5}$, $p = 1$
$|R_1| = 0.426$, $\Delta K = 0.075$ $\left|\dfrac{K_I - K_{0.5}}{K_{0.5}}\right| = 0.128$, $|\cos\omega_I - \cos\omega_{0.5}| = 0.154$ $h_1/I_{max} = 0.503$, $|R_{min}| = 0.426$, $f_2 = 2.036$
$\tan\alpha = 0.1113$, $\tan\omega_1 = 0.764$

Embodiment 15
$f = 1.000$, F/6.712, $2\omega = 75.37°$
$IH = 0.6751$, object distance $= -16.4654$

| | | | |
|---|---|---|---|
| $r_1 = \infty$ | | | |
| | $d_1 = 0.2195$ | $n_1 = 1.76900$ | $\nu_1 = 64.15$ |
| $r_2 = \infty$ | | | |
| | $d_2 = 0.1098$ | | |
| $r_3 = 2.2137$ (aspherical surface) | | | |
| | $d_3 = 0.2744$ | $n_2 = 1.80610$ | $\nu_2 = 40.95$ |
| $r_4 = 0.4281$ | | | |
| | $d_4 = 0.2195$ | | |
| $r_5 = \infty$ | | | |
| | $d_5 = 0.7695$ | $n_3 = 1.80610$ | $\nu_3 = 40.95$ |
| $r_6 = \infty$ (stop) | | | |
| | $d_6 = 2.0845$ | $n_4 = 1.80610$ | $\nu_4 = 40.95$ |
| $r_7 = -1.2562$ | | | |
| | $d_7 = 0.1647$ | | |
| $r_8 = 1.9566$ | | | |
| | $d_8 = 1.0154$ | $n_5 = 1.60311$ | $\nu_5 = 60.70$ |
| $r_9 = -0.9929$ | | | |
| | $d_9 = 0.2195$ | $n_6 = 1.84666$ | $\nu_6 = 23.78$ |
| $r_{10} = -4.8679$ | | | |
| | $d_{10} = 0.2744$ | | |
| $r_{11} = -0.8676$ | | | |
| | $d_{11} = 0.3293$ | $n_7 = 1.84666$ | $\nu_7 = 23.78$ |
| $r_{12} = -33.1108$ | | | |
| | $d_{12} = 0.1482$ | | |
| $r_{13} = 1.8412$ | | | |
| | $d_{13} = 0.5982$ | $n_8 = 1.65160$ | $\nu_8 = 58.52$ |
| $r_{14} = -2.9468$ | | | | aspherical coefficient
$E = 0.23287$, $F = -0.83235 \times 10^{-2}$, $p = 1$
$|R_1| = 0.4281$, $\Delta K = 0.067$ $\left|\dfrac{K_I - K_{0.5}}{K_{0.5}}\right| = 0.106$, $|\cos\omega_I - \cos\omega_{0.5}| = 0.153$ $h_1/I_{max} = 0.547$, $|R_{min}| = 0.4281$, $f_2 = 1.535$
$\tan\alpha = 0.2159$, $\tan\omega_1 = 0.772$

Embodiment 16
$f = 1.000$, F/6.062, $2\omega = 93.65°$
$IH = 1.0191$, object distance $= -24.8550$

| | | | |
|---|---|---|---|
| $r_1 = \infty$ | | | |
| | $d_1 = 0.2486$ | $n_1 = 1.76900$ | $\nu_1 = 64.15$ |
| $r_2 = \infty$ | | | |
| | $d_2 = 0.1657$ | | |
| $r_3 = 3.2886$ (aspherical surface) | | | |
| | $d_3 = 0.4143$ | $n_2 = 1.80610$ | $\nu_2 = 40.95$ |
| $r_4 = 0.5513$ | | | |
| | $d_4 = 0.3314$ | | |
| $r_5 = \infty$ | | | |
| | $d_5 = 1.3523$ | $n_3 = 1.80610$ | $\nu_3 = 40.95$ |
| $r_6 = \infty$ (stop) | | | |
| | $d_6 = 2.9559$ | $n_4 = 1.80610$ | $\nu_4 = 40.95$ |
| $r_7 = -1.7553$ | | | |
| | $d_7 = 0.2486$ | | |
| $r_8 = 76.0049$ | | | |

-continued

| | | | |
|---|---|---|---|
| $r_9 = -1.1701$ | $d_8 = 1.2428$ | $n_5 = 1.60311$ | $\nu_5 = 60.70$ |
| $r_{10} = -3.0256$ | $d_9 = 0.3314$ | $n_6 = 1.84666$ | $\nu_6 = 23.78$ |
| $r_{11} = -10.0965$ | $d_{10} = 0.6628$ | | |
| $r_{12} = \infty$ | $d_{11} = 0.4971$ | $n_7 = 1.78472$ | $\nu_7 = 25.68$ |
| $r_{13} = -5.9017$ | $d_{12} = 1.0439$ | $n_8 = 1.69680$ | $\nu_8 = 55.52$ | aspherical coefficient
$E = 0.10046$, $F = 0.68773 \times 10^{-6}$, $p = 1$
$|R_1| = 0.5513$, $\Delta K = 0.074$ $$\left|\frac{K_I - K_{0.5}}{K_{0.5}}\right| = 0.121, \quad |\cos\omega_I - \cos\omega_{0.5}| = 0.200$$

$h_1/I_{max} = 0.724$, $|R_{min}| = 0.5513$, $f_2 = 2.266$
$\tan\alpha = 0.3913$, $\tan\omega_1 = 1.066$

Embodiment 17
$f = 1.000$, $F/6.396$, $2\omega = 68°$
$IH = 0.65$, object distance $= -8.9659$

| | | | |
|---|---|---|---|
| $r_1 = \infty$ | $d_1 = 0.1195$ | $n_1 = 1.76900$ | $\nu_1 = 64.15$ |
| $r_2 = \infty$ | $d_2 = 0.0598$ | | |
| $r_3 = 7.6111$ (aspherical surface) | $d_3 = 0.3885$ | $n_2 = 1.78472$ | $\nu_2 = 25.71$ |
| $r_4 = \infty$ | $d_4 = 0.1195$ | $n_3 = 1.58144$ | $\nu_3 = 40.75$ |
| $r_5 = 0.3752$ | $d_5 = 0.2391$ | | |
| $r_6 = \infty$ | $d_6 = 0.7553$ | $n_4 = 1.80610$ | $\nu_4 = 40.95$ |
| $r_7 = \infty$ (stop) | $d_7 = 2.0420$ | $n_5 = 1.80610$ | $\nu_5 = 40.95$ |
| $r_8 = -1.2914$ | $d_8 = 0.0897$ | | |
| $r_9 = 2.4782$ | $d_9 = 0.8966$ | $n_6 = 1.60311$ | $\nu_6 = 60.70$ |
| $r_{10} = -0.9432$ | $d_{10} = 0.2989$ | $n_7 = 1.84666$ | $\nu_7 = 23.88$ |
| $r_{11} = -4.1375$ | $d_{11} = 0.8458$ | | |
| $r_{12} = -0.8129$ | $d_{12} = 0.2989$ | $n_8 = 1.58144$ | $\nu_8 = 40.75$ |
| $r_{13} = \infty$ | $d_{13} = 0.6874$ | $n_9 = 1.60311$ | $\nu_9 = 60.70$ |
| $r_{14} = -1.1904$ | | | | aspherical coefficient
$E = 0.19416$, $p = 1$
$|R_1| = 0.3752$, $\Delta K = 0.032$ $$\left|\frac{K_I - K_{0.5}}{K_{0.5}}\right| = 0.055, \quad |\cos\omega_I - \cos\omega_{0.5}| = 0.121$$

$h_1/I_{max} = 1.005$, $|R_{min}| = 0.3752$, $f_2 = 1.826$
$\tan\alpha = 0.1223$, $\tan\omega_1 = 0.675$

Embodiment 18
$f = 1.000$, $F/6.449$, $2\omega = 68°$
$IH = 0.65$, object distance $= -9.0009$

| | | | |
|---|---|---|---|
| $r_1 = \infty$ | $d_1 = 0.1200$ | $n_1 = 1.76900$ | $\nu_1 = 64.15$ |
| $r_2 = \infty$ | $d_2 = 0.0600$ | | |
| $r_3 = 2.4002$ (aspherical surface) | $d_3 = 0.3900$ | $n_2 = 1.78472$ | $\nu_2 = 25.71$ |
| $r_4 = \infty$ | $d_4 = 0.1200$ | $n_3 = 1.58144$ | $\nu_3 = 40.75$ |
| $r_5 = 0.2856$ | $d_5 = 0.2400$ | | |
| $r_6 = \infty$ | $d_6 = 0.7583$ | $n_4 = 1.80610$ | $\nu_4 = 40.95$ |
| $r_7 = \infty$ (stop) | $d_7 = 2.0500$ | $n_5 = 1.80610$ | $\nu_5 = 40.95$ |
| $r_8 = -1.2964$ | | | |

-continued

| | | | |
|---|---|---|---|
| $r_9 = 2.4878$ | $d_8 = 0.0900$ | | |
| $r_{10} = -0.9469$ | $d_9 = 0.9001$ | $n_6 = 1.60311$ | $\nu_6 = 60.70$ |
| $r_{11} = -4.1536$ | $d_{10} = 0.3000$ | $n_7 = 1.84666$ | $\nu_7 = 23.88$ |
| $r_{12} = -0.8161$ | $d_{11} = 0.8491$ | | |
| $r_{13} = \infty$ | $d_{12} = 0.3000$ | $n_8 = 1.58144$ | $\nu_8 = 40.75$ |
| $r_{14} = -1.1950$ | $d_{13} = 0.6901$ | $n_9 = 1.60311$ | $\nu_9 = 60.70$ | aspherical coefficient
$F = 0.45780$, $p = 1$
$|R_1| = 0.2856$, $\Delta K = 0.027$ $$\left|\frac{K_I - K_{0.5}}{K_{0.5}}\right| = 0.041, \quad |\cos\omega_I - \cos\omega_{0.5}| = 0.119$$

$h_1/I_{max} = 1.238$, $|R_{min}| = 0.2856$, $f_2 = 1.833$
$\tan\alpha = 0.1010$, $\tan\omega_1 = 0.675$

Embodiment 19
$f = 1.000$, $F/4.966$, $2\omega = 69.886°$
$IH = 0.6431$, object distance $= -8.8496$

| | | | |
|---|---|---|---|
| $r_1 = \infty$ | $d_1 = 0.0885$ | $n_1 = 1.76900$ | $\nu_1 = 64.15$ |
| $r_2 = \infty$ | $d_2 = 0.0590$ | | |
| $r_3 = 4.8865$ (aspherical surface) | $d_3 = 0.3835$ | $n_2 = 1.78472$ | $\nu_2 = 25.71$ |
| $r_4 = \infty$ | $d_4 = 0.1180$ | $n_3 = 1.58144$ | $\nu_3 = 40.75$ |
| $r_5 = 0.3540$ | $d_5 = 0.2360$ | | |
| $r_6 = \infty$ | $d_6 = 0.7563$ | $n_4 = 1.80610$ | $\nu_4 = 40.95$ |
| $r_7 = \infty$ (stop) | $d_7 = 2.0048$ | $n_5 = 1.80610$ | $\nu_5 = 40.95$ |
| $r_8 = -1.2746$ | $d_8 = 0.0885$ | | |
| $r_9 = 2.4460$ | $d_9 = 0.8850$ | $n_6 = 1.60311$ | $\nu_6 = 60.70$ |
| $r_{10} = -0.9310$ | $d_{10} = 0.2950$ | $n_7 = 1.84666$ | $\nu_7 = 23.88$ |
| $r_{11} = -4.0838$ | $d_{11} = 0.8348$ | | |
| $r_{12} = -0.8024$ | $d_{12} = 0.2950$ | $n_8 = 1.58144$ | $\nu_8 = 40.75$ |
| $r_{13} = \infty$ | $d_{13} = 0.6785$ | $n_9 = 1.60311$ | $\nu_9 = 60.70$ |
| $r_{14} = -1.1749$ | $d_{14} = 2.0649$ | | |
| $r_{15} = 5.5838$ | $d_{15} = 12.8909$ | $n_{10} = 1.62004$ | $\nu_{10} = 36.25$ |
| $r_{16} = \infty$ | $d_{16} = 0.7611$ | | |
| $r_{17} = 4.1673$ | $d_{17} = 0.2950$ | $n_{11} = 1.80610$ | $\nu_{11} = 40.95$ |
| $r_{18} = 1.9038$ | $d_{18} = 0.8850$ | $n_{12} = 1.65160$ | $\nu_{12} = 58.52$ |
| $r_{19} = -7.4569$ | $d_{19} = 0.5310$ | | |
| $r_{20} = \infty$ | $d_{20} = 12.8909$ | $n_{13} = 1.62004$ | $\nu_{13} = 36.25$ |
| $r_{21} = -5.5838$ | $d_{21} = 2.3599$ | | |
| $r_{22} = 5.5838$ | $d_{22} = 12.8909$ | $n_{14} = 1.62004$ | $\nu_{14} = 36.25$ |
| $r_{23} = \infty$ | $d_{23} = 0.7611$ | | |
| $r_{24} = 4.1673$ | $d_{24} = 0.2950$ | $n_{15} = 1.80610$ | $\nu_{15} = 40.95$ |
| $r_{25} = 1.9038$ | $d_{25} = 0.8850$ | $n_{16} = 1.65160$ | $\nu_{16} = 58.52$ |
| $r_{26} = -7.4569$ | $d_{26} = 0.5310$ | | |
| $r_{27} = \infty$ | $d_{27} = 12.8909$ | $n_{17} = 1.62004$ | $\nu_{17} = 36.25$ |
| $r_{28} = -5.5838$ | | | |

-continued

| | | | |
|---|---|---|---|
| $r_{29} = 5.5838$ | $d_{28} = 2.3599$ | | |
| | $d_{29} = 12.8909$ | $n_{18} = 1.62004$ | $\nu_{18} = 36.25$ |
| $r_{30} = \infty$ | $d_{30} = 0.7611$ | | |
| $r_{31} = 4.1673$ | $d_{31} = 0.2950$ | $n_{19} = 1.80610$ | $\nu_{19} = 40.95$ |
| $r_{32} = 1.9038$ | $d_{32} = 0.8850$ | $n_{20} = 1.65160$ | $\nu_{20} = 58.52$ |
| $r_{33} = -7.4569$ | $d_{33} = 0.5310$ | | |
| $r_{34} = \infty$ | $d_{34} = 12.8909$ | $n_{21} = 1.62004$ | $\nu_{21} = 36.25$ |
| $r_{35} = -4.1673$ | | | |

Embodiment 20
$f = 1.000$, $F/6.385$, $2\omega = 70.314°$
$IH = 0.7089$

| | | | |
|---|---|---|---|
| $r_1 = \infty$ | $d_1 = 0.2305$ | $n_1 = 1.76900$ | $\nu_1 = 64.15$ |
| $r_2 = \infty$ | $d_2 = 0.1153$ | | |
| $r_3 = 2.1028$ (aspherical surface) | | | |
| | $d_3 = 0.2882$ | $n_2 = 1.80610$ | $\nu_2 = 40.95$ |
| $r_4 = 0.4496$ | $d_4 = 0.2305$ | | |
| $r_5 = \infty$ | $d_5 = 0.7927$ | $n_3 = 1.80610$ | $\nu_3 = 40.95$ |
| $r_6 = \infty$ (stop) | $d_6 = 2.2045$ | $n_4 = 1.80610$ | $\nu_4 = 40.95$ |
| $r_7 = -1.2922$ | $d_7 = 0.1729$ | | |
| $r_8 = 2.8519$ | $d_8 = 1.0663$ | $n_5 = 1.60311$ | $\nu_5 = 60.70$ |
| $r_9 = -1.0767$ | $d_9 = 0.2305$ | $n_6 = 1.84666$ | $\nu_6 = 23.78$ |
| $r_{10} = -3.0726$ | $d_{10} = 0.2882$ | | |
| $r_{11} = -0.9798$ | $d_{11} = 0.3458$ | $n_7 = 1.84666$ | $\nu_7 = 23.78$ |
| $r_{12} = -9.2888$ | $d_{12} = 0.1556$ | | |
| $r_{13} = 2.6974$ | $d_{13} = 0.6282$ | $n_8 = 1.65160$ | $\nu_8 = 58.67$ |
| $r_{14} = -2.6974$ | $d_{14} = 2.5533$ | | |
| $r_{15} = 6.8830$ | $d_{15} = 14.9914$ | $n_9 = 1.62004$ | $\nu_9 = 36.25$ |
| $r_{16} = \infty$ | $d_{16} = 1.4525$ | | |
| $r_{17} = 4.6340$ | $d_{17} = 0.9280$ | $n_{10} = 1.80610$ | $\nu_{10} = 40.95$ |
| $r_{18} = 2.0749$ | $d_{18} = 1.5447$ | $n_{11} = 1.65160$ | $\nu_{11} = 58.67$ |
| $r_{19} = -9.4871$ | $d_{19} = 0.6801$ | | |
| $r_{20} = \infty$ | $d_{20} = 14.9914$ | $n_{12} = 1.62004$ | $\nu_{12} = 36.25$ |
| $r_{21} = -6.8830$ | $d_{21} = 2.3055$ | | |
| $r_{22} = 6.8830$ | $d_{22} = 14.9914$ | $n_{13} = 1.62004$ | $\nu_{13} = 36.25$ |
| $r_{23} = \infty$ | $d_{23} = 1.4525$ | | |
| $r_{24} = 4.6340$ | $d_{24} = 0.9280$ | $n_{14} = 1.80610$ | $\nu_{14} = 40.95$ |
| $r_{25} = 2.0749$ | $d_{25} = 1.5447$ | $n_{15} = 1.65160$ | $\nu_{15} = 58.67$ |
| $r_{26} = -9.4871$ | $d_{26} = 0.6801$ | | |
| $r_{27} = \infty$ | $d_{27} = 14.9914$ | $n_{16} = 1.62004$ | $\nu_{16} = 36.25$ |
| $r_{28} = -6.8830$ | $d_{28} = 2.3055$ | | |
| $r_{29} = 6.8830$ | $d_{29} = 14.9914$ | $n_{17} = 1.62004$ | $\nu_{17} = 36.25$ |
| $r_{30} = \infty$ | $d_{30} = 1.4525$ | | |
| $r_{31} = 4.6340$ | $d_{31} = 0.9280$ | $n_{18} = 1.80610$ | $\nu_{18} = 40.95$ |
| $r_{32} = 2.0749$ | | | |

-continued

| | | | |
|---|---|---|---|
| | $d_{32} = 1.5447$ | $n_{19} = 1.65160$ | $\nu_{19} = 58.67$ |
| $r_{33} = -9.4871$ | $d_{33} = 0.6801$ | | |
| $r_{34} = \infty$ | $d_{34} = 14.9914$ | $n_{20} = 1.62004$ | $\nu_{20} = 36.25$ |
| $r_{35} = -6.8830$ | $d_{35} = 2.3055$ | | |
| $r_{36} = 6.8830$ | $d_{36} = 14.9914$ | $n_{21} = 1.62004$ | $\nu_{21} = 36.25$ |
| $r_{37} = \infty$ | $d_{37} = 1.4525$ | | |
| $r_{38} = 4.6340$ | $d_{38} = 0.9280$ | $n_{22} = 1.80610$ | $\nu_{22} = 40.95$ |
| $r_{39} = 2.0749$ | $d_{39} = 1.5447$ | $n_{23} = 1.65160$ | $\nu_{23} = 58.67$ |
| $r_{40} = -9.4871$ | $d_{40} = 0.6801$ | | |
| $r_{41} = \infty$ | $d_{41} = 14.9914$ | $n_{24} = 1.62004$ | $\nu_{24} = 36.25$ |
| $r_{42} = -6.8830$ | $d_{42} = 2.3055$ | | |
| $r_{43} = 6.8830$ | $d_{43} = 14.9914$ | $n_{25} = 1.62004$ | $\nu_{25} = 36.25$ |
| $r_{44} = \infty$ | $d_{44} = 1.4525$ | | |
| $r_{45} = 4.6340$ | $d_{45} = 0.9280$ | $n_{26} = 1.80610$ | $\nu_{26} = 40.95$ |
| $r_{46} = 2.0749$ | $d_{46} = 1.5447$ | $n_{27} = 1.65160$ | $\nu_{27} = 58.67$ |
| $r_{47} = -9.4871$ | $d_{47} = 0.6801$ | | |
| $r_{48} = \infty$ | $d_{48} = 14.4150$ | $n_{28} = 1.62004$ | $\nu_{28} = 36.25$ |
| $r_{49} = \infty$ | $d_{49} = 0.5764$ | $n_{29} = 1.62004$ | $\nu_{29} = 36.25$ |
| $r_{50} = -18.2640$ | | | |

Embodiment 21
$f = 4.330$, $F/5.69$, $2\omega = 80.4°$
$IH = 1.712$, object distance = 50

| | | | |
|---|---|---|---|
| $r_1 = 7.5850$ (aspherical surface) | | | |
| | $d_1 = 1.0000$ | $n_1 = 1.78471$ | $\nu_1 = 25.71$ |
| $r_2 = 1.9040$ | $d_2 = 1.2000$ | | |
| $r_3 = \infty$ | $d_3 = 6.7000$ | $n_2 = 1.80610$ | $\nu_2 = 40.95$ |
| $r_4 = \infty$ | $d_4 = 8.0000$ | $n_3 = 1.80610$ | $\nu_3 = 40.95$ |
| $r_5 = -7.1300$ | $d_5 = 2.0000$ | | |
| $r_6 = 9.1560$ | $d_6 = 5.0000$ | $n_4 = 1.51633$ | $\nu_4 = 64.15$ |
| $r_7 = -6.0310$ | $d_7 = 1.5000$ | $n_5 = 1.84666$ | $\nu_5 = 23.78$ |
| $r_8 = -95.7310$ | $d_8 = 3.0000$ | | |
| $r_9 = 29.4330$ | $d_9 = 5.0000$ | $n_6 = 1.51633$ | $\nu_6 = 64.15$ |
| $r_{10} = \infty$ | $d_{10} = 13.0000$ | $n_7 = 1.51633$ | $\nu_7 = 64.15$ |
| $r_{11} = -40.9980$ | $d_{11} = 44.0000$ | | |
| $r_{12} = 37.6000$ | $d_{12} = 4.5110$ | $n_8 = 1.51009$ | $\nu_8 = 63.46$ |
| $r_{13} = -14.9830$ | $d_{13} = 2.0000$ | $n_9 = 1.74950$ | $\nu_9 = 35.27$ |
| $r_{14} = -33.7510$ | $d_{14} = 25.6200$ | | |
| $r_{15} = \infty$ (stop) | $d_{15} = 25.6200$ | | |
| $r_{16} = 33.7510$ | $d_{16} = 2.0000$ | $n_{10} = 1.74950$ | $\nu_{10} = 35.27$ |
| $r_{17} = 14.9830$ | $d_{17} = 4.5110$ | $n_{11} = 1.51009$ | $\nu_{11} = 63.46$ |
| $r_{18} = -37.6000$ | $d_{18} = 40.9500$ | | |
| $r_{19} = 55.0600$ | $d_{19} = 22.3000$ | $n_{12} = 1.51633$ | $\nu_{12} = 64.15$ |
| $r_{20} = -55.0600$ | $d_{20} = 40.9500$ | | |
| $r_{21} = 37.6000$ | | | |

-continued

| | | | |
|---|---|---|---|
| $r_{22} = -14.9830$ | $d_{21} = 4.5110$ | $n_{13} = 1.51009$ | $\nu_{13} = 63.46$ |
| $r_{23} = -33.7510$ | $d_{22} = 2.0000$ | $n_{14} = 1.74950$ | $\nu_{14} = 35.27$ |
| $r_{24} = 33.7510$ | $d_{23} = 51.2400$ | | |
| $r_{25} = 14.9830$ | $d_{24} = 2.0000$ | $n_{15} = 1.74950$ | $\nu_{15} = 35.27$ |
| $r_{26} = -37.6000$ | $d_{25} = 4.5110$ | $n_{16} = 1.51009$ | $\nu_{16} = 63.46$ |
| $r_{27} = 57.4060$ | $d_{26} = 72.9351$ | | |
| $r_{28} = 16.3250$ | $d_{27} = 1.0000$ | $n_{17} = 1.80518$ | $\nu_{17} = 25.43$ |
| $r_{29} = -21.9620$ | $d_{28} = 4.5000$ | $n_{18} = 1.66998$ | $\nu_{18} = 39.27$ | aspherical coefficient
$P = -7.0000, \quad E = 0.62003 \times 10^{-2}$
$F = -0.77437 \times 10^{-4}$ $|R_1/f| = 0.439, \quad \left|\dfrac{K_I - K_{0.5}}{K_{0.5}}\right| = 0.106$ $|\cos \omega_I - \cos \omega_{0.5}| = 0.158$
$h_1/I_{max} = 0.493, \quad f_2/f = 1.664$
$|R_{min}|/f = 0.439, \quad \tan \alpha = 0.3115,$
$\tan \omega_1 = 0.846, \quad d/I_{max} = 4.58$

Embodiment 22
$f = 4.330, \quad F/5.69, \quad 2\omega = 80.2°$
$IH = 1.708, \quad$ object distance = 50

| | | | |
|---|---|---|---|
| $r_1 = 7.5850$ (aspherical surface) | $d_1 = 1.0000$ | $n_1 = 1.78471$ | $\nu_1 = 25.71$ |
| $r_2 = 1.9040$ | $d_2 = 1.2000$ | | |
| $r_3 = \infty$ | $d_3 = 6.7000$ | $n_2 = 1.80610$ | $\nu_2 = 40.95$ |
| $r_4 = \infty$ | $d_4 = 8.0000$ | $n_3 = 1.80610$ | $\nu_3 = 40.95$ |
| $r_5 = -7.1302$ | $d_5 = 2.0000$ | | |
| $r_6 = 9.1562$ | $d_6 = 5.0000$ | $n_4 = 1.51633$ | $\nu_4 = 64.15$ |
| $r_7 = -6.0314$ | $d_7 = 1.5000$ | $n_5 = 1.84666$ | $\nu_5 = 23.78$ |
| $r_8 = -95.7314$ | $d_8 = 3.0000$ | | |
| $r_9 = 29.4333$ | $d_9 = 5.0000$ | $n_6 = 1.51680$ | $\nu_6 = 64.14$ |
| $r_{10} = \infty$ | $d_{10} = 13.0000$ | $n_7 = 1.51680$ | $\nu_7 = 64.14$ |
| $r_{11} = -40.9983$ | $d_{11} = 44.0005$ | | |
| $r_{12} = 36.5571$ | $d_{12} = 4.5110$ | $n_8 = 1.50657$ | $\nu_8 = 61.94$ |
| $r_{13} = -14.7648$ | $d_{13} = 2.0000$ | $n_9 = 1.74950$ | $\nu_9 = 35.27$ |
| $r_{14} = -33.5416$ | $d_{14} = 25.6200$ | | |
| $r_{15} = \infty$ (stop) | $d_{15} = 25.6200$ | | |
| $r_{16} = 33.5416$ | $d_{16} = 2.0000$ | $n_{10} = 1.74950$ | $\nu_{10} = 35.27$ |
| $r_{17} = 14.7648$ | $d_{17} = 4.5110$ | $n_{11} = 1.50657$ | $\nu_{11} = 61.94$ |
| $r_{18} = -36.5571$ | $d_{18} = 40.9500$ | | |
| $r_{19} = 54.9614$ | $d_{19} = 22.3000$ | $n_{12} = 1.51680$ | $\nu_{12} = 64.14$ |
| $r_{20} = -54.9614$ | $d_{20} = 40.9500$ | | |
| $r_{21} = 36.5571$ | $d_{21} = 4.5110$ | $n_{13} = 1.50657$ | $\nu_{13} = 61.94$ |
| $r_{22} = -14.7648$ | $d_{22} = 2.0000$ | $n_{14} = 1.74950$ | $\nu_{14} = 35.27$ |
| $r_{23} = -33.5416$ | $d_{23} = 51.2400$ | | |
| $r_{24} = 33.5416$ | $d_{24} = 2.0000$ | $n_{15} = 1.74950$ | $\nu_{15} = 35.27$ |
| $r_{25} = 14.7648$ | $d_{25} = 4.5110$ | $n_{16} = 1.50657$ | $\nu_{16} = 61.94$ |
| $r_{26} = -36.5571$ | $d_{26} = 73.4215$ | | |
| $r_{27} = 57.4059$ | $d_{27} = 1.0000$ | $n_{17} = 1.80518$ | $\nu_{17} = 25.43$ |
| $r_{28} = 16.3253$ | $d_{28} = 4.5000$ | $n_{18} = 1.66998$ | $\nu_{18} = 39.27$ |
| $r_{29} = -21.9615$ | | | | aspherical coefficient
$P = -7.0000, \quad E = 0.62003 \times 10^{-2}$
$F = -0.77437 \times 10^{-4}$ $|R_1/f| = 0.439, \quad \left|\dfrac{K_I - K_{0.5}}{K_{0.5}}\right| = 0.106$ $|\cos \omega_1 - \cos \omega_{0.5}| = 0.157$
$h_1/I_{max} = 0.494, \quad f_2/f = 1.664$
$R_{min}/f = 0.439, \quad \tan \alpha = 0.3103$
$\tan \omega_1 = 0.842, \quad d/I_{max} = 4.60$

Embodiment 23
$f = 4.330, \quad F/5.69, \quad 2\omega = 81.80°$
$IH = 1.742, \quad$ object distance = 50

| | | | |
|---|---|---|---|
| $r_1 = 7.5850$ (aspherical surface) | $d_1 = 1.0000$ | $n_1 = 1.78471$ | $\nu_1 = 25.71$ |
| $r_2 = 1.9040$ | $d_2 = 1.2000$ | | |
| $r_3 = \infty$ | $d_3 = 6.7000$ | $n_2 = 1.80610$ | $\nu_2 = 40.95$ |
| $r_4 = \infty$ | $d_4 = 8.0000$ | $n_3 = 1.80610$ | $\nu_3 = 40.95$ |
| $r_5 = -7.1302$ | $d_5 = 2.0000$ | | |
| $r_6 = 9.1562$ | $d_6 = 5.0000$ | $n_4 = 1.51633$ | $\nu_4 = 64.15$ |
| $r_7 = -6.0314$ | $d_7 = 1.5000$ | $n_5 = 1.84666$ | $\nu_5 = 23.78$ |
| $r_8 = -95.7314$ | $d_8 = 3.0000$ | | |
| $r_9 = 29.4333$ | $d_9 = 5.0000$ | $n_6 = 1.51680$ | $\nu_6 = 64.14$ |
| $r_{10} = \infty$ | $d_{10} = 13.0000$ | $n_7 = 1.51680$ | $\nu_7 = 64.14$ |
| $r_{11} = -40.9983$ | $d_{11} = 44.0005$ | | |
| $r_{12} = 38.1046$ | $d_{12} = 4.5110$ | $n_8 = 1.51633$ | $\nu_8 = 64.15$ |
| $r_{13} = -14.7435$ | $d_{13} = 2.0000$ | $n_9 = 1.74950$ | $\nu_9 = 35.27$ |
| $r_{14} = -34.0380$ | $d_{14} = 25.6200$ | | |
| $r_{15} = \infty$ (stop) | $d_{15} = 25.6200$ | | |
| $r_{16} = 34.0380$ | $d_{16} = 2.0000$ | $n_{10} = 1.74950$ | $\nu_{10} = 35.27$ |
| $r_{17} = 14.7435$ | $d_{17} = 4.5110$ | $n_{11} = 1.51633$ | $\nu_{11} = 64.15$ |
| $r_{18} = -38.1046$ | $d_{18} = 40.9500$ | | |
| $r_{19} = 54.8163$ | $d_{19} = 22.3000$ | $n_{12} = 1.51680$ | $\nu_{12} = 64.14$ |
| $r_{20} = -54.8163$ | $d_{20} = 40.9500$ | | |
| $r_{21} = 38.1046$ | $d_{21} = 4.5110$ | $n_{13} = 1.51633$ | $\nu_{13} = 64.15$ |
| $r_{22} = -14.7435$ | $d_{22} = 2.0000$ | $n_{14} = 1.74950$ | $\nu_{14} = 35.27$ |
| $r_{23} = -34.0380$ | $d_{23} = 51.2400$ | | |
| $r_{24} = 34.0380$ | $d_{24} = 2.0000$ | $n_{15} = 1.74950$ | $\nu_{15} = 35.27$ |
| $r_{25} = 14.7435$ | $d_{25} = 4.5110$ | $n_{16} = 1.51633$ | $\nu_{16} = 64.15$ |
| $r_{26} = -38.1046$ | $d_{26} = 74.1754$ | | |
| $r_{27} = 545508$ | $d_{27} = 1.0000$ | $n_{17} = 1.80518$ | $\nu_{17} = 25.43$ |
| $r_{28} = 16.8816$ | $d_{28} = 4.5000$ | $n_{18} = 1.65128$ | $\nu_{18} = 38.25$ |
| $r_{29} = -22.0046$ | | | |

-continued aspherical coefficient
P = −7.0000, E = 0.62003 × 10$^{-2}$
F = −0.77437 × 10$^{-4}$ $|R_1/f| = 0.439$, $\left|\dfrac{K_I - K_{0.5}}{K_{0.5}}\right| = 0.111$ $|\cos \omega_I - \cos \omega_{0.5}| = 0.162$
$h_1/I_{max} = 0.491$, $f_2/f = 1.664$
$|R_{min}|/f = 0.439$, $\tan \alpha = 0.3200$
$\tan \omega_1 = 0.866$, $d/I_{max} = 4.48$

Embodiment 24

$f = 4.330$, $F/5.69$, $2\omega = 80.0°$
$IH = 1.700$, object distance = 50

| | | | |
|---|---|---|---|
| $r_1 = 7.5850$ (aspherical surface) | | | |
| $r_2 = 1.9040$ | $d_1 = 1.0000$ | $n_1 = 1.78471$ | $\nu_1 = 25.71$ |
| $r_3 = \infty$ | $d_2 = 1.2000$ | | |
| $r_4 = \infty$ | $d_3 = 6.7000$ | $n_2 = 1.80610$ | $\nu_2 = 40.95$ |
| $r_5 = -7.1302$ | $d_4 = 8.0000$ | $n_3 = 1.80610$ | $\nu_3 = 40.95$ |
| $r_6 = 9.1562$ | $d_5 = 2.0000$ | | |
| $r_7 = -6.0314$ | $d_6 = 5.0000$ | $n_4 = 1.51633$ | $\nu_4 = 64.15$ |
| $r_8 = -95.7314$ | $d_7 = 1.5000$ | $n_5 = 1.84666$ | $\nu_5 = 23.78$ |
| $r_9 = 29.4333$ | $d_8 = 3.0000$ | | |
| $r_{10} = \infty$ | $d_9 = 5.0000$ | $n_6 = 1.51680$ | $\nu_6 = 64.14$ |
| $r_{11} = -40.9983$ | $d_{10} = 13.0000$ | $n_7 = 1.51680$ | $\nu_7 = 64.14$ |
| $r_{12} = 42.4824$ | $d_{11} = 44.0005$ | | |
| $r_{13} = -15.1077$ | $d_{12} = 4.5110$ | $n_8 = 1.51633$ | $\nu_8 = 64.15$ |
| $r_{14} = -32.6979$ | $d_{13} = 2.0000$ | $n_9 = 1.74950$ | $\nu_9 = 35.27$ |
| $r_{15} = \infty$ (stop) | $d_{14} = 25.6200$ | | |
| $r_{16} = 32.6979$ | $d_{15} = 25.6200$ | | |
| $r_{17} = 15.1077$ | $d_{16} = 2.0000$ | $n_{10} = 1.74950$ | $\nu_{10} = 35.27$ |
| $r_{18} = -42.4824$ | $d_{17} = 4.5110$ | $n_{11} = 1.51633$ | $\nu_{11} = 64.15$ |
| $r_{19} = 53.3038$ | $d_{18} = 40.9500$ | | |
| $r_{20} = -53.3038$ | $d_{19} = 22.3000$ | $n_{12} = 1.51680$ | $\nu_{12} = 64.14$ |
| $r_{21} = 42.4824$ | $d_{20} = 40.9500$ | | |
| $r_{22} = -15.1077$ | $d_{21} = 4.5110$ | $n_{13} = 1.51633$ | $\nu_{13} = 64.15$ |
| $r_{23} = -32.6979$ | $d_{22} = 2.0000$ | $n_{14} = 1.74950$ | $\nu_{14} = 35.27$ |
| $r_{24} = 32.6979$ | $d_{23} = 51.2400$ | | |
| $r_{25} = 15.1077$ | $d_{24} = 2.0000$ | $n_{15} = 1.74950$ | $\nu_{15} = 35.27$ |
| $r_{26} = -42.4824$ | $d_{25} = 4.5110$ | $n_{16} = 1.51633$ | $\nu_{16} = 64.15$ |
| $r_{27} = 50.5778$ | $d_{26} = 73.3230$ | | |
| $r_{28} = 15.8191$ | $d_{27} = 1.0000$ | $n_{17} = 1.80518$ | $\nu_{17} = 25.43$ |
| $r_{29} = -21.6085$ | $d_{28} = 4.5000$ | $n_{18} = 1.65128$ | $\nu_{18} = 38.25$ | aspherical coefficient
P = −7.0000, E = 0.62003 × 10$^{-2}$
F = −0.77437 × 10$^{-4}$ $|R_1/f| = 0.439$, $\left|\dfrac{K_I - K_{0.5}}{K_{0.5}}\right| = 0.106$ -continued $|\cos \omega_I - \cos \omega_{0.5}| = 0.157$
$h_1/I_{max} = 0.494$, $f_2/f = 1.664$
$|R_{min}|/f = 0.439$, $\tan \alpha = 0.3080$
$\tan \omega_1 = 0.839$, $d/I_{max} = 4.62$

Embodiment 25

$f = 4.093$, $F/5.69$, $2\omega = 79.9°$
$IH = 2.603$, object distance = 50

| | | | |
|---|---|---|---|
| $r_1 = 20.4600$ (aspherical surface) | | | |
| $r_2 = 2.7218$ | $d_1 = 1.0000$ | $n_1 = 1.78471$ | $\nu_1 = 25.71$ |
| $r_3 = \infty$ | $d_2 = 1.2000$ | | |
| $r_4 = -7.6691$ | $d_3 = 15.0000$ | $n_2 = 1.78800$ | $\nu_2 = 47.38$ |
| $r_5 = 24.2126$ | $d_4 = 0.2003$ | | |
| $r_6 = -5.000$ | $d_5 = 4.5000$ | $n_3 = 1.60311$ | $\nu_3 = 60.70$ |
| $r_7 = -18.6930$ | $d_6 = 1.4830$ | $n_4 = 1.84666$ | $\nu_4 = 23.78$ |
| $r_8 = 12.2983$ | $d_7 = 5.6100$ | | |
| $r_9 = \infty$ | $d_8 = 5.0000$ | $n_5 = 1.51680$ | $\nu_5 = 64.14$ |
| $r_{10} = -29.0938$ | $d_9 = 13.0000$ | $n_6 = 1.51680$ | $\nu_6 = 64.14$ |
| $r_{11} = 69.2137$ | $d_{10} = 43.9999$ | | |
| $r_{12} = -14.3232$ | $d_{11} = 4.5110$ | $n_7 = 1.51680$ | $\nu_7 = 64.14$ |
| $r_{13} = -29.8775$ | $d_{12} = 2.0000$ | $n_8 = 1.66446$ | $\nu_8 = 35.81$ |
| $r_{14} = \infty$ (stop) | $d_{13} = 25.6200$ | | |
| $r_{15} = 29.8750$ | $d_{14} = 25.6200$ | | |
| $r_{16} = 14.3232$ | $d_{15} = 2.0000$ | $n_9 = 1.66446$ | $\nu_9 = 35.81$ |
| $r_{17} = -69.2137$ | $d_{16} = 4.5110$ | $n_{10} = 1.51680$ | $\nu_{10} = 64.14$ |
| $r_{18} = 59.9772$ | $d_{17} = 40.9500$ | | |
| $r_{19} = -59.9772$ | $d_{18} = 22.3000$ | $n_{11} = 1.51680$ | $\nu_{11} = 64.14$ |
| $r_{20} = 69.2137$ | $d_{19} = 40.9500$ | | |
| $r_{21} = -14.3232$ | $d_{20} = 4.5110$ | $n_{12} = 1.51680$ | $\nu_{12} = 64.14$ |
| $r_{22} = -29.8775$ | $d_{21} = 2.0000$ | $n_{13} = 1.66446$ | $\nu_{13} = 35.81$ |
| $r_{23} = 29.8750$ | $d_{22} = 51.2400$ | | |
| $r_{24} = 14.3232$ | $d_{23} = 2.0000$ | $n_{14} = 1.66446$ | $\nu_{14} = 35.81$ |
| $r_{25} = -69.2137$ | $d_{24} = 4.5110$ | $n_{15} = 1.51680$ | $\nu_{15} = 64.14$ |
| $r_{26} = 108.6187$ | $d_{25} = 73.5603$ | | |
| $r_{27} = 16.4237$ | $d_{26} = 1.9869$ | $n_{16} = 1.78472$ | $\nu_{16} = 25.71$ |
| $r_{28} = -19.3120$ | $d_{27} = 4.5000$ | $n_{17} = 1.66998$ | $\nu_{17} = 39.27$ | aspherical coefficient
P = −33.9147, E = 0.38319 × 10$^{-2}$
F = −0.77360 × 10$^{-4}$, G = 0.14079 × 10$^{-8}$
L = −0.87328 × 10$^{-28}$ $|R_1/f| = 0.665$, $\left|\dfrac{K_I - K_{0.5}}{K_{0.5}}\right| = 0.020$ $|\cos \omega_I - \cos \omega_{0.5}| = 0.150$
$h_1/I_{max} = 0.761$, $f_2/f = 2.111$
$|R_{min}|/f = 0.665$, $\tan \alpha = 0.3170$
$\tan \omega_1 = 0.838$, $d/I_{max} = 4.74$

Embodiment 26

| f = 4.449, F/5.88, 2ω = 79.6° |
| IH = 1.699, object distance = 50 |

| | |
|---|---|
| $r_1 = 6.3185$ (aspherical surface) | |
| | $d_1 = 1.0000$  $n_1 = 1.78471$  $\nu_1 = 25.71$ |
| $r_2 = 1.9000$ | |
| | $d_2 = 0.9000$ |
| $r_3 = \infty$ | |
| | $d_3 = 6.7000$  $n_2 = 1.80610$  $\nu_2 = 40.95$ |
| $r_4 = \infty$ | |
| | $d_4 = 8.2000$  $n_3 = 1.80610$  $\nu_3 = 40.95$ |
| $r_5 = -7.0109$ | |
| | $d_5 = 2.0000$ |
| $r_6 = 11.8936$ | |
| | $d_6 = 5.0000$  $n_4 = 1.51633$  $\nu_4 = 64.15$ |
| $r_7 = -5.7154$ | |
| | $d_7 = 1.5000$  $n_5 = 1.84666$  $\nu_5 = 23.78$ |
| $r_8 = -28.9737$ | |
| | $d_8 = 3.0000$ |
| $r_9 = 21.4710$ | |
| | $d_9 = 5.0000$  $n_6 = 1.51680$  $\nu_6 = 64.14$ |
| $r_{10} = \infty$ | |
| | $d_{10} = 13.0000$  $n_7 = 1.51680$  $\nu_7 = 64.14$ |
| $r_{11} = -98.0103$ | |
| | $d_{11} = 44.0004$ |
| $r_{12} = 42.4824$ | |
| | $d_{12} = 4.5110$  $n_8 = 1.51633$  $\nu_8 = 64.15$ |
| $r_{13} = -15.1077$ | |
| | $d_{13} = 2.0000$  $n_9 = 1.74950$  $\nu_9 = 35.27$ |
| $r_{14} = -32.6979$ | |
| | $d_{14} = 25.6200$ |
| $r_{15} = \infty$ (stop) | |
| | $d_{15} = 25.6200$ |
| $r_{16} = 32.6979$ | |
| | $d_{16} = 2.0000$  $n_{10} = 1.74950$  $\nu_{10} = 35.27$ |
| $r_{17} = 15.1077$ | |
| | $d_{17} = 4.5110$  $n_{11} = 1.51633$  $\nu_{11} = 64.15$ |
| $r_{18} = -42.4824$ | |
| | $d_{18} = 40.9500$ |
| $r_{19} = 53.3038$ | |
| | $d_{19} = 22.3000$  $n_{12} = 1.51680$  $\nu_{12} = 64.14$ |
| $r_{20} = -53.3038$ | |
| | $d_{20} = 40.9500$ |
| $r_{21} = 42.4824$ | |
| | $d_{21} = 4.5110$  $n_{13} = 1.51633$  $\nu_{13} = 64.15$ |
| $r_{22} = -15.1077$ | |
| | $d_{22} = 2.0000$  $n_{14} = 1.74950$  $\nu_{14} = 35.27$ |
| $r_{23} = -32.6979$ | |
| | $d_{23} = 51.2400$ |
| $r_{24} = 32.6979$ | |
| | $d_{24} = 2.0000$  $n_{15} = 1.74950$  $\nu_{15} = 35.27$ |
| $r_{25} = 15.1077$ | |
| | $d_{25} = 4.5110$  $n_{16} = 1.51633$  $\nu_{16} = 64.15$ |
| $r_{26} = -42.4824$ | |
| | $d_{26} = 73.8245$ |
| $r_{27} = 50.5778$ | |
| | $d_{27} = 1.0000$  $n_{17} = 1.80518$  $\nu_{17} = 25.43$ |
| $r_{28} = 15.8191$ | |
| | $d_{28} = 4.5000$  $n_{18} = 1.65128$  $\nu_{18} = 38.25$ |
| $r_{29} = -21.6085$ | | aspherical coefficient
$P = -10.0000$, $E = 0.70425 \times 10^{-2}$
$F = -0.77432 \times 10^{-4}$, $G = 0.14068 \times 10^{-8}$
$L = -0.87328 \times 10^{-28}$ $|R_1/f| = 0.427$, $\left|\dfrac{K_I - K_{0.5}}{K_{0.5}}\right| = 0.119$ $|\cos \omega_I - \cos \omega_{0.5}| = 0.154$
$h_1/I_{max} = 0.477$, $f_2/f = 1.709$
$|R_{min}|/f = 0.427$, $\tan \alpha = 0.3365$
$\tan \omega_1 = 0.834$, $d/I_{max} = 4.44$ Embodiment 27
f = 4.449, F/5.88, 2ω = 79.6°
IH = 1.699, object distance = 50

| | |
|---|---|
| $r_1 = 6.3185$ (aspherical surface) | |
| | $d_1 = 1.0000$  $n_1 = 1.78471$  $\nu_1 = 25.71$ |
| $r_2 = 1.9000$ | |
| | $d_2 = 0.9000$ |
| $r_3 = \infty$ | |
| | $d_3 = 6.7000$  $n_2 = 1.80610$  $\nu_2 = 40.95$ |
| $r_4 = \infty$ | |
| | $d_4 = 8.2000$  $n_3 = 1.80610$  $\nu_3 = 40.95$ |
| $r_5 = -7.0109$ | |
| | $d_5 = 2.0000$ |
| $r_6 = 11.8936$ | |
| | $d_6 = 5.0000$  $n_4 = 1.51633$  $\nu_4 = 64.15$ |
| $r_7 = -5.7154$ | |
| | $d_7 = 1.5000$  $n_5 = 1.84666$  $\nu_5 = 23.78$ |
| $r_8 = -28.9737$ | |
| | $d_8 = 3.0000$ |
| $r_9 = 21.4710$ | |
| | $d_9 = 5.0000$  $n_6 = 1.51680$  $\nu_6 = 64.14$ |
| $r_{10} = \infty$ | |
| | $d_{10} = 13.0000$  $n_7 = 1.51680$  $\nu_7 = 64.14$ |
| $r_{11} = -98.0103$ | |
| | $d_{11} = 44.0004$ |
| $r_{12} = 42.4824$ | |
| | $d_{12} = 4.5110$  $n_8 = 1.51633$  $\nu_8 = 64.15$ |
| $r_{13} = -15.1077$ | |
| | $d_{13} = 2.0000$  $n_9 = 1.74950$  $\nu_9 = 35.27$ |
| $r_{14} = -32.6979$ | |
| | $d_{14} = 25.6200$ |
| $r_{15} = \infty$ (stop) | |
| | $d_{15} = 25.6200$ |
| $r_{16} = 32.6979$ | |
| | $d_{16} = 2.0000$  $n_{10} = 1.74950$  $\nu_{10} = 35.27$ |
| $r_{17} = 15.1077$ | |
| | $d_{17} = 4.5110$  $n_{11} = 1.51633$  $\nu_{11} = 64.15$ |
| $r_{18} = -42.4824$ | |
| | $d_{18} = 40.9500$ |
| $r_{19} = 53.3038$ | |
| | $d_{19} = 22.3000$  $n_{12} = 1.51680$  $\nu_{12} = 64.14$ |
| $r_{20} = -53.3038$ | |
| | $d_{20} = 40.9500$ |
| $r_{21} = 42.4824$ | |
| | $d_{21} = 4.5110$  $n_{13} = 1.51633$  $\nu_{13} = 64.15$ |
| $r_{22} = -15.1077$ | |
| | $d_{22} = 2.0000$  $n_{14} = 1.74950$  $\nu_{14} = 35.27$ |
| $r_{23} = -32.6979$ | |
| | $d_{23} = 51.2400$ |
| $r_{24} = 32.6979$ | |
| | $d_{24} = 2.0000$  $n_{15} = 1.74950$  $\nu_{15} = 35.27$ |
| $r_{25} = 15.1077$ | |
| | $d_{25} = 4.5110$  $n_{16} = 1.51633$  $\nu_{16} = 64.15$ |
| $r_{26} = -42.4824$ | |
| | $d_{26} = 73.8203$ |
| $r_{27} = 57.4060$ | |
| | $d_{27} = 1.0000$  $n_{17} = 1.80518$  $\nu_{17} = 25.43$ |
| $r_{28} = 16.3250$ | |
| | $d_{28} = 4.5000$  $n_{18}$ 1.66998  $\nu_{18} = 39.27$ |
| $r_{29} = -21.9620$ | | aspherical coefficient
$P = -10.0000$, $E = 0.70425 \times 10^{-2}$
$F = -0.77432 \times 10^{-4}$, $G = 0.14068 \times 10^{-8}$
$L = -0.87328 \times 10^{-28}$ $|R_1/f| = 0.427$, $\left|\dfrac{K_I - K_{0.5}}{K_{0.5}}\right| = 0.119$ $|\cos \omega_I - \cos \omega_{0.5}| = 0.153$
$h_1/I_{max} = 0.478$, $f_2/f = 1.709$
$|R_{min}|/f = 0.427$, $\tan \alpha = 0.3363$,
$\tan \omega_1 = 0.833$, $d/I_{max} = 4.45$ Embodiment 28
f = 4.449, F/5.88, 2ω = 79.6°
IH = 1.692, object distance = 50

| | |
|---|---|
| $r_1 = 6.3185$ (aspherical surface) | |
| | $d_1 = 1.0000$  $n_1 = 1.78471$  $\nu_1 = 25.71$ |
| $r_2 = 1.9000$ | |
| | $d_2 = 0.9000$ |
| $r_3 = \infty$ | |
| | $d_3 = 6.7000$  $n_2 = 1.80610$  $\nu_2 = 40.95$ |
| $r_4 = \infty$ | |
| | $d_4 = 8.2000$  $n_3 = 1.80610$  $\nu_3 = 40.95$ |
| $r_5 = -7.0109$ | |
| | $d_5 = 2.0000$ |

-continued

| | | | |
|---|---|---|---|
| $r_6 = 11.8936$ | | | |
| | $d_6 = 5.0000$ | $n_4 = 1.51633$ | $v_4 = 64.15$ |
| $r_7 = -5.7154$ | | | |
| | $d_7 = 1.5000$ | $n_5 = 1.84666$ | $v_5 = 23.78$ |
| $r_8 = -28.9737$ | | | |
| | $d_8 = 3.0000$ | | |
| $r_9 = 21.4710$ | | | |
| | $d_9 = 5.0000$ | $n_6 = 1.51680$ | $v_6 = 64.14$ |
| $r_{10} = \infty$ | | | |
| | $d_{10} = 13.0000$ | $n_7 = 1.51680$ | $v_7 = 64.14$ |
| $r_{11} = -98.0103$ | | | |
| | $d_{11} = 44.0004$ | | |
| $r_{12} = 56.2382$ | | | |
| | $d_{12} = 4.5110$ | $n_8 = 1.51633$ | $v_8 = 64.15$ |
| $r_{13} = -15.4029$ | | | |
| | $d_{13} = 2.0000$ | $n_9 = 1.74950$ | $v_9 = 35.27$ |
| $r_{14} = -29.6340$ | | | |
| | $d_{14} = 25.6200$ | | |
| $r_{15} = \infty (\text{stop})$ | | | |
| | $d_{15} = 25.6200$ | | |
| $r_{16} = 29.6340$ | | | |
| | $d_{16} = 2.0000$ | $n_{10} = 1.74950$ | $v_{10} = 35.27$ |
| $r_{17} = 15.4029$ | | | |
| | $d_{17} = 4.5110$ | $n_{11} = 1.51633$ | $v_{11} = 64.15$ |
| $r_{18} = -56.2382$ | | | |
| | $d_{18} = 40.9500$ | | |
| $r_{19} = 51.1534$ | | | |
| | $d_{19} = 22.3000$ | $n_{12} = 1.51680$ | $v_{12} = 64.14$ |
| $r_{20} = -51.1534$ | | | |
| | $d_{20} = 40.9500$ | | |
| $r_{21} = 56.2382$ | | | |
| | $d_{21} = 4.5110$ | $n_{13} = 1.51633$ | $v_{13} = 64.15$ |
| $r_{22} = -15.4029$ | | | |
| | $d_{22} = 2.0000$ | $n_{14} = 1.74950$ | $v_{14} = 35.27$ |
| $r_{23} = -29.6340$ | | | |
| | $d_{23} = 51.2400$ | | |
| $r_{24} = 29.6340$ | | | |
| | $d_{24} = 2.0000$ | $n_{15} = 1.74950$ | $v_{15} = 35.27$ |
| $r_{25} = 15.4029$ | | | |
| | $d_{25} = 4.5110$ | $n_{16} = 1.51633$ | $v_{16} = 64.15$ |
| $r_{26} = -56.2382$ | | | |
| | $d_{26} = 73.8203$ | | |
| $r_{27} = 57.4060$ | | | |
| | $d_{27} = 1.0000$ | $n_{17} = 1.80518$ | $v_{17} = 25.43$ |
| $r_{28} = 16.3250$ | | | |
| | $d_{28} = 4.5000$ | $n_{18} = 1.66998$ | $v_{18} = 39.27$ |
| $r_{29} = -21.9620$ | | | | aspherical coefficient
$P = -10.0000, \quad E = 0.70425 \times 10^{-2}$
$F = -0.77432 \times 10^{-4}, \quad G = 0.14068 \times 10^{-8}$
$L = -0.87328 \times 10^{-28}$ $|R_1/f| = 0.427, \quad \left|\dfrac{K_I - K_{0.5}}{K_{0.5}}\right| = 0.120$ $|\cos \omega_I - \cos \omega_{0.5}| = 0.153$
$h_1/I_{max} = 0.477, \quad f_2/f = 1.709$
$|R_{min}|/f = 0.427, \quad \tan \alpha = 0.3345,$
$\tan \omega_1 = 0.833, \quad d/I_{max} = 4.45$ Embodiment 29
$f = 4.364, \quad F/5.59, \quad 2\omega = 80.0°$
$IH = 1.684, \quad \text{object distance} = 50$

| | | | |
|---|---|---|---|
| $r_1 = 5.7934$ | | | |
| | $d_1 = 1.0000$ | $n_1 = 1.78471$ | $v_1 = 25.71$ |
| $r_2 = 1.7137$ (aspherical surface) | | | |
| | $d_2 = 1.2000$ | | |
| $r_3 = \infty$ | | | |
| | $d_3 = 6.7000$ | $n_2 = 1.80610$ | $v_2 = 40.95$ |
| $r_4 = \infty$ | | | |
| | $d_4 = 8.0000$ | $n_3 = 1.80610$ | $v_3 = 40.95$ |
| $r_5 = -7.0241$ | | | |
| | $d_5 = 2.0000$ | | |
| $r_6 = 9.4781$ | | | |
| | $d_6 = 5.0000$ | $n_4 = 1.51633$ | $v_4 = 64.15$ |
| $r_7 = -6.0129$ | | | |
| | $d_7 = 1.5000$ | $n_5 = 1.84666$ | $v_5 = 23.78$ |
| $r_8 = -95.6255$ | | | |
| | $d_8 = 3.0000$ | | |
| $r_9 = 28.7313$ | | | |
| | $d_9 = 5.0000$ | $n_6 = 1.51633$ | $v_6 = 64.15$ |
| $r_{10} = \infty$ | | | |
| | $d_{10} = 13.0000$ | $n_7 = 1.51633$ | $v_7 = 64.15$ |
| $r_{11} = -40.9980$ | | | |
| | $d_{11} = 44.0000$ | | |
| $r_{12} = 34.0398$ | | | |
| | $d_{12} = 4.5110$ | $n_8 = 1.51112$ | $v_8 = 60.48$ |
| $r_{13} = -14.1661$ | | | |
| | $d_{13} = 2.0000$ | $n_9 = 1.74950$ | $v_9 = 35.27$ |
| $r_{14} = -34.5603$ | | | |
| | $d_{14} = 25.6200$ | | |
| $r_{15} = \infty (\text{stop})$ | | | |
| | $d_{15} = 25.6200$ | | |
| $r_{16} = 34.5603$ | | | |
| | $d_{16} = 2.0000$ | $n_{10} = 1.74950$ | $v_{10} = 35.27$ |
| $r_{17} = 14.1661$ | | | |
| | $d_{16} = 4.5110$ | $n_{11} = 1.51112$ | $v_{11} = 60.48$ |
| $r_{18} = -34.0398$ | | | |
| | $d_{18} = 40.9500$ | | |
| $r_{19} = 55.5131$ | | | |
| | $d_{19} = 22.3000$ | $n_{12} = 1.51633$ | $v_{12} = 64.15$ |
| $r_{20} = -55.5131$ | | | |
| | $d_{20} = 40.9500$ | | |
| $r_{21} = 34.0398$ | | | |
| | $d_{21} = 4.5110$ | $n_{13} = 1.51112$ | $v_{13} = 60.48$ |
| $r_{22} = -14.1661$ | | | |
| | $d_{22} = 2.0000$ | $n_{14} = 1.74950$ | $v_{14} = 35.27$ |
| $r_{23} = -34.5603$ | | | |
| | $d_{23} = 51.2400$ | | |
| $r_{24} = 34.5603$ | | | |
| | $d_{24} = 2.0000$ | $n_{15} = 1.74950$ | $v_{15} = 35.27$ |
| $r_{25} = 14.1661$ | | | |
| | $d_{25} = 4.5110$ | $n_{16} = 1.51112$ | $v_{16} = 60.48$ |
| $r_{26} = -34.0998$ | | | |
| | $d_{26} = 73.0902$ | | |
| $r_{27} = 57.4060$ | | | |
| | $d_{27} = 1.0000$ | $n_{17} = 1.80518$ | $v_{17} = 25.43$ |
| $r_{28} = 16.3250$ | | | |
| | $d_{28} = 4.5000$ | $n_{18} = 1.66998$ | $v_{18} = 39.27$ |
| $r_{29} = -21.9620$ | | | | aspherical coefficient
$P = 0.4234, \quad E = -0.20021 \times 10^{-2}$
$F = -0.35366 \times 10^{-8}$ $|R_1/f| = 0.392, \quad \left|\dfrac{K_I - K_{0.5}}{K_{0.5}}\right| = 0.015$ $|\cos \omega_I - \cos \omega_{0.5}| = 0.089$
$h_1/I_{max} = 0.474, \quad f_2/f = 1.652$
$|R_{min}|/f = 0.392, \quad d/I_{max} = 4.58$ Embodiment 30
$f = 4.370, \quad F/5.59, \quad 2\omega = 79.9°$
$IH = 1.683, \quad \text{object distance} = 50$

| | | | |
|---|---|---|---|
| $r_1 = 7.0000$ | | | |
| | $d_1 = 1.0000$ | $n_1 = 1.78471$ | $v_1 = 25.71$ |
| $r_2 = 1.8724$ (aspherical surface) | | | |
| | $d_2 = 1.2000$ | | |
| $r_3 = \infty$ | | | |
| | $d_3 = 6.7000$ | $n_2 = 1.80610$ | $v_2 = 40.95$ |
| $r_4 = \infty$ | | | |
| | $d_4 = 8.0000$ | $n_3 = 1.80610$ | $v_3 = 40.95$ |
| $r_5 = -7.1300$ | | | |
| | $d_5 = 2.0000$ | | |
| $r_6 = 9.1560$ | | | |
| | $d_6 = 5.0000$ | $n_4 = 1.51633$ | $v_4 = 64.15$ |
| $r_7 = -6.0310$ | | | |
| | $d_7 = 1.5000$ | $n_5 = 1.84666$ | $v_5 = 23.78$ |
| $r_8 = -95.7310$ | | | |
| | $d_8 = 3.0000$ | | |
| $r_9 = 29.4330$ | | | |
| | $d_9 = 5.0000$ | $n_6 = 1.51633$ | $v_6 = 64.15$ |
| $r_{10} = \infty$ | | | |
| | $d_{10} = 12.9381$ | $n_7 = 1.51633$ | $v_7 = 64.15$ |
| $r_{11} = -40.9980$ | | | |
| | $d_{11} = 44.0000$ | | |
| $r_{12} = 31.9122$ | | | |
| | $d_{12} = 4.5110$ | $n_8 = 1.51602$ | $v_8 = 56.80$ |
| $r_{13} = -13.6341$ | | | |
| | $d_{13} = 2.0000$ | $n_9 = 1.74950$ | $v_9 = 35.27$ |

-continued

| | | | |
|---|---|---|---|
| $r_{14} = -35.8745$ | | | |
| | $d_{14} = 25.6200$ | | |
| $r_{15} = \infty$ (stop) | | | |
| | $d_{15} = 25.6200$ | | |
| $r_{16} = 35.8745$ | | | |
| | $d_{16} = 2.0000$ | $n_{10} = 1.74950$ | $\nu_{10} = 35.27$ |
| $r_{17} = 13.6341$ | | | |
| | $d_{16} = 4.5110$ | $n_{11} = 1.51602$ | $\nu_{11} = 56.80$ |
| $r_{18} = -31.9122$ | | | |
| | $d_{18} = 40.9500$ | | |
| $r_{19} = 50.9974$ | | | |
| | $d_{19} = 22.3000$ | $n_{12} = 1.51633$ | $\nu_{12} = 64.15$ |
| $r_{20} = -50.9974$ | | | |
| | $d_{20} = 40.9500$ | | |
| $r_{21} = 31.9122$ | | | |
| | $d_{21} = 4.5110$ | $n_{13} = 1.51602$ | $\nu_{13} = 56.80$ |
| $r_{22} = -13.6341$ | | | |
| | $d_{22} = 2.0000$ | $n_{14} = 1.74950$ | $\nu_{14} = 35.27$ |
| $r_{23} = -35.8745$ | | | |
| | $d_{23} = 51.2400$ | | |
| $r_{24} = 35.8745$ | | | |
| | $d_{24} = 2.0000$ | $n_{15} = 1.74950$ | $\nu_{15} = 35.27$ |
| $r_{25} = 13.6341$ | | | |
| | $d_{25} = 4.5110$ | $n_{16} = 1.51602$ | $\nu_{16} = 56.80$ |
| $r_{26} = -31.9122$ | | | |
| | $d_{26} = 72.9351$ | | |
| $r_{27} = 57.4060$ | | | |
| | $d_{27} = 1.0000$ | $n_{17} = 1.80518$ | $\nu_{17} = 25.43$ |
| $r_{28} = 16.3250$ | | | |
| | $d_{28} = 4.5000$ | $n_{18} = 1.66998$ | $\nu_{18} = 39.27$ |
| $r_{29} = -21.9620$ | | | | aspherical coefficient
$P = 1.0000$, $E = -0.12829 \times 10^{-1}$
$F = -0.61773 \times 10^{-2}$, $G = -0.20560 \times 10^{-7}$ $|R_1/f| = 0.428$, $\left|\dfrac{K_I - K_{0.5}}{K_{0.5}}\right| = 0.004$ $|\cos \omega_I - \cos \omega_{0.5}| = 0.080$
$h_1/I_{max} = 0.486$, $f_2/f = 1.649$
$|R_{min}|/f = 0.428$, $d/I_{max} = 4.60$ Embodiment 31
$f = 4.323$, F/5.69, $2\omega = 80.0°$
IH = 1.721, object distance = 50

| | | | |
|---|---|---|---|
| $r_1 = 7.0000$ (aspherical surface) | | | |
| | $d_1 = 1.0000$ | $n_1 = 1.78471$ | $\nu_1 = 25.71$ |
| $r_2 = 1.8392$ (aspherical surface) | | | |
| | $d_2 = 1.2000$ | | |
| $r_3 = \infty$ | | | |
| | $d_3 = 6.7000$ | $n_2 = 1.80610$ | $\nu_2 = 40.95$ |
| $r_4 = \infty$ | | | |
| | $d_4 = 8.0000$ | $n_3 = 1.80610$ | $\nu_3 = 40.95$ |
| $r_5 = -7.1300$ | | | |
| | $d_5 = 2.0000$ | | |
| $r_6 = 9.1560$ | | | |
| | $d_6 = 5.0000$ | $n_4 = 1.51633$ | $\nu_4 = 64.15$ |
| $r_7 = -6.0310$ | | | |
| | $d_7 = 1.5000$ | $n_5 = 1.84666$ | $\nu_5 = 23.78$ |
| $r_8 = -95.7310$ | | | |
| | $d_8 = 3.0000$ | | |
| $r_9 = 29.4330$ | | | |
| | $r_9 = 5.0000$ | $n_6 = 1.51633$ | $\nu_6 = 64.15$ |
| $r_{10} = \infty$ | | | |
| | $d_{10} = 13.0282$ | $n_7 = 1.51633$ | $\nu_7 = 64.15$ |
| $r_{11} = -40.9980$ | | | |
| | $d_{11} = 44.0000$ | | |
| $r_{12} = 37.6000$ | | | |
| | $d_{12} = 4.5110$ | $n_8 = 1.51009$ | $\nu_8 = 63.46$ |
| $r_{13} = -14.9830$ | | | |
| | $d_{13} = 2.0000$ | $n_9 = 1.74950$ | $\nu_9 = 35.27$ |
| $r_{14} = -33.7510$ | | | |
| | $d_{14} = 25.6200$ | | |
| $r_{15} = \infty$ (stop) | | | |
| | $d_{15} = 25.6200$ | | |
| $r_{16} = 33.7510$ | | | |
| | $d_{16} = 2.0000$ | $n_{10} = 1.74950$ | $\nu_{10} = 35.27$ |
| $r_{17} = 14.9830$ | | | |
| | $d_{17} = 4.5110$ | $n_{11} = 1.51009$ | $\nu_{11} = 63.46$ |

-continued

| | | | |
|---|---|---|---|
| $r_{18} = -37.6000$ | | | |
| | $d_{18} = 40.9500$ | | |
| $r_{19} = 55.0600$ | | | |
| | $d_{19} = 22.3000$ | $n_{12} = 1.51633$ | $\nu_{12} = 64.15$ |
| $r_{20} = -55.0600$ | | | |
| | $d_{20} = 40.9500$ | | |
| $r_{21} = 37.6000$ | | | |
| | $d_{21} = 4.5110$ | $n_{13} = 1.51009$ | $\nu_{13} = 63.46$ |
| $r_{22} = -14.9830$ | | | |
| | $d_{22} = 2.0000$ | $n_{14} = 1.74950$ | $\nu_{14} = 35.27$ |
| $r_{23} = -33.7510$ | | | |
| | $d_{23} = 51.2400$ | | |
| $r_{24} = 33.7510$ | | | |
| | $d_{24} = 2.0000$ | $n_{15} = 1.74950$ | $\nu_{15} = 35.27$ |
| $r_{25} = 14.9830$ | | | |
| | $d_{25} = 4.5110$ | $n_{16} = 1.51009$ | $\nu_{16} = 63.46$ |
| $r_{26} = -37.6000$ | | | |
| | $d_{26} = 73.0000$ | | |
| $r_{27} = 57.4060$ | | | |
| | $d_{27} = 1.0000$ | $n_{17} = 1.80518$ | $\nu_{17} = 25.43$ |
| $r_{28} = 16.3250$ | | | |
| | $d_{28} = 4.5000$ | $n_{18} = 1.66998$ | $\nu_{18} = 39.27$ |
| $r_{29} = -21.9620$ | | | | aspherical coefficient
(1st surface)
$P = 1.0000$, $E = 0.53146 \times 10^{-2}$
$F = -0.61228 \times 10^{-4}$, $G = -0.48942 \times 10^{-9}$
(2nd surface)
$P = 1.0000$, $E = 0.61486 \times 10^{-2}$
$F = 0.37818 \times 10^{-5}$, $G = 0.11647 \times 10^{-10}$ $|R_1/f| = 0.425$, $\left|\dfrac{K_I - K_{0.5}}{K_{0.5}}\right| = 0.062$ $|\cos \omega_I - \cos \omega_{0.5}| = 0.155$
$h_1/I_{max} = 0.496$, $f_2/f = 1.667$
$|R_{min}|/f = 0.425$, $\tan \alpha = 0.3563$
$\tan \omega_1 = 0.839$, $d/I_{max} = 4.58$ wherein the reference symbols $r_1$, $r_2$, ... represent radii of curvature on the surfaces of the respective lens elements, the reference symbols $d_1$, $d_2$, ... designate thicknesses of the respective lens elements and airspaces reserved therebetween, the reference symbols $n_1$, $n_2$, ... denote refractive indices of the respective lens elements, and the reference symbols $\nu_1$, $\nu_2$, ... represent Abbe's numbers of the respective lens elements.

The Embodiments 1 through 21 have the compositions illustrated in FIG. 22 through FIG. 42 respectively, and each of the Embodiments consists of a first lens unit I having negative function and a second lens unit II having positive function. Each of the Embodiments is designed as a retrofocus type objective lens system in which an aspherical surface is arranged so the object side surface of a lens element in the first lens unit I having negative function.

Further, the objective lens system has an airspace allowing to arrange a field direction changing prism between the extremely object side surface having positive refractive power in the second lens unit II and the extremely image side surface having negative refractive power in the first lens unit I.

Figure 22:
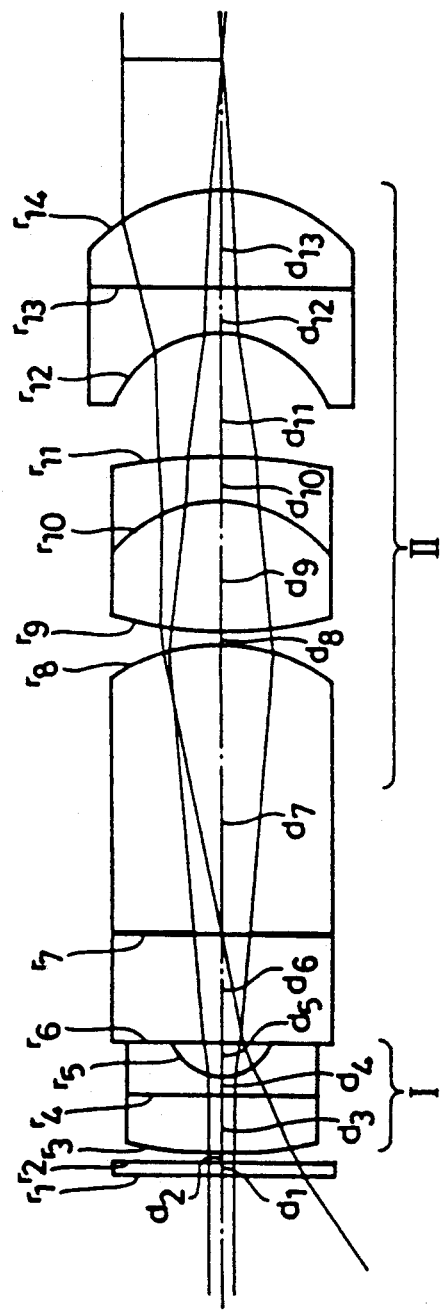

The Embodiment 1 has the composition illustrated in FIG. 22 wherein the first lens unit I is designed as a cemented doublet and the two lens elements are made of glass materials having different Abbe's numbers for correcting chromatic aberration. Further, out of these lens elements, the lens element having the aspherical surface on the object side has a plane surface on the other side. This aspherical lens element can easily be shaped by molding since it has the plane surface on one side.

Figure 54:
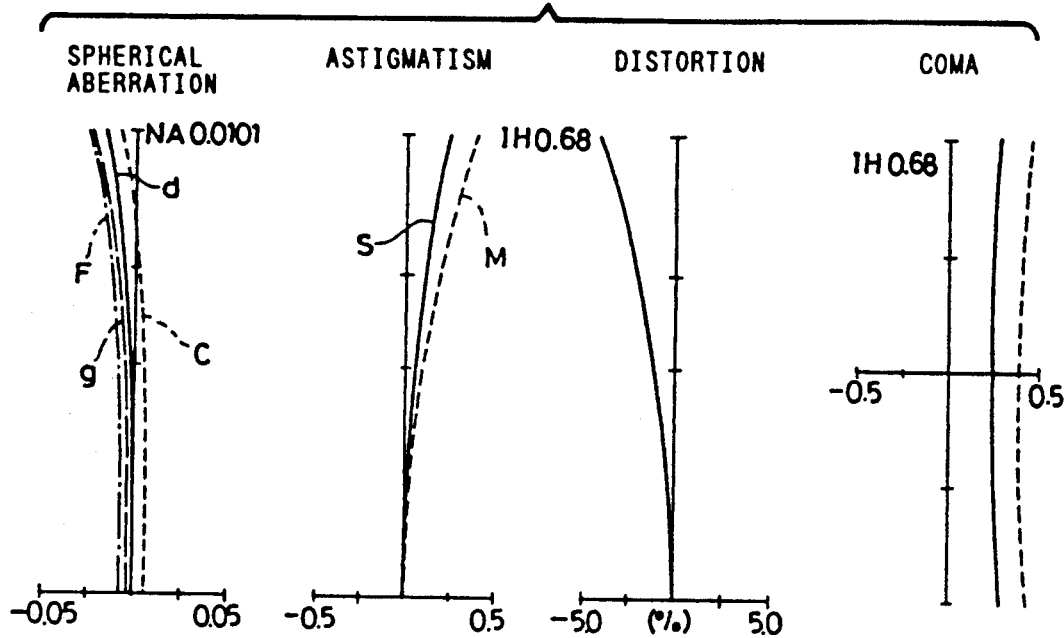
Figure 55:
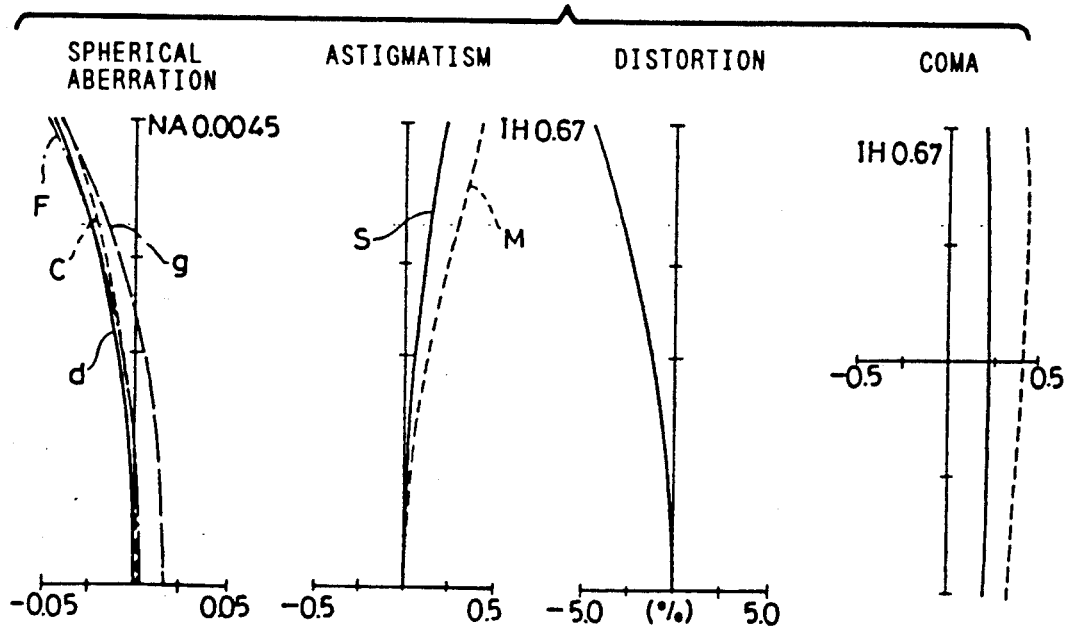
Figure 56:
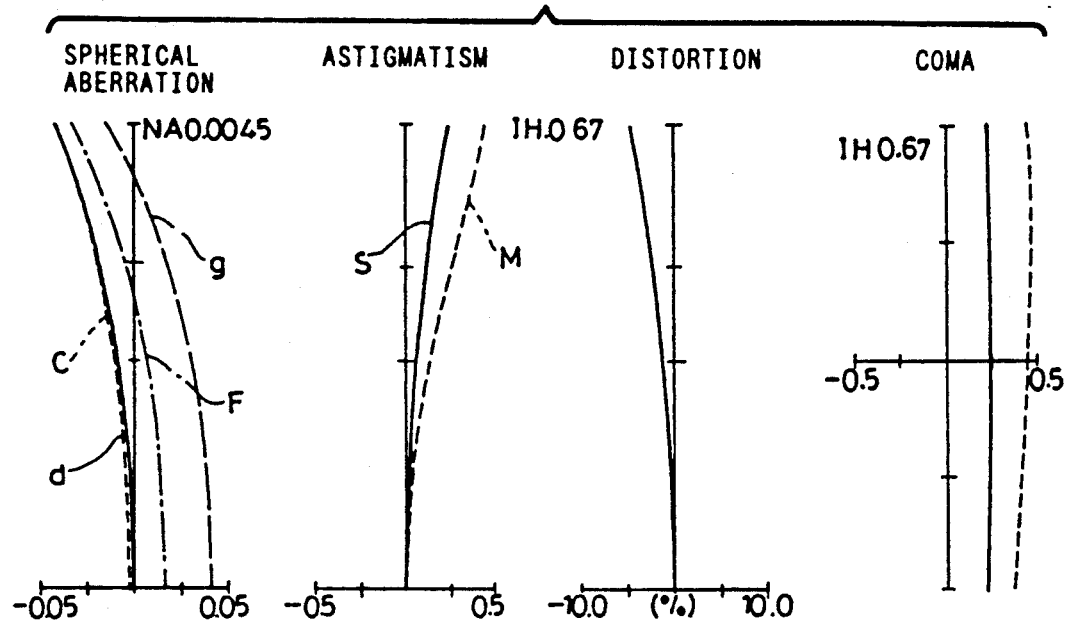
Figure 57:
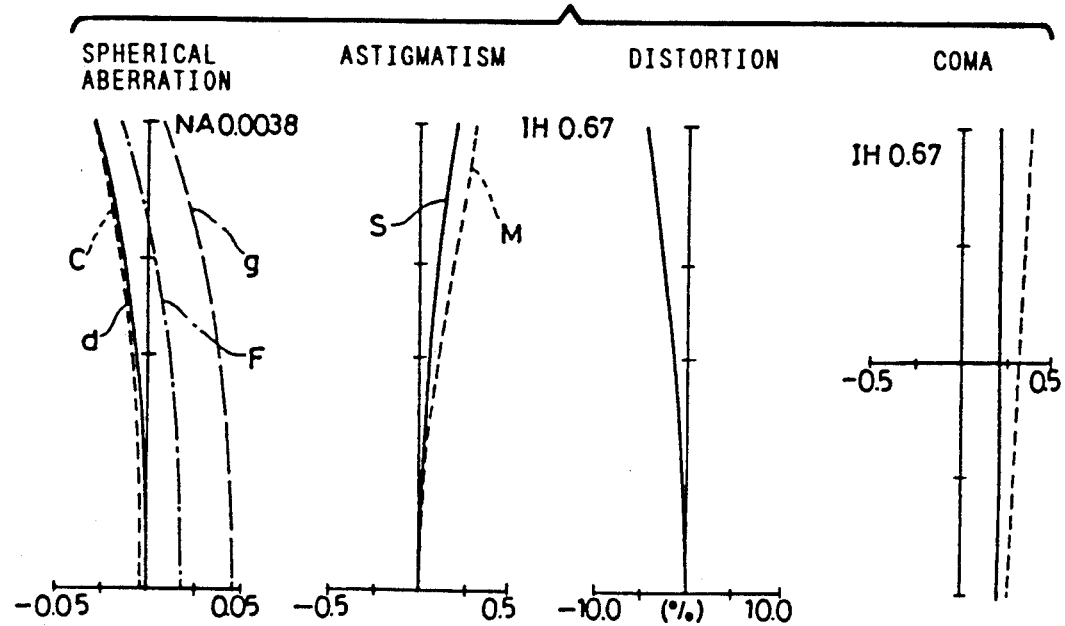
Figure 58:
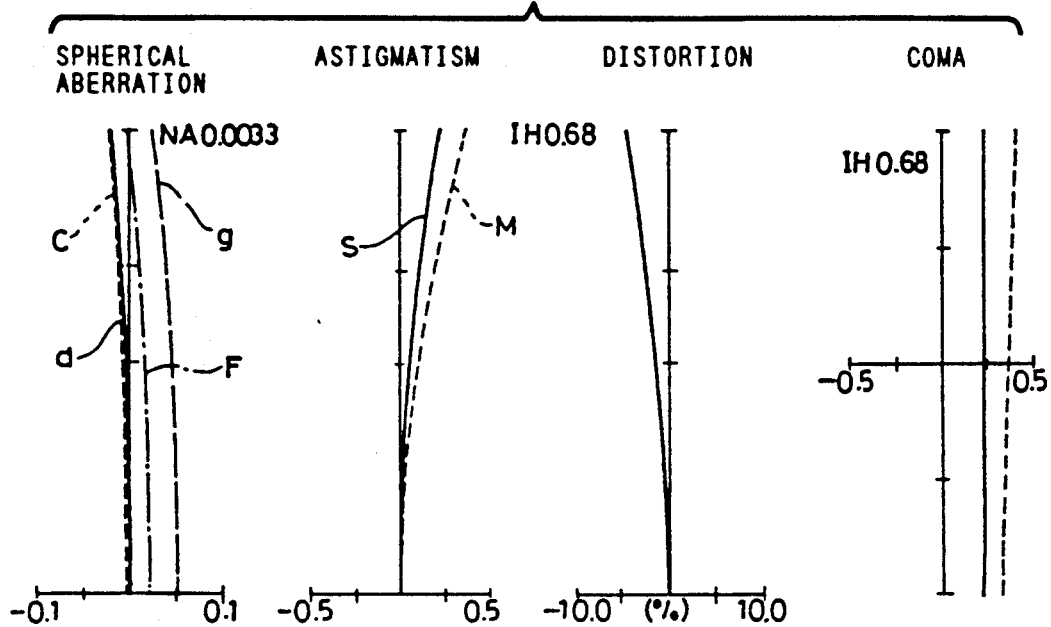
Figure 59:
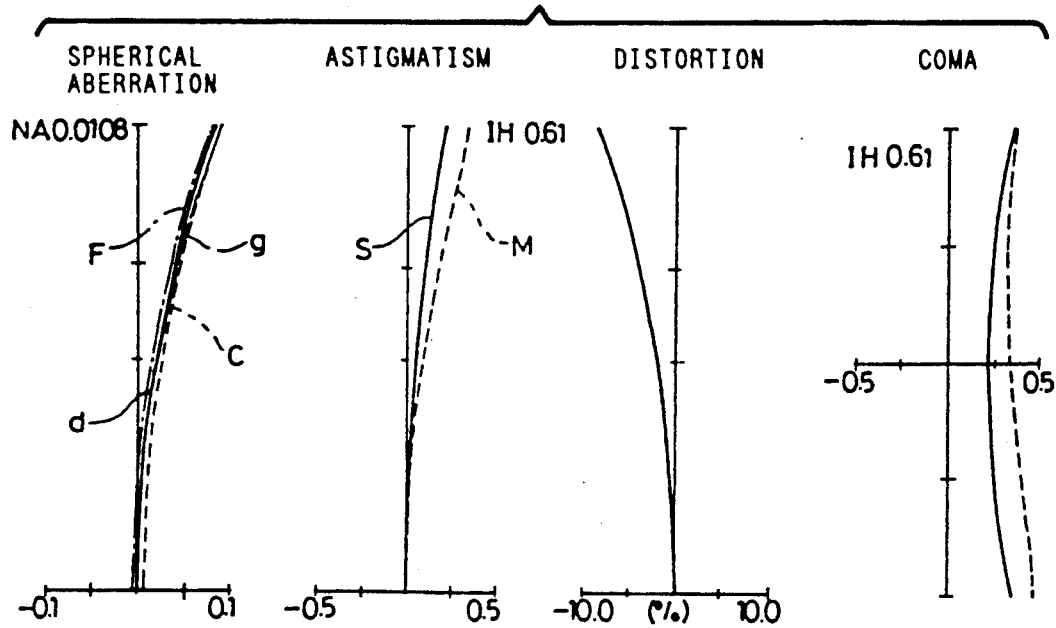
Figure 60:
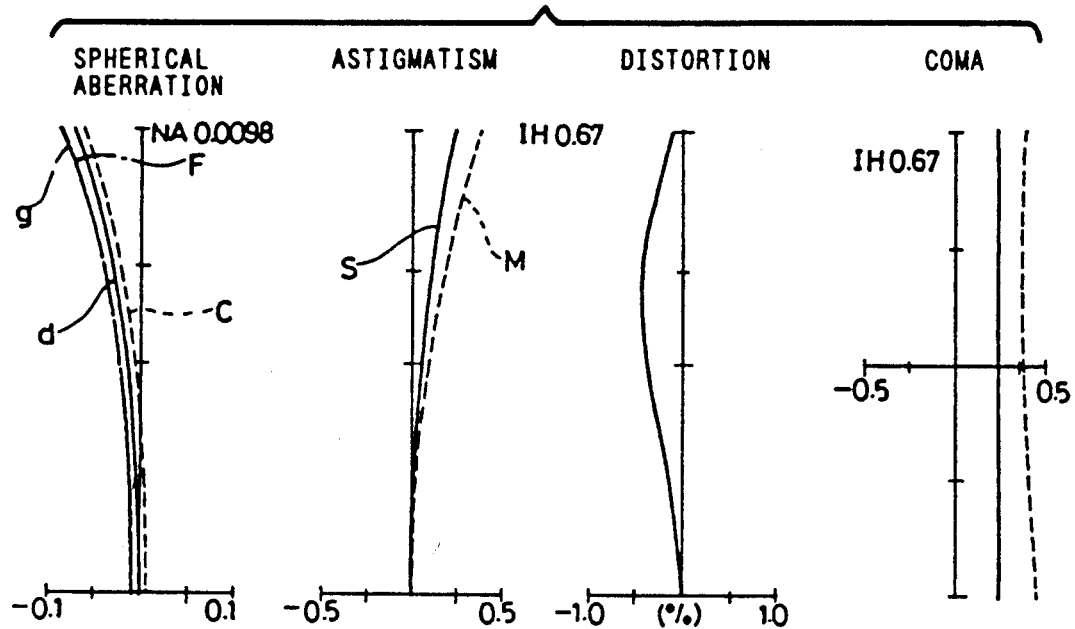
Figure 61:
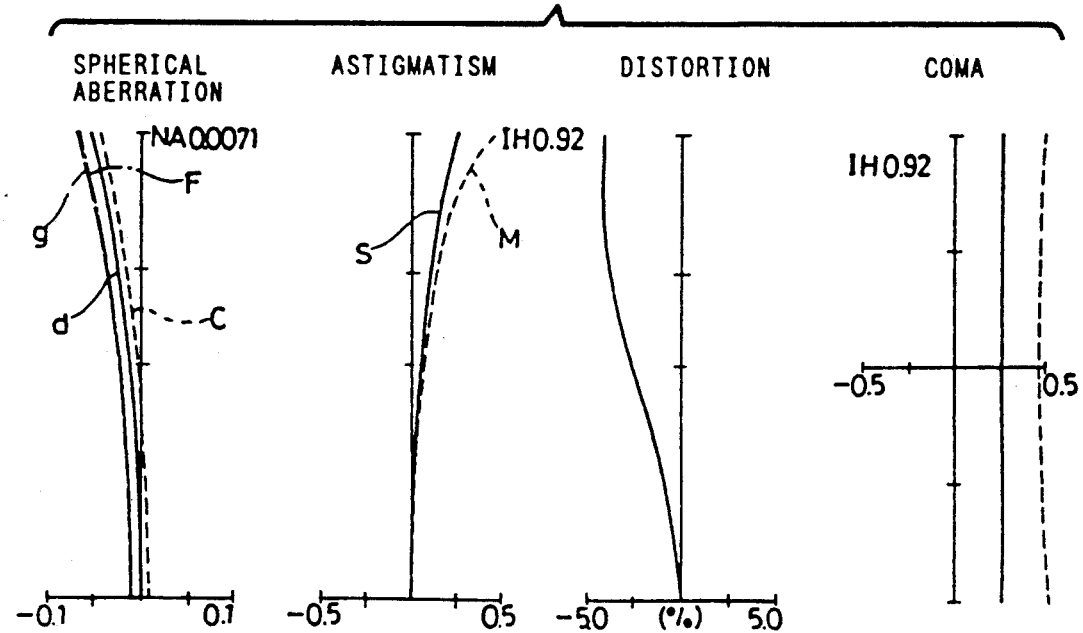
Figure 62:
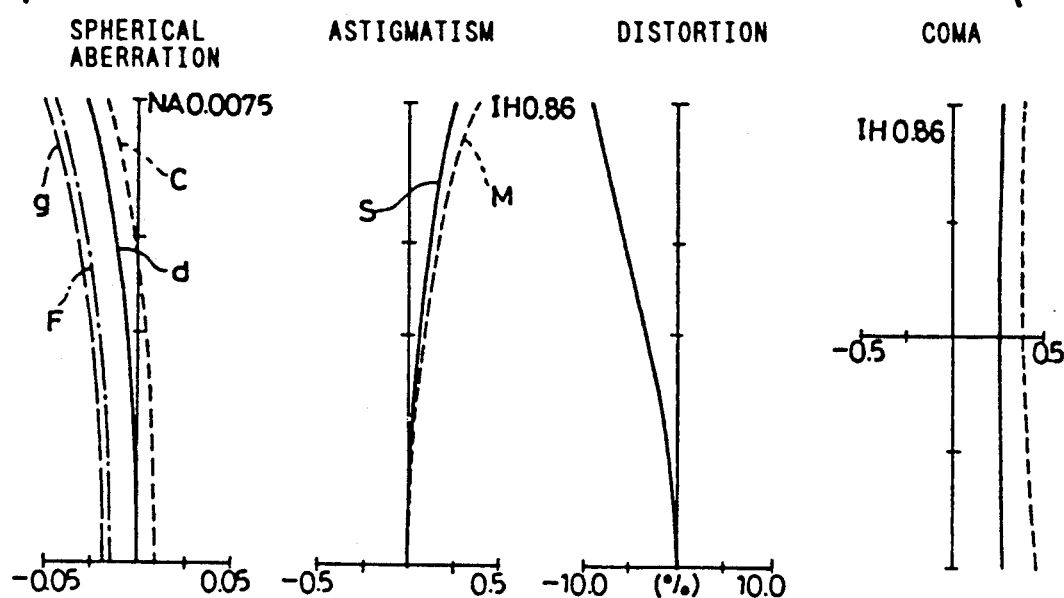
Figure 63:
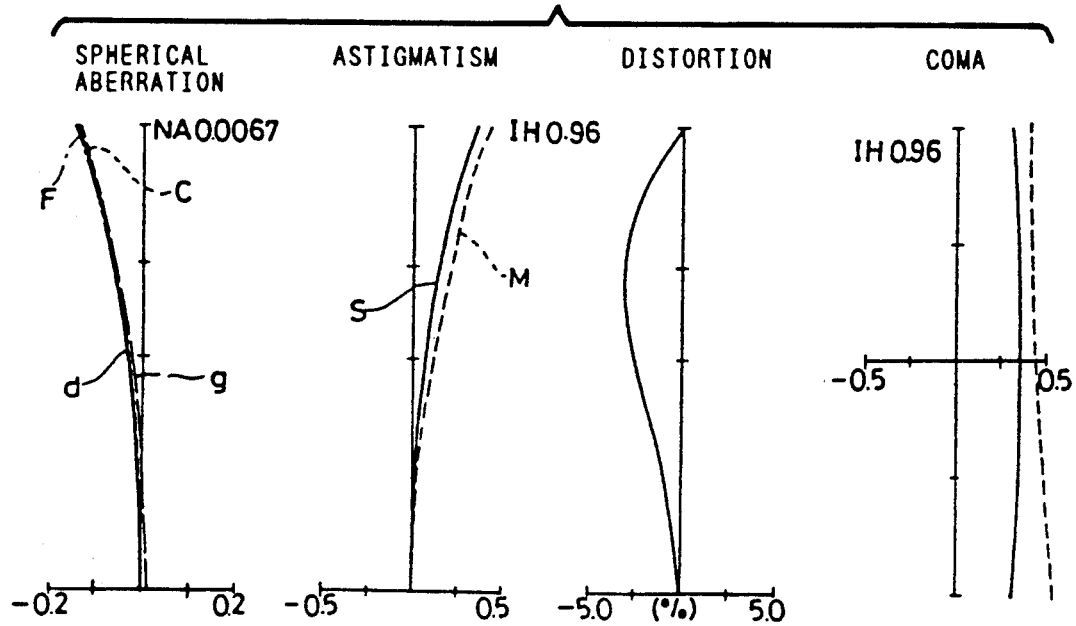
Figure 64:
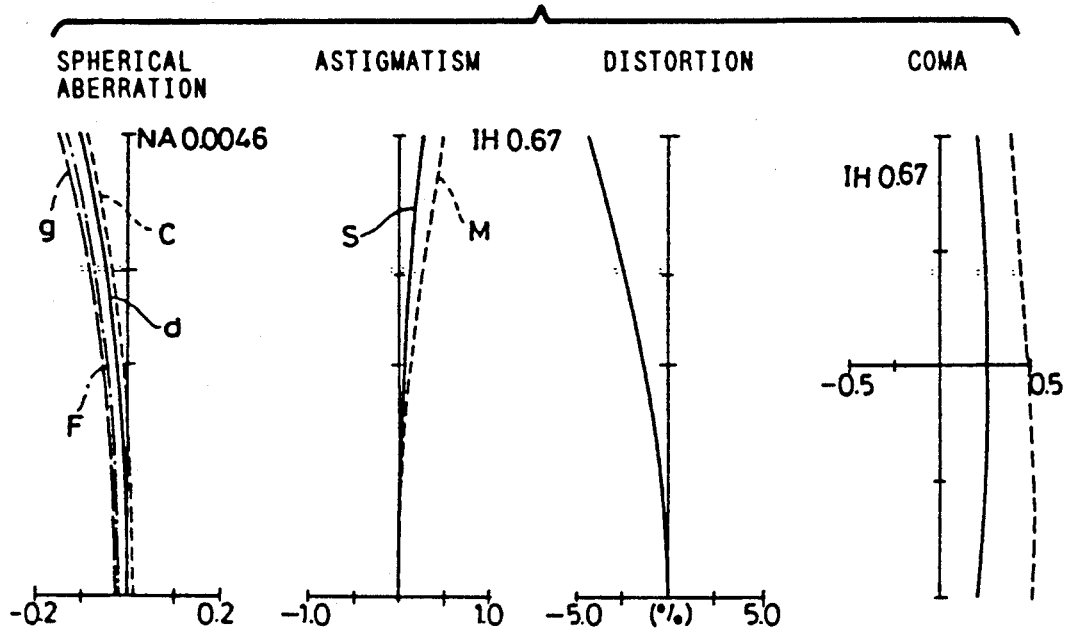
Figure 65:
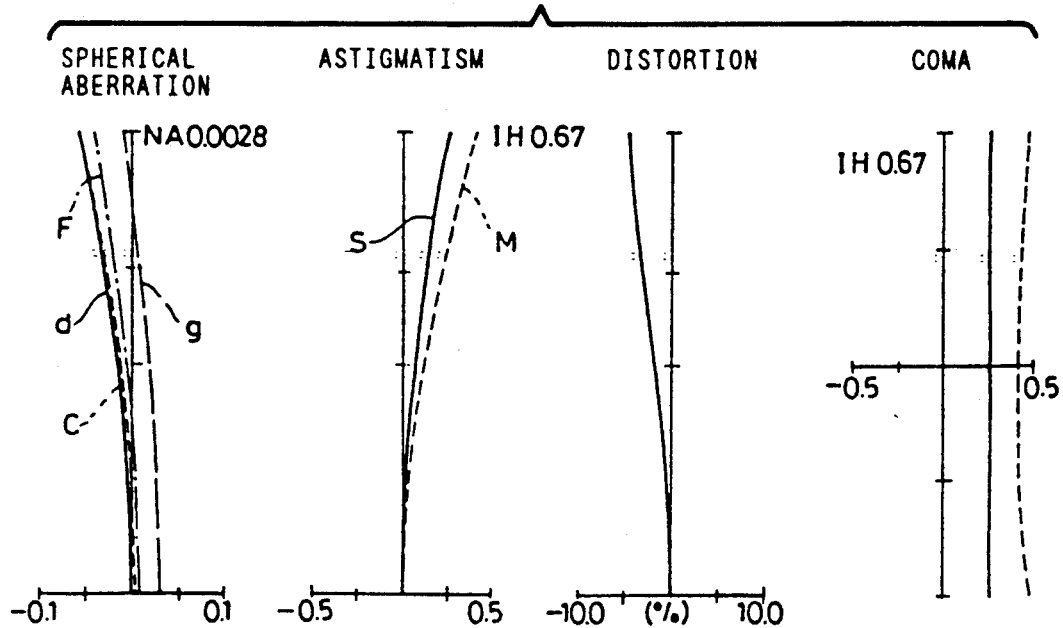
Figure 66:
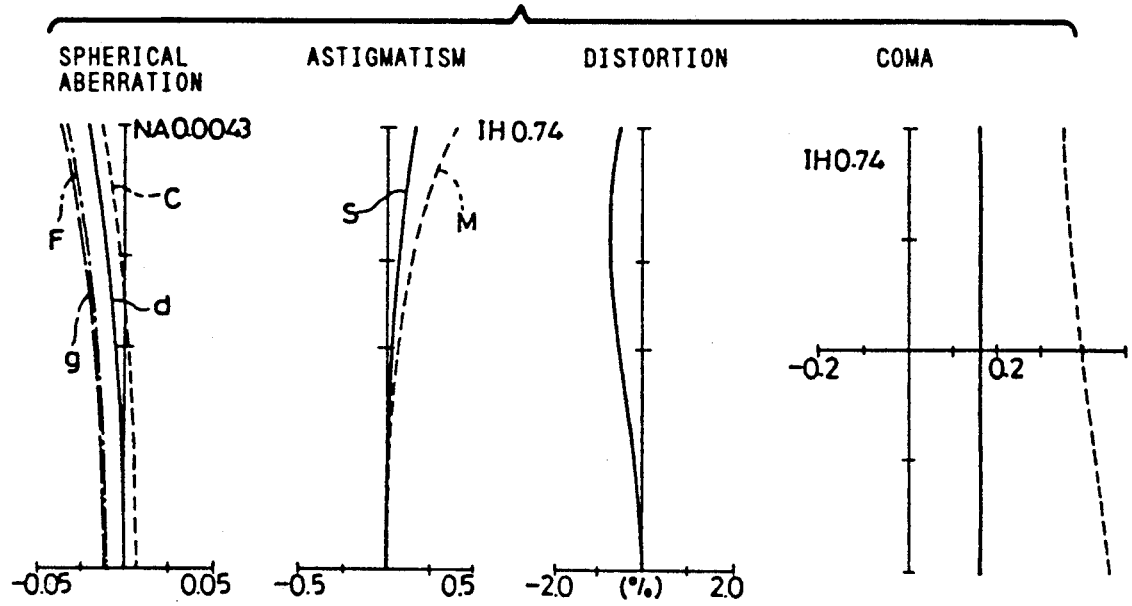
Figure 67:
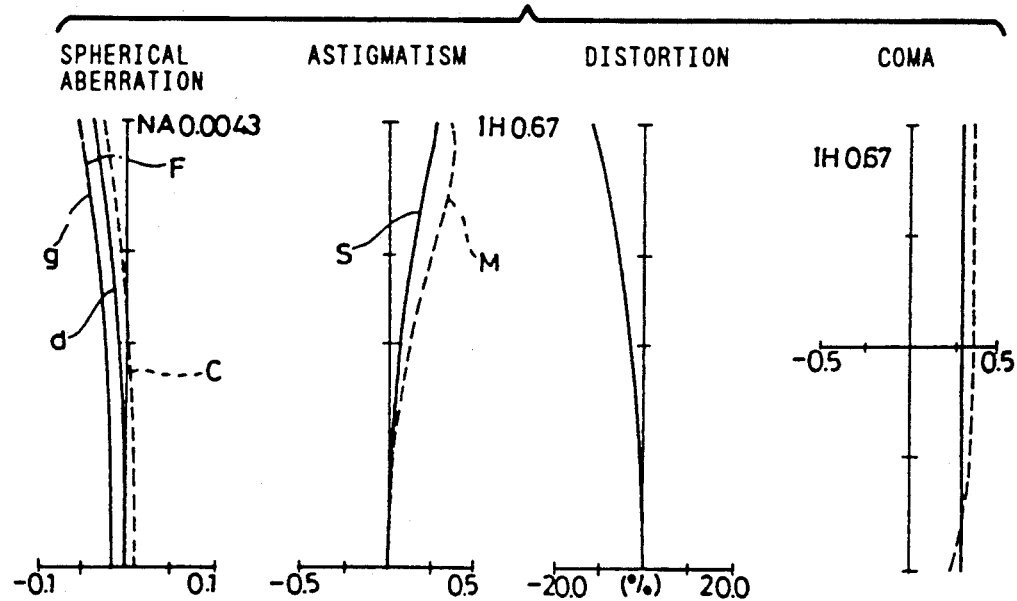
Figure 70:
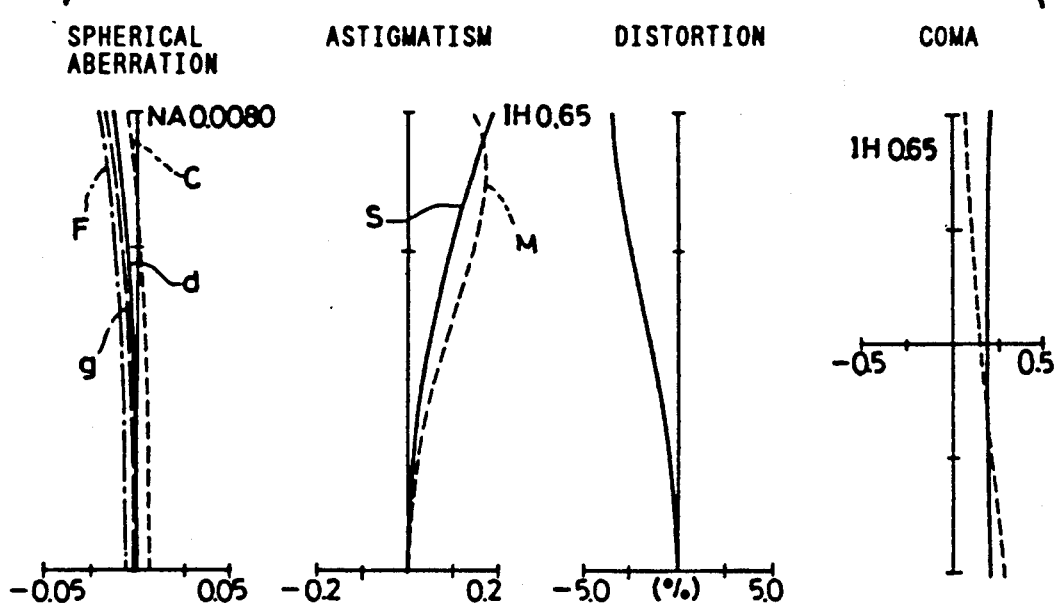
Figure 71:
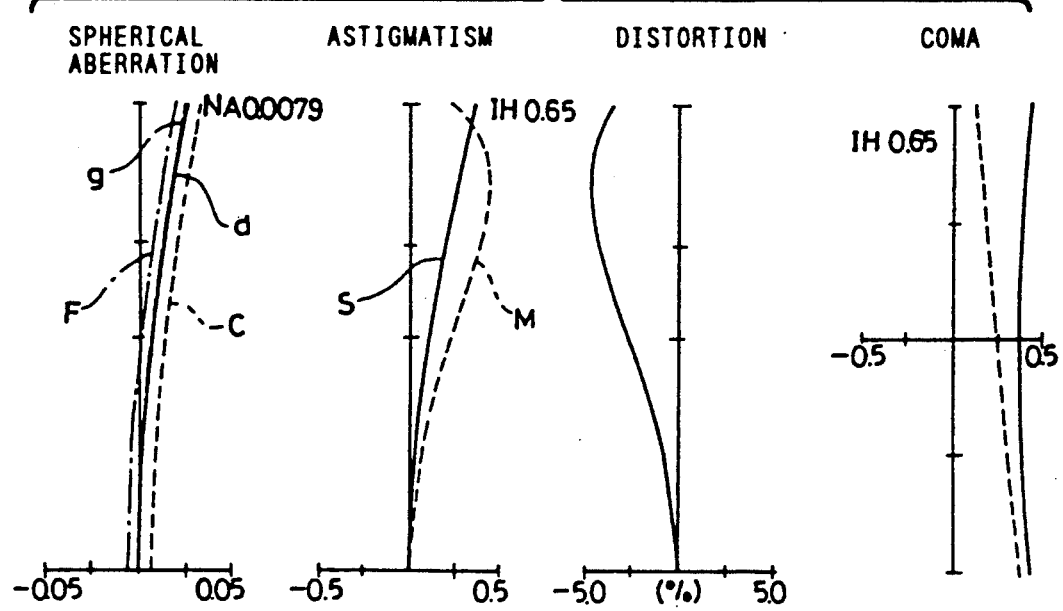
Figure 72:
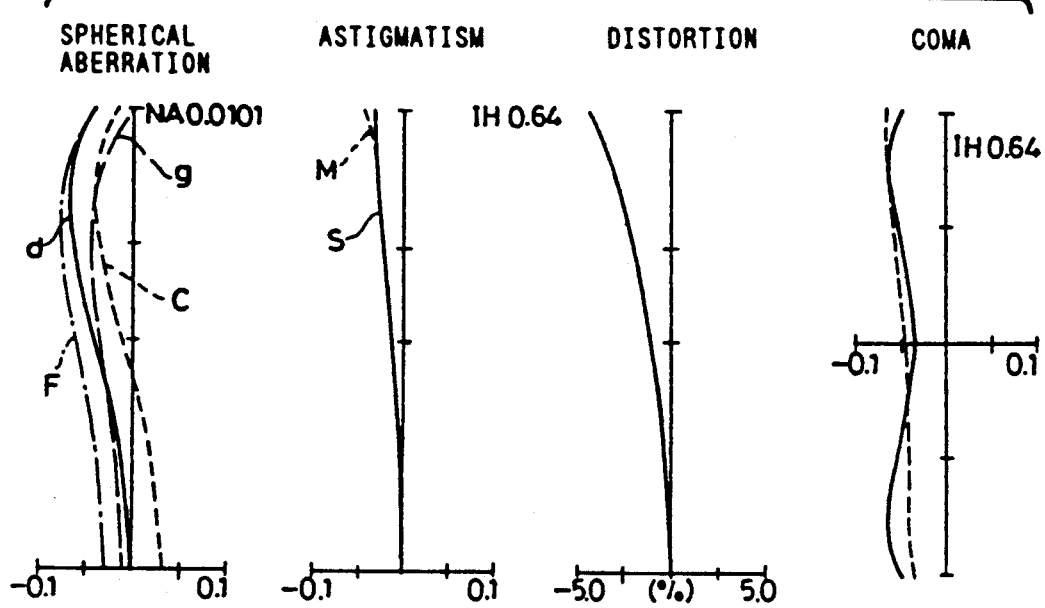
Figure 73:
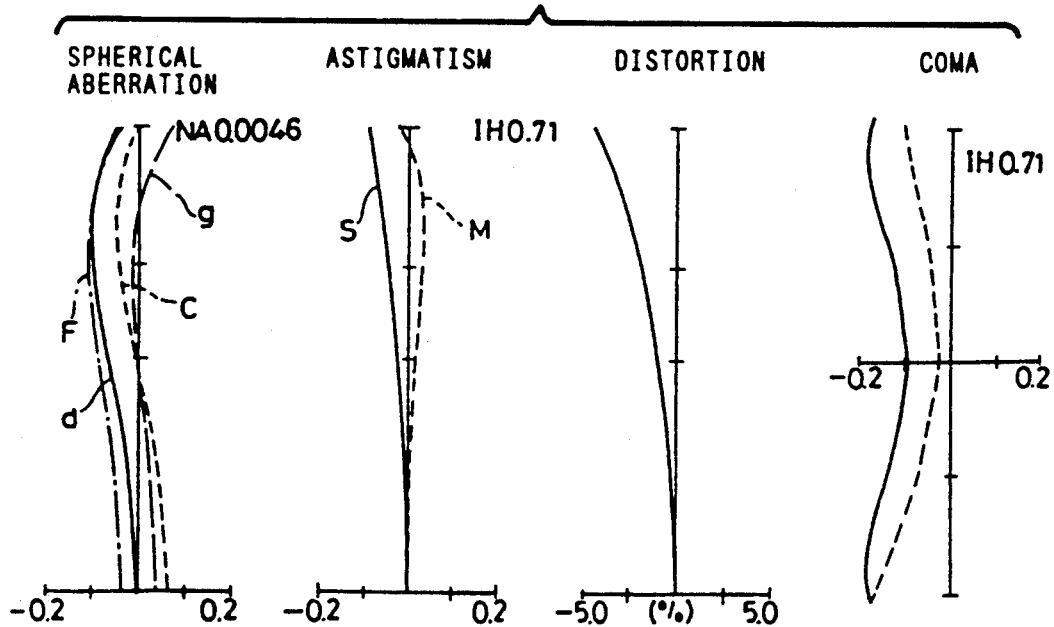
Figure 74:
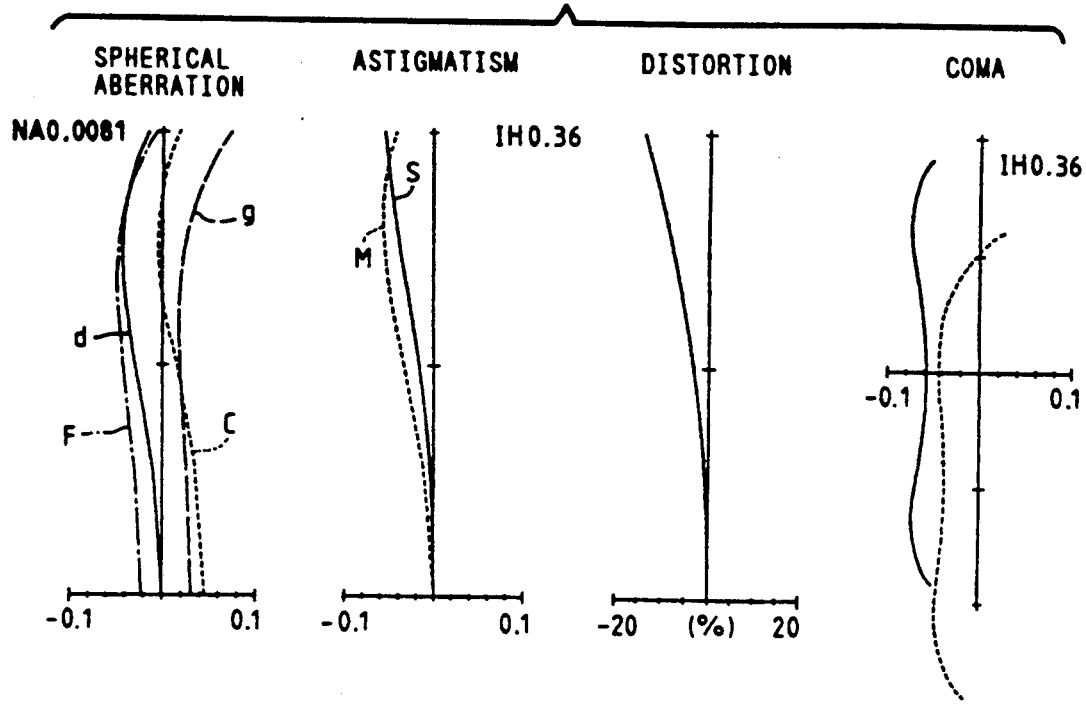
Figure 75:
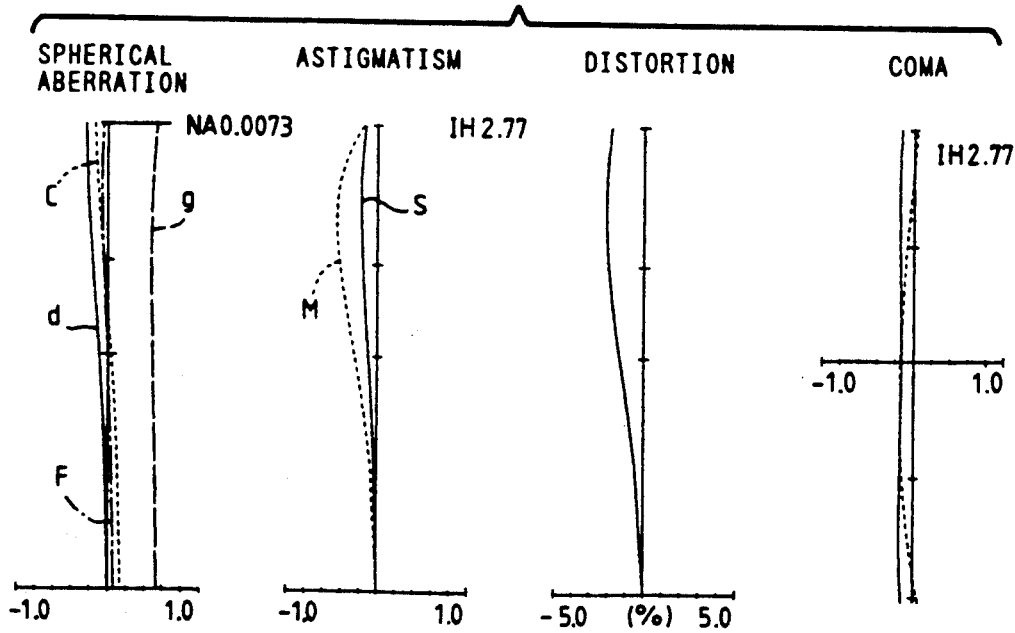
Figure 76:
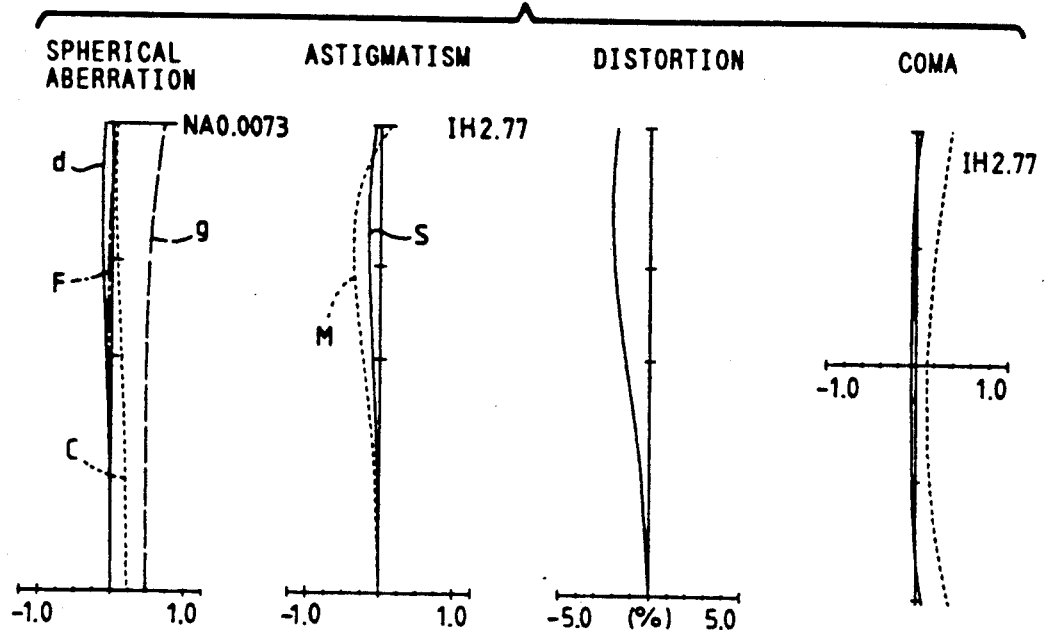
Figure 77:
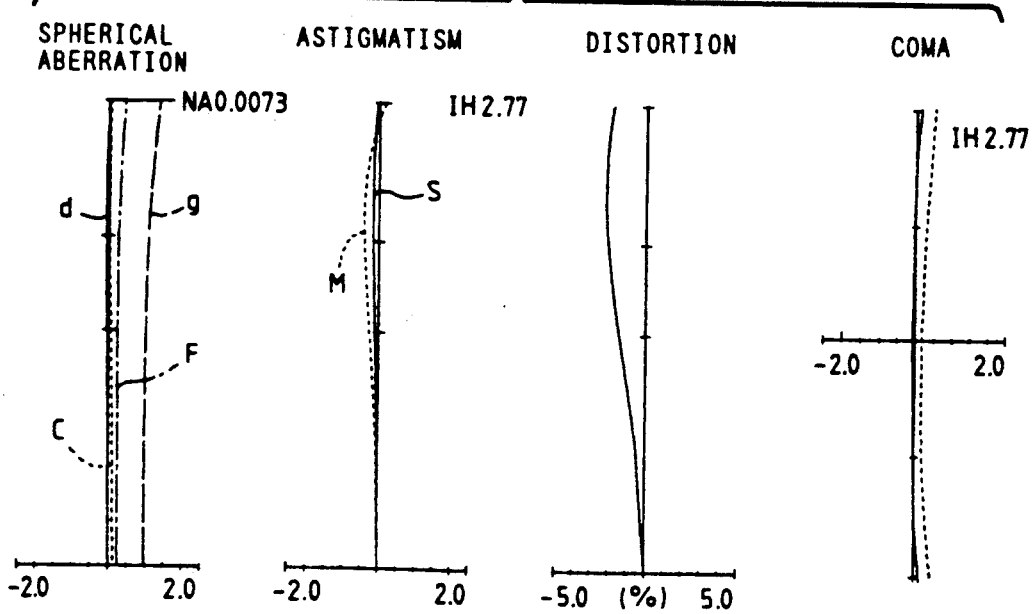
Figure 78:
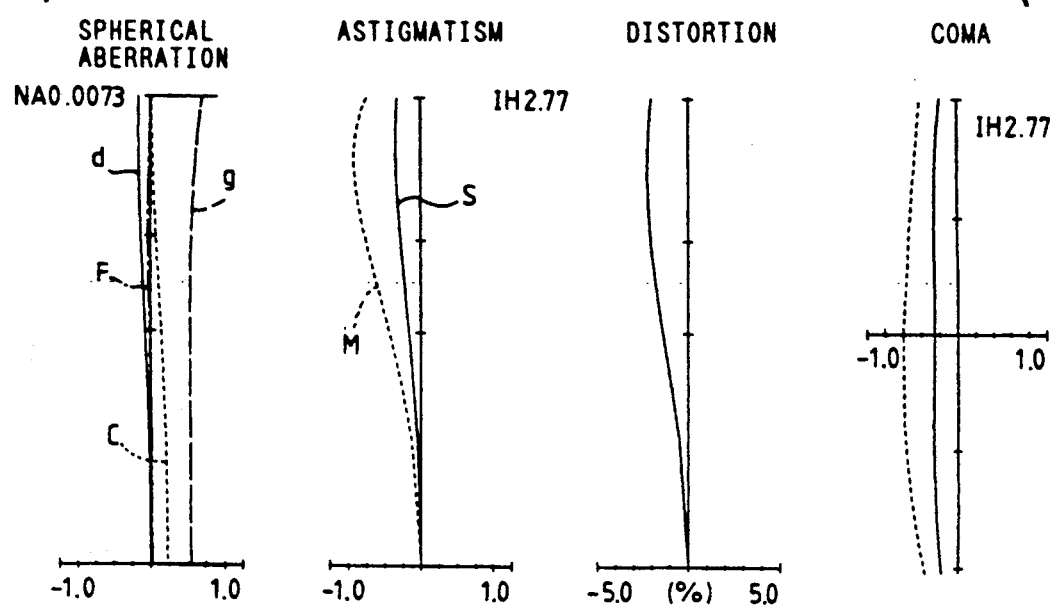
Figure 79:
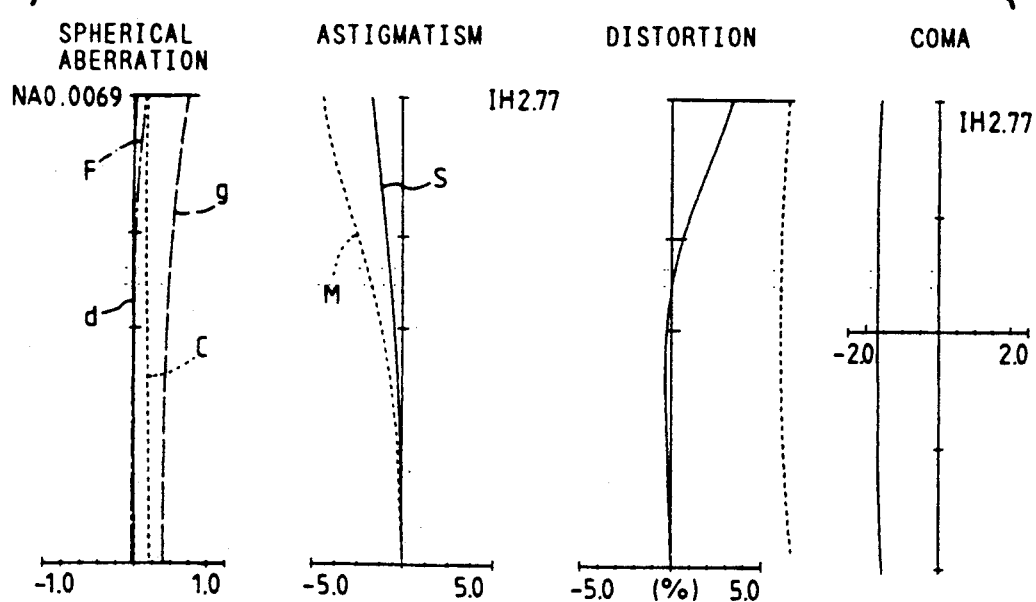
Figure 80:
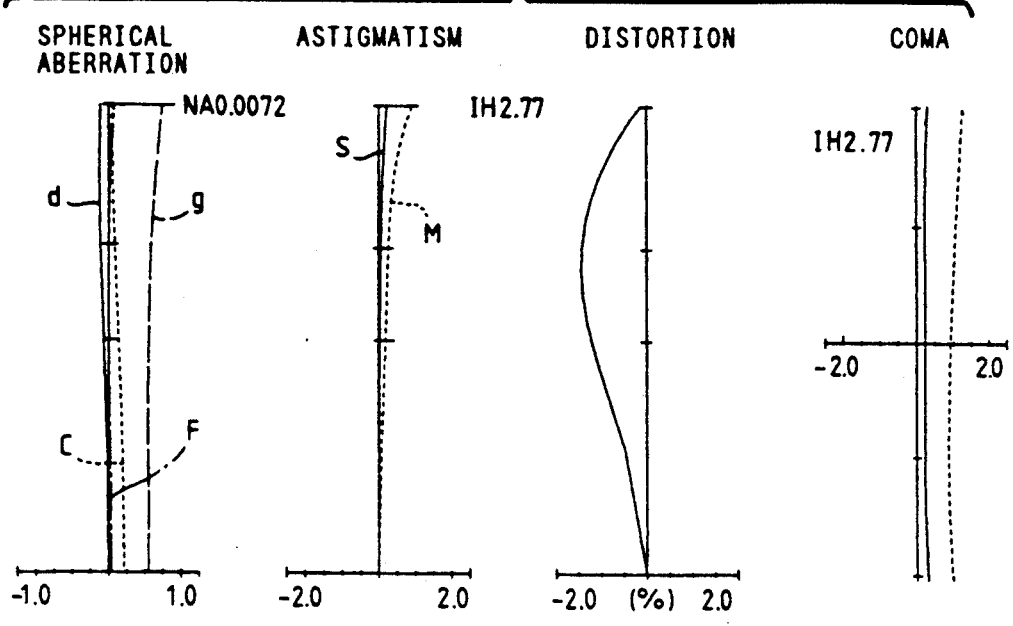
Figure 81:
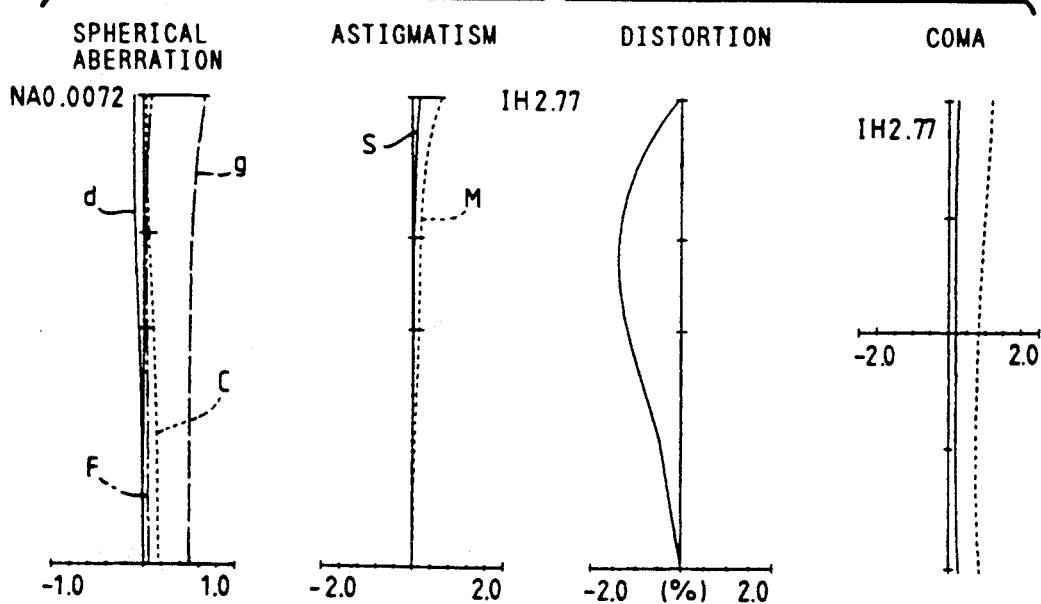
Figure 82:
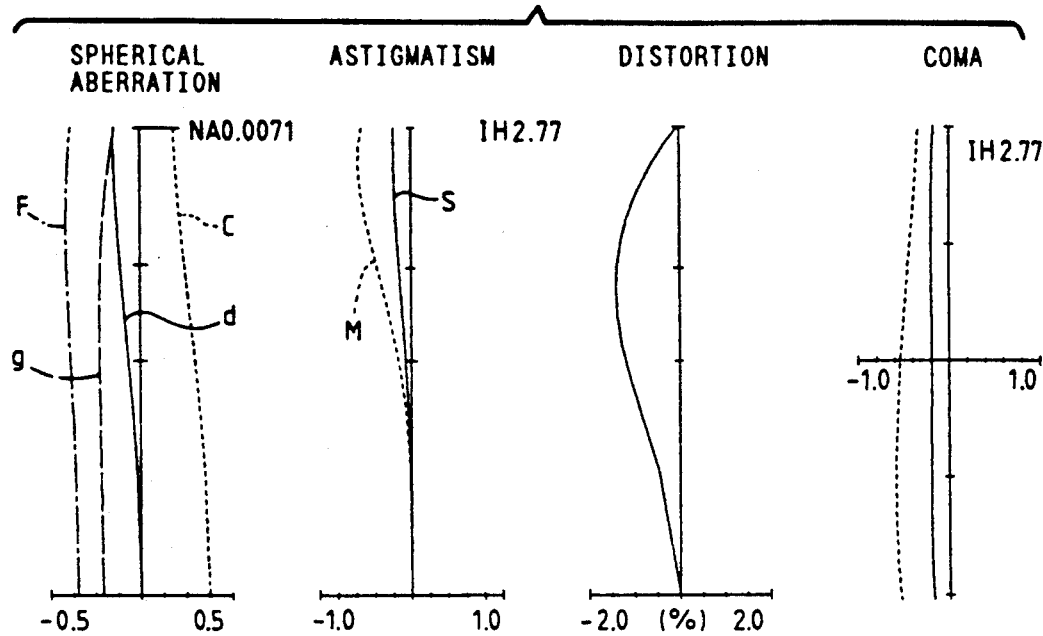
Figure 83:
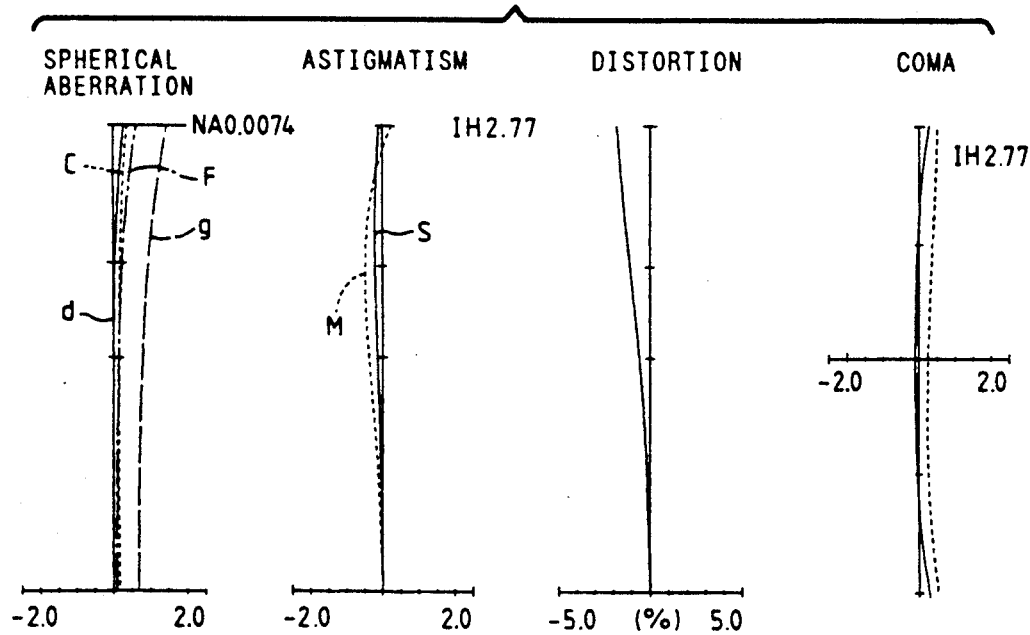
Figure 84:
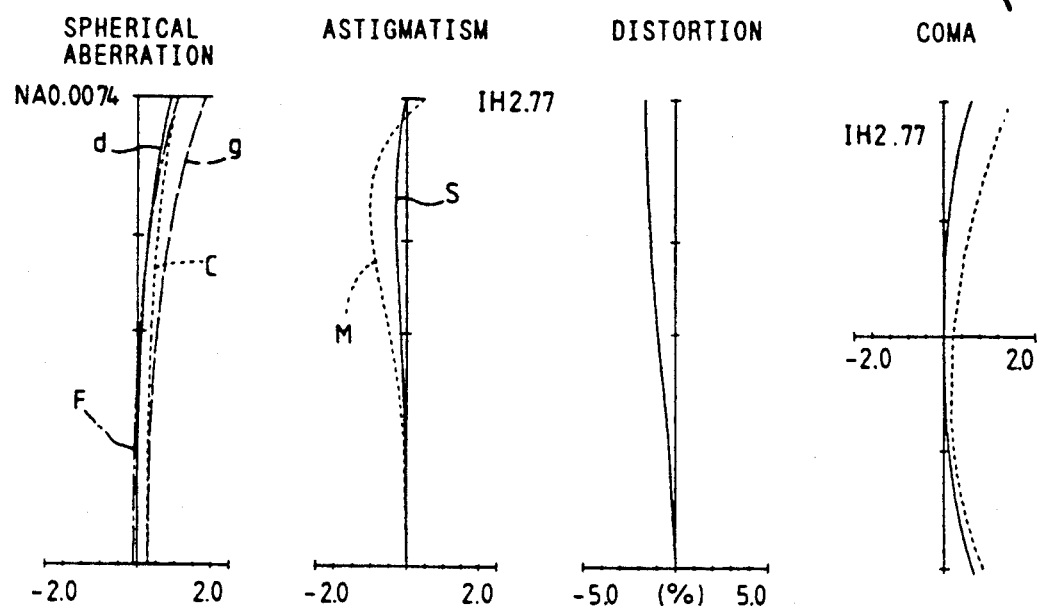
Figure 85:
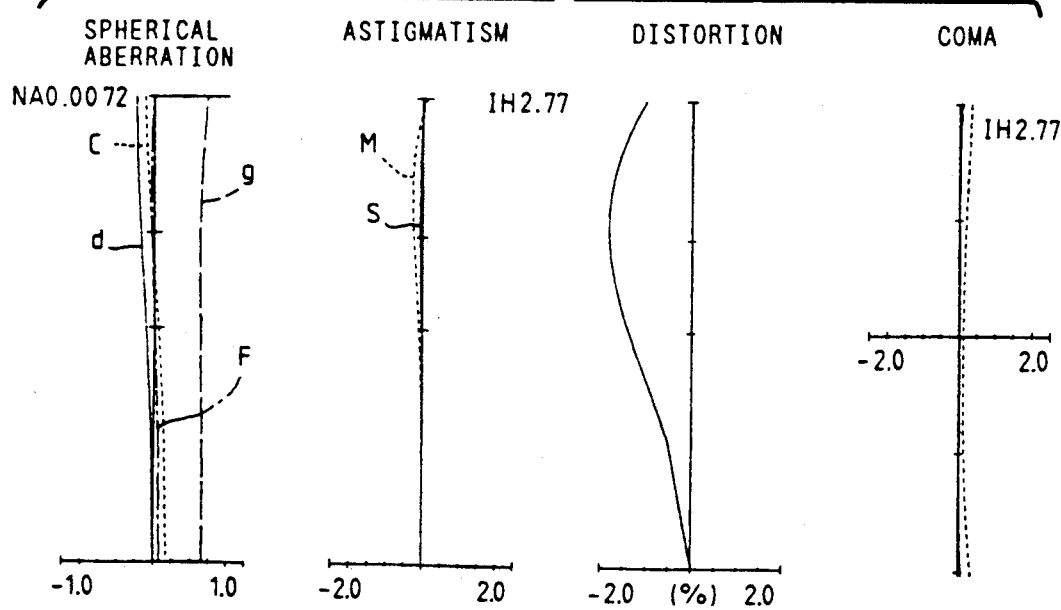

The aspherical surface of this lens element serves for reducing negative distortion and the negative curvature of field produced by this lens element is cancelled with the positive curvature of field produced by the object side concave surface arranged on the second lens unit II. Further, the curvature of field produced by this concave surface also cancels the negative curvature of field to be produced at a later stage by a relay lens system. The Embodiment 1 produces positive curvature of field as illustrated in FIG. 54.

Figure 23:
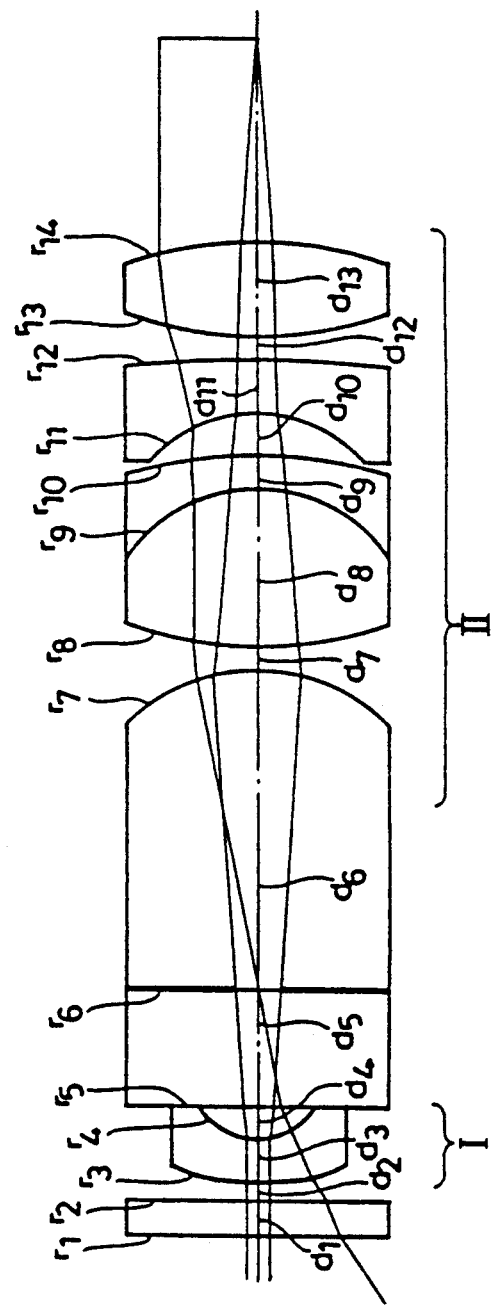

The Embodiment 2 has the composition illustrated in FIG. 23 wherein the first lens unit I consists of a single negative meniscus lens element, whereas the second lens unit II consists of two lens elements which are obtained by separating a cemented doublet.

Since endoscopes have thin distal ends, it is undesirable for arranging field direction changing prisms to use cemented doublets which thicken lens components. Further, single-element lens components are more preferable than a cemented doublet since lens shaping and cementing works become more complicated when a cemented doublet is composed of thin lens elements.

In the Embodiment 2, the second lens unit II has the same function as that in the Embodiment 1, but the number of lens surfaces is increased by separating the cemented doublet and the radius of curvature can be enlarged on the object side concave surface. Accordingly, rays are refracted by this surface at smaller angles, thereby reducing production of coma. Further, aggravation due to eccentricity of the lens elements can be reduced favorably.

Figure 24:
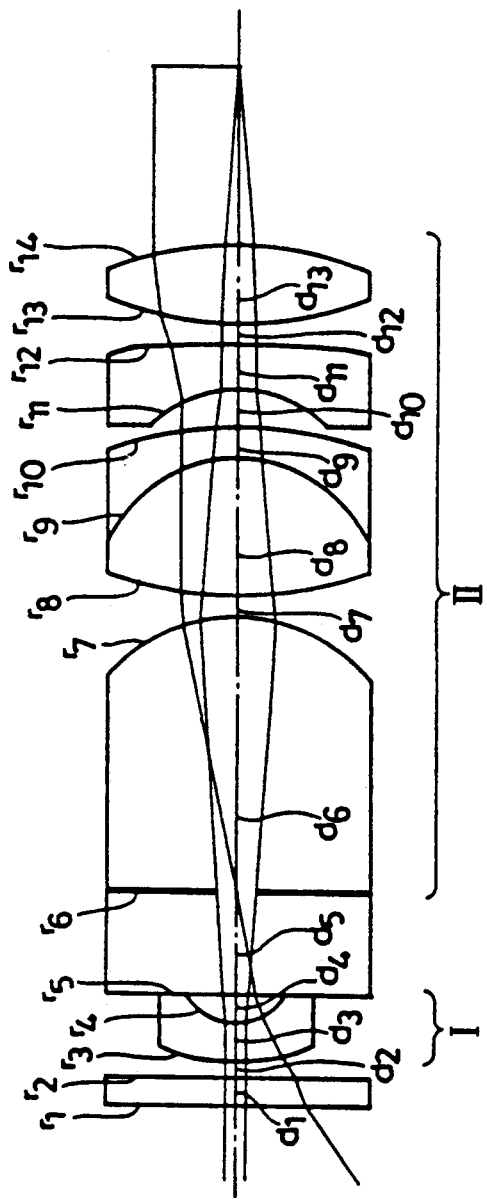
Figure 25:
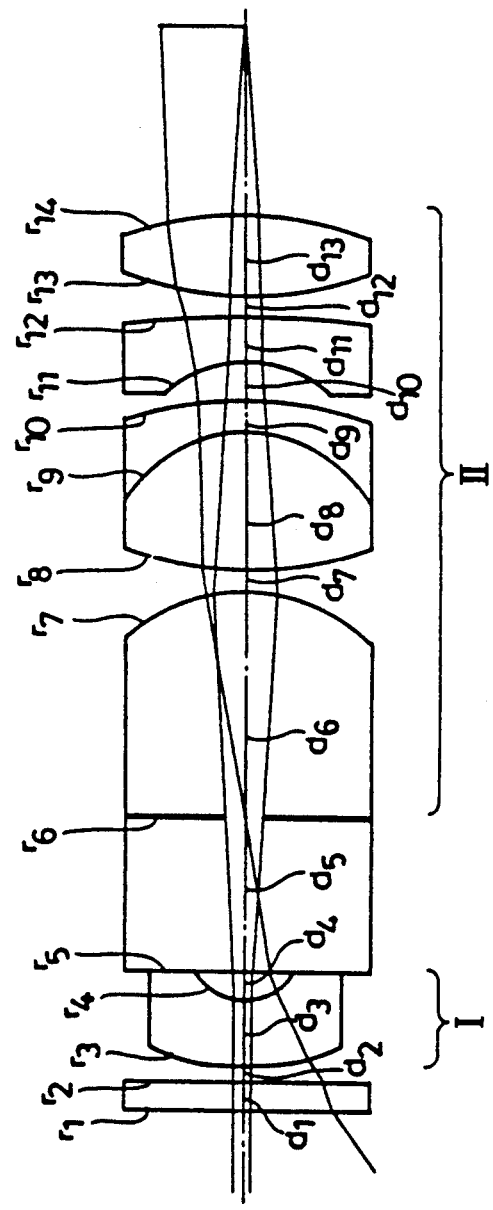
Figure 30:
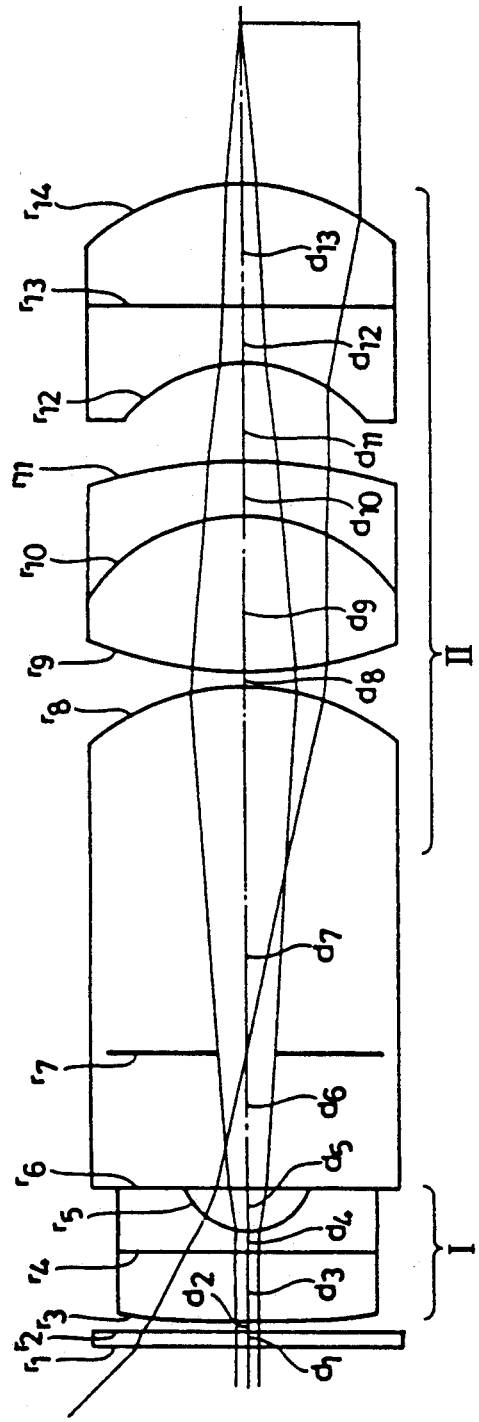
Figure 31:
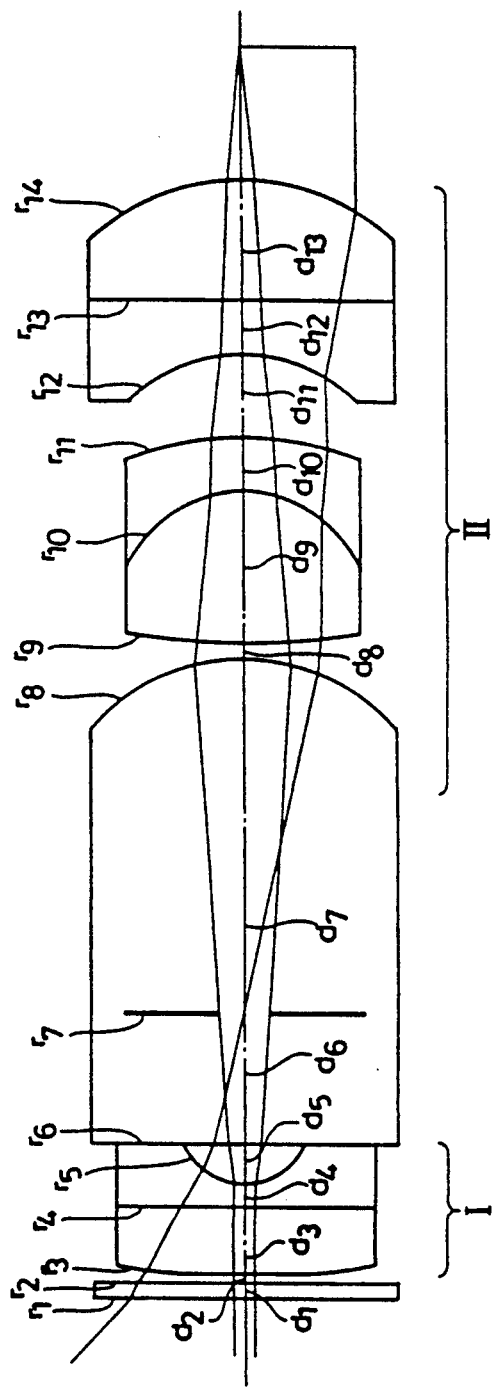

The Embodiments 3 through 5 have the compositions illustrated in FIG. 24 through FIG. 26 respectively wherein material of the aspherical lens element arranged in the first lens unit I is different from that in the Embodiment 2. Further, the aspherical lens elements are different from one another in the thickness thereof in the Embodiment 3 through 5.

Since shaping conditions such as molding temperature are different for shaping the aspherical lens element not by grinding but by molding, it is possible to lessen hindrance on shaping by properly selecting materials. The Embodiment 2 and the Embodiments 3 through 5 are the examples using the aspherical lens elements made of different materials and serve for facilitating to select adequate materials for the aspherical lens elements. Further, it is possible to lessen hindrance on molding caused by the small diameter of the aspherical lens element by increasing thickness of the aspherical lens element within a range allowed by the outside diameter thereof. If outside diameter of the aspherical lens element is reduced while keeping the small outside diameter unchanged, hindrance on molding will be produced due to too thin edge of the aspherical lens element.

The Embodiment 6 through 10 have the compositions illustrated in FIGS. 27 through 31 respectively, and have field angles and/or correction degrees of distortion which are different from one another and also from those in the Embodiment 1.

Out of these Embodiments, the Embodiments 6 and 7 are designed for a field angle of 70° which is the same as that in the Embodiment 1, and distortion at degrees of −1.0% and −0.5% respectively in contrast to the other Embodiments designed for distortion at a degree of −4.5%. The objective lens systems having distortion at the different degrees make it possible to observe objects favorably in accordance with shapes of the surfaces thereof. Not only objects having plane surfaces but also objects having spherical surfaces having slight irregularities can be observed as images free from distortion at intermediate image height and marginal image height by replacing objective lens systems so as to select an objective lens system matched with shape of an object to be observed.

Further, the Embodiments 8 through 10 are designed for the same field angle of 90° but different in correction degree of distortion. These have a field angle wide enough to permit observing a wide range of object without distortion.

The Embodiments 11 and 12 have the compositions illustrated in FIGS. 32 and 33 respectively wherein the first lens unit I consists of a single lens component like that used in the Embodiment 1, but the second lens unit II consists of two lens components both designed as cemented doublets. As already described with reference to the Embodiment 2, it is desirable to design both the lens components as cemented doublets so long as coma is not aggravated by the object side concave surface and aberrations are produced at higher degrees. Speaking concretely, the spacing rings are made unnecessary between the lens components and the number of component members is reduced by designing the lens components as the cemented doublets.

Further, the Embodiment 12 has a total length larger than that of the Embodiment 11 and permits freely selecting length of the distal end of endoscopes.

Figure 34:
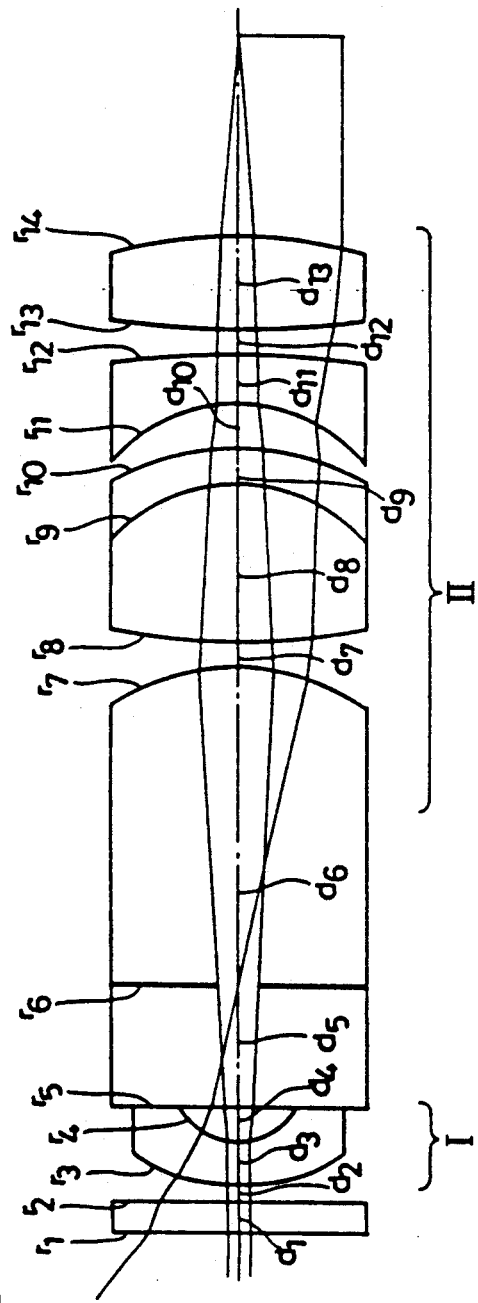

The Embodiment 13 has the composition illustrated in FIG. 34 and is different from the Embodiment 2 in that distortion is −0.5% at the marginal portion of an image formed by the Embodiment 13.

Figure 35:
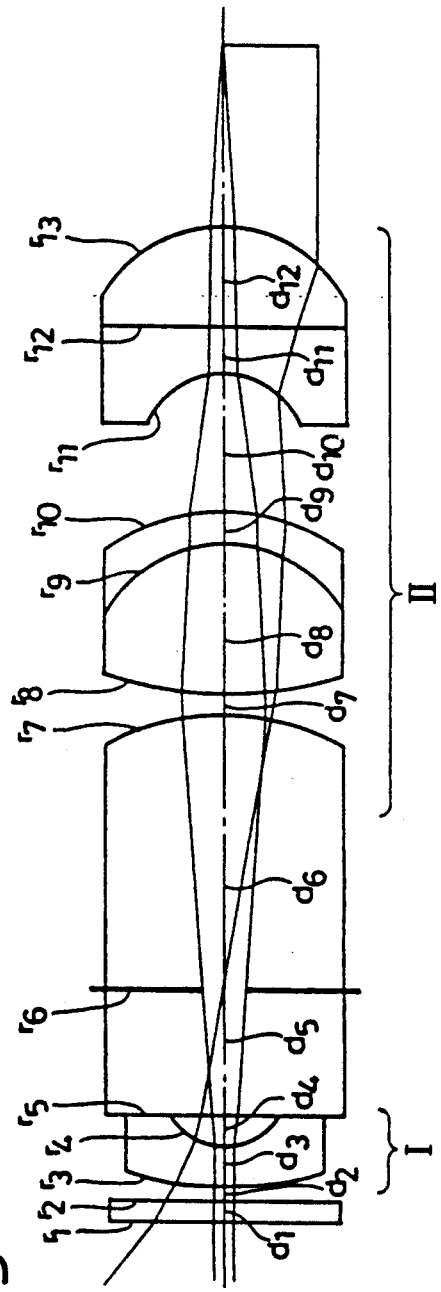

The Embodiment 14 has the composition illustrated in FIG. 35 which is similar to those of the Embodiments 11 and 12. However, the Embodiment 14 is designed for distortion of −10% at the marginal portion of an image.

Figure 36:
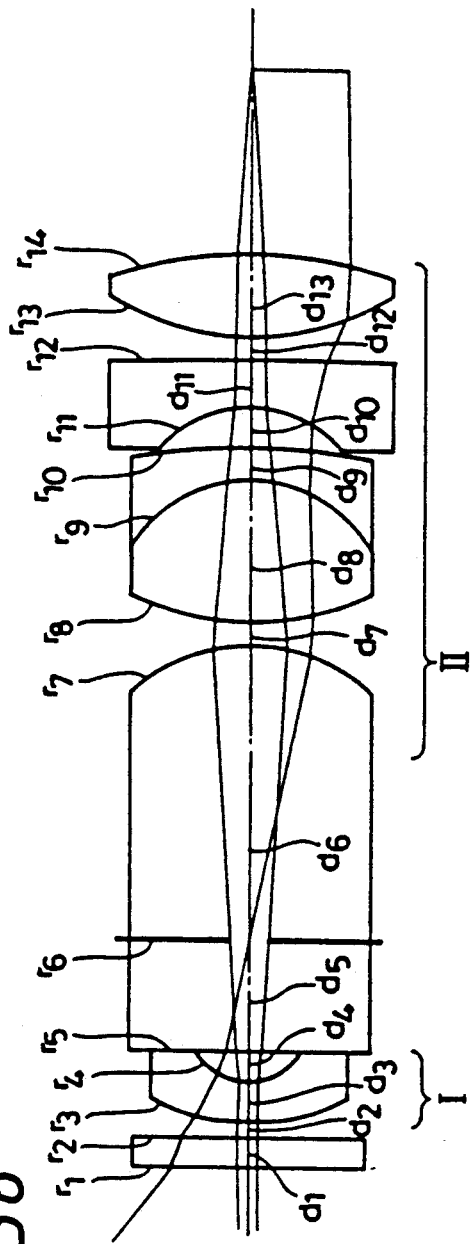

The Embodiment 15 has the composition illustrated in FIG. 36 and is different from the Embodiment 2 in that the former is designed for distortion of −10% at the marginal portion of an image. Further, the Embodiment 15 is designed for curvature of field less than those in the other Embodiments, and permits arranging an image guide and a solid-state image pickup device for application to various purposes.

Figure 37:
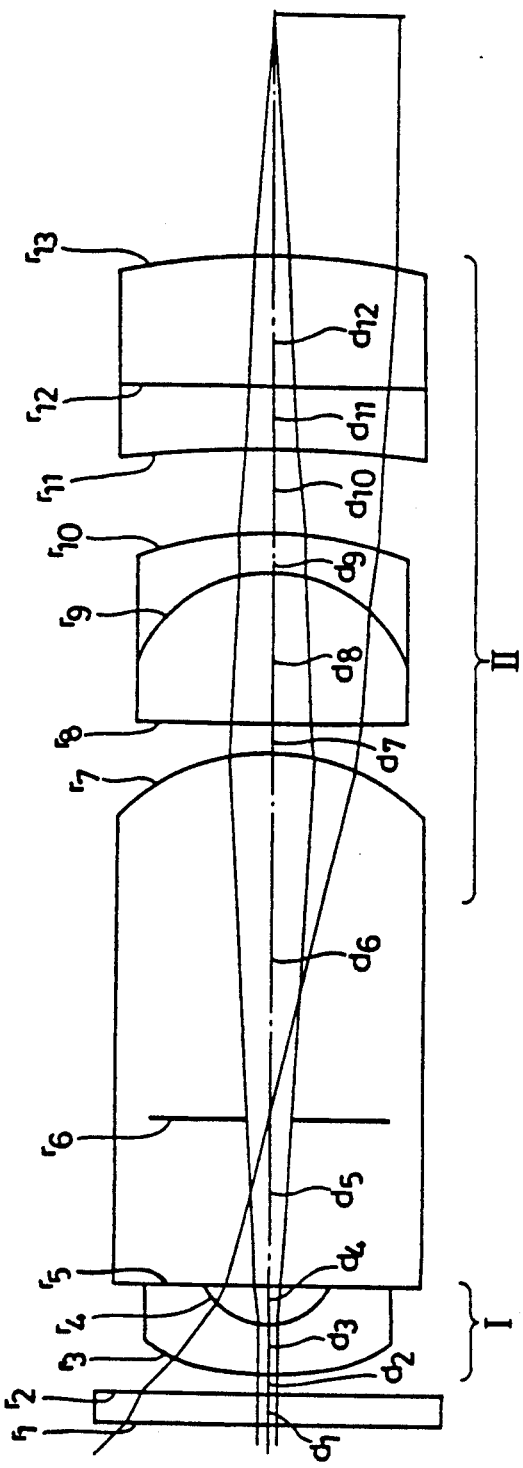

The Embodiment 16 has the composition illustrated in FIG. 37 and is different from the Embodiment 11 or 12 in that the Embodiment 16 is designed for a field angle of 40°.

Figure 38:
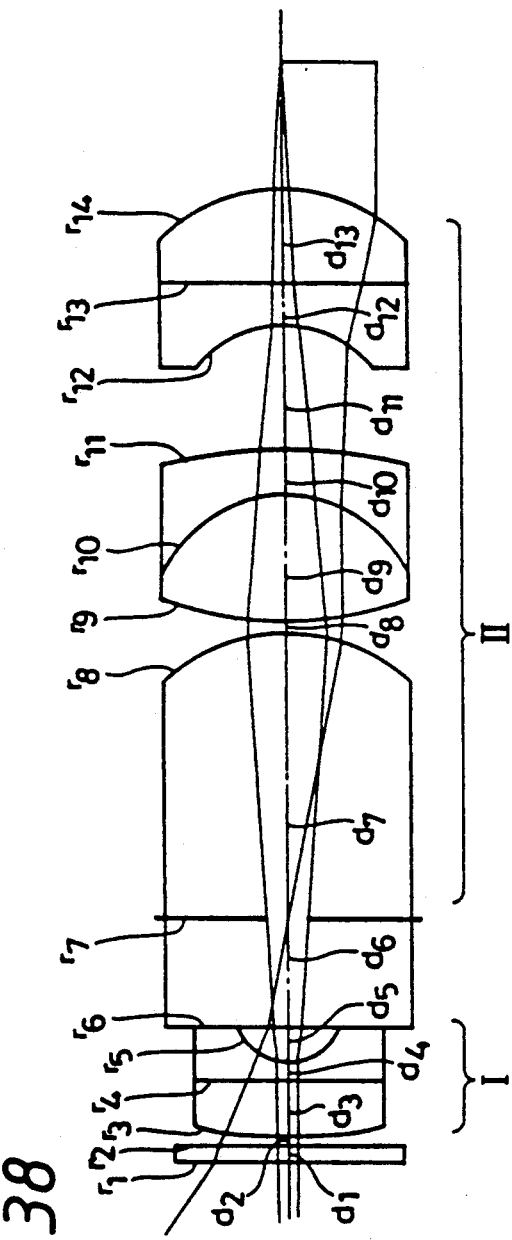
Figure 39:
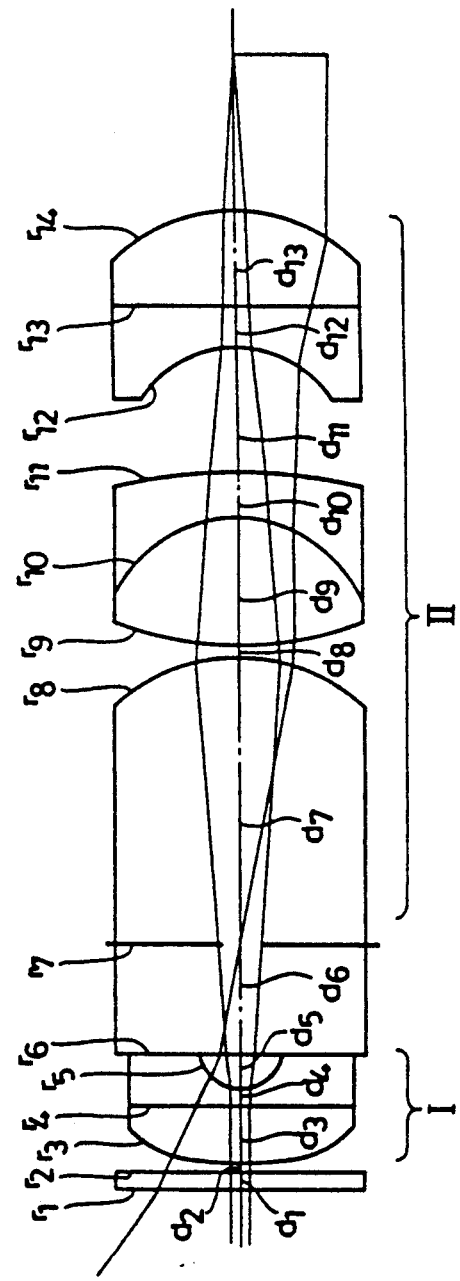

The Embodiments 17 and 18 have the compositions illustrated in FIGS. 38 and 39 respectively. These Embodiments are different from the Embodiment 1 in that the aspherical surfaces used in the Embodiments 17 and 18 are expressed only by the coefficient of fourth order (the Embodiment 17) or sixth order (the Embodiment 18) in the formula for shape of aspherical surface. It is preferable to design shape of an aspherical surface by selecting only one of the coefficients of fourth order, sixth order, eighth order since such selection simplifies the calculations for examining shape of the aspherical surface at the design stage, facilitates judgement of the shape, and makes it easy to design and manufacture molding dies.

Figure 40:
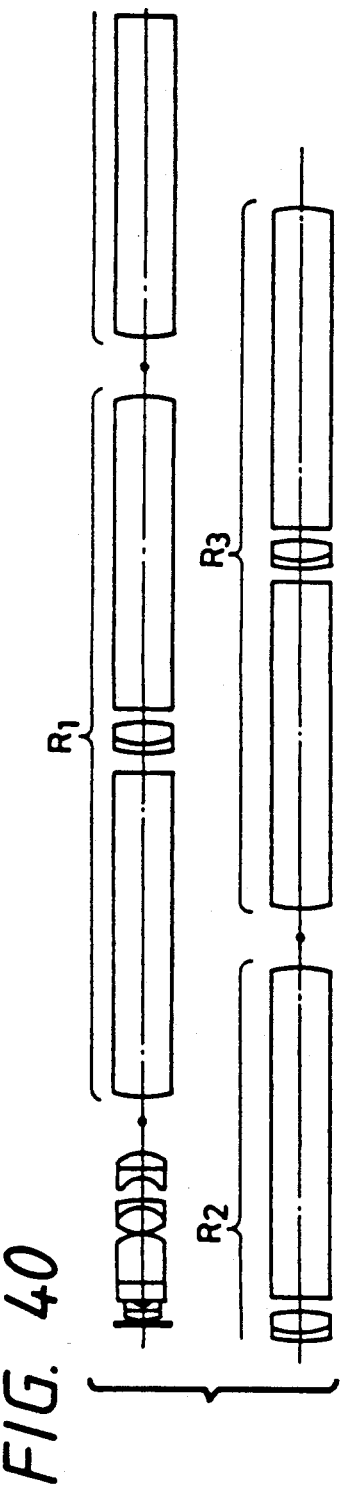
Figure 41:
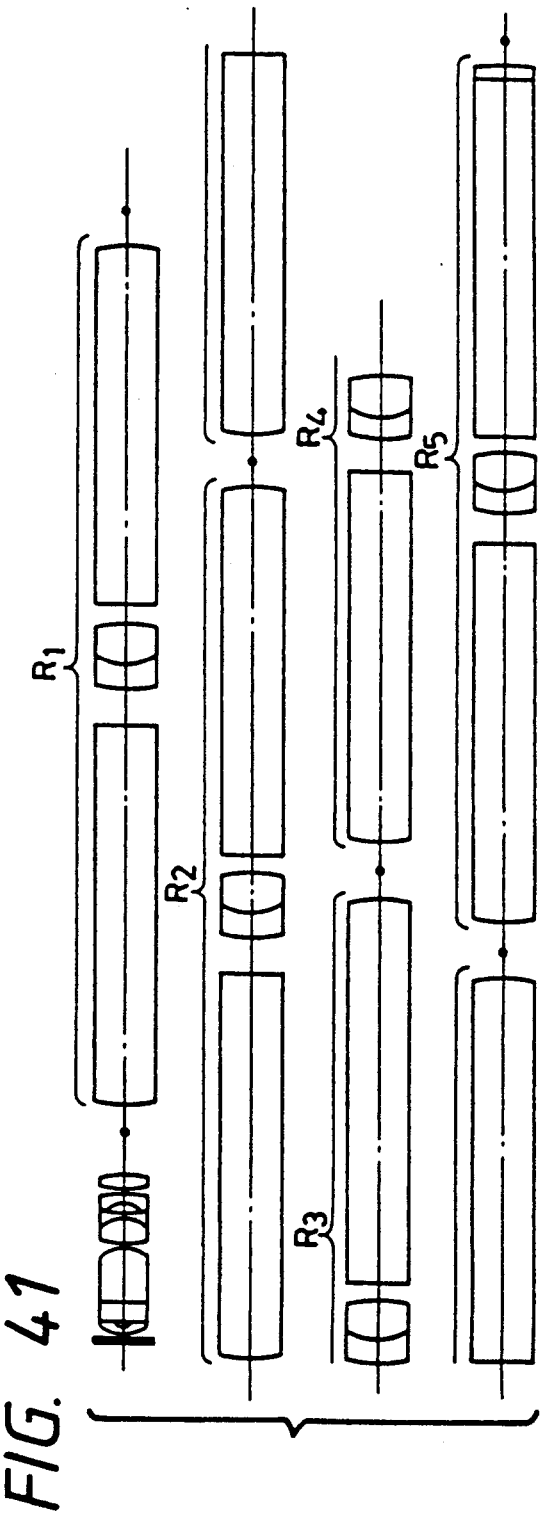

The Embodiments 19 and 20 have the compositions illustrated in FIGS. 40 and 41 respectively wherein relay lens systems for relaying images three times and five times are added in the objective lens systems described as the Embodiments 1 and 2 respectively.

By adding relay lens systems, as in the cases of the Embodiments 19 and 20, for transmitting an image for a selected relay times of 3, 5, 7, 11, ..., it is possible to obtain endoscopes having required lengths and brightness. Graded refractive index lenses may be used for composing the relay lens systems to be used in the objective lens systems for endoscopes according to the present invention.

Figure 42:
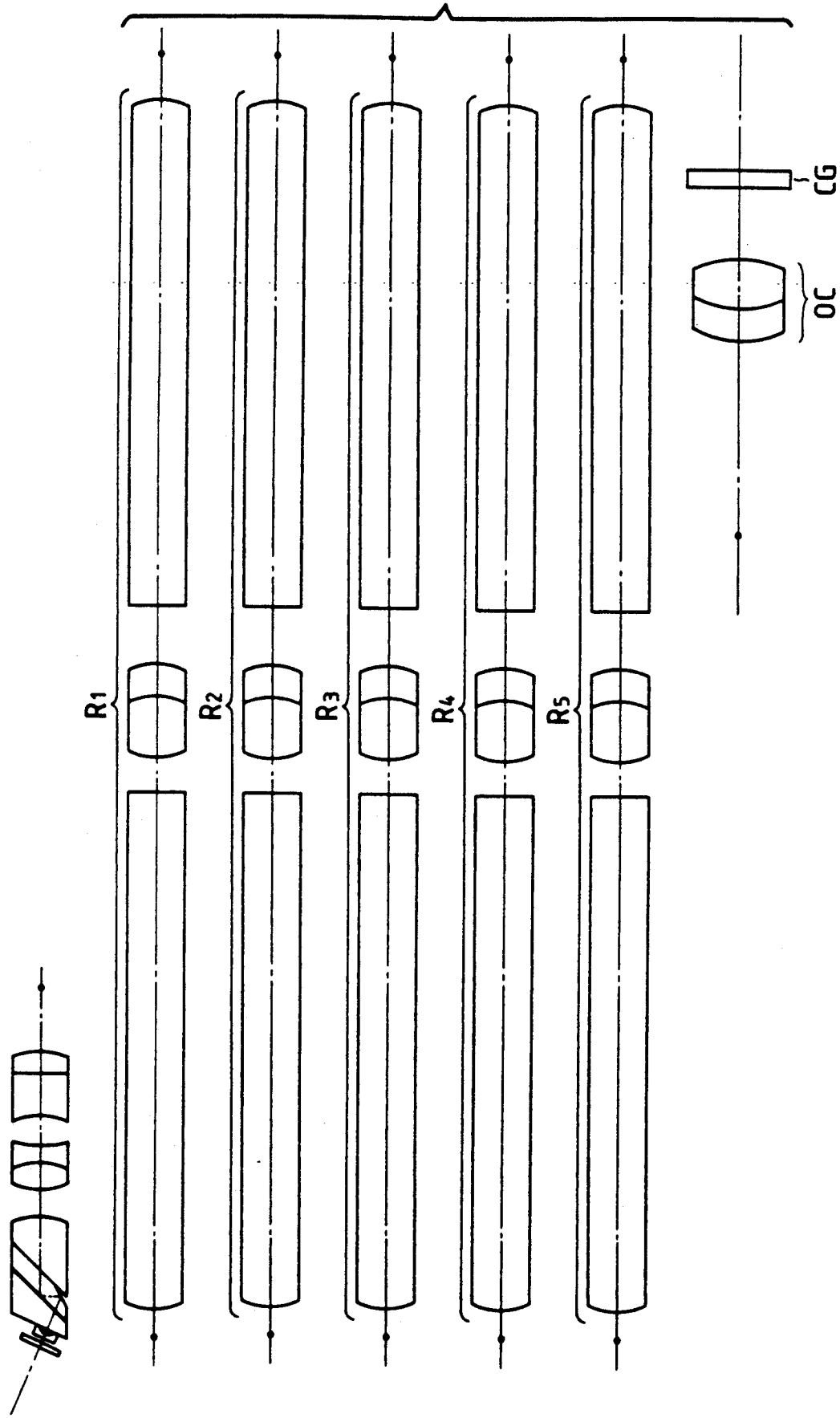
Figure 43:
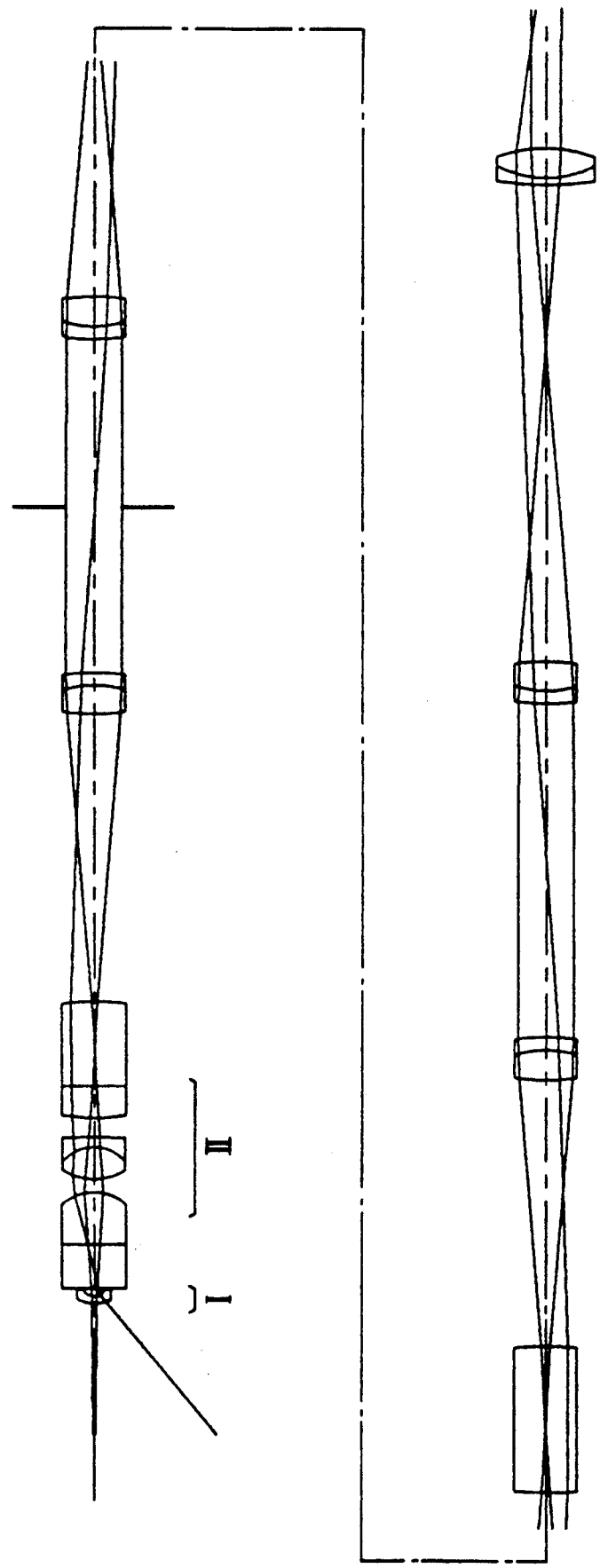
Figure 44:
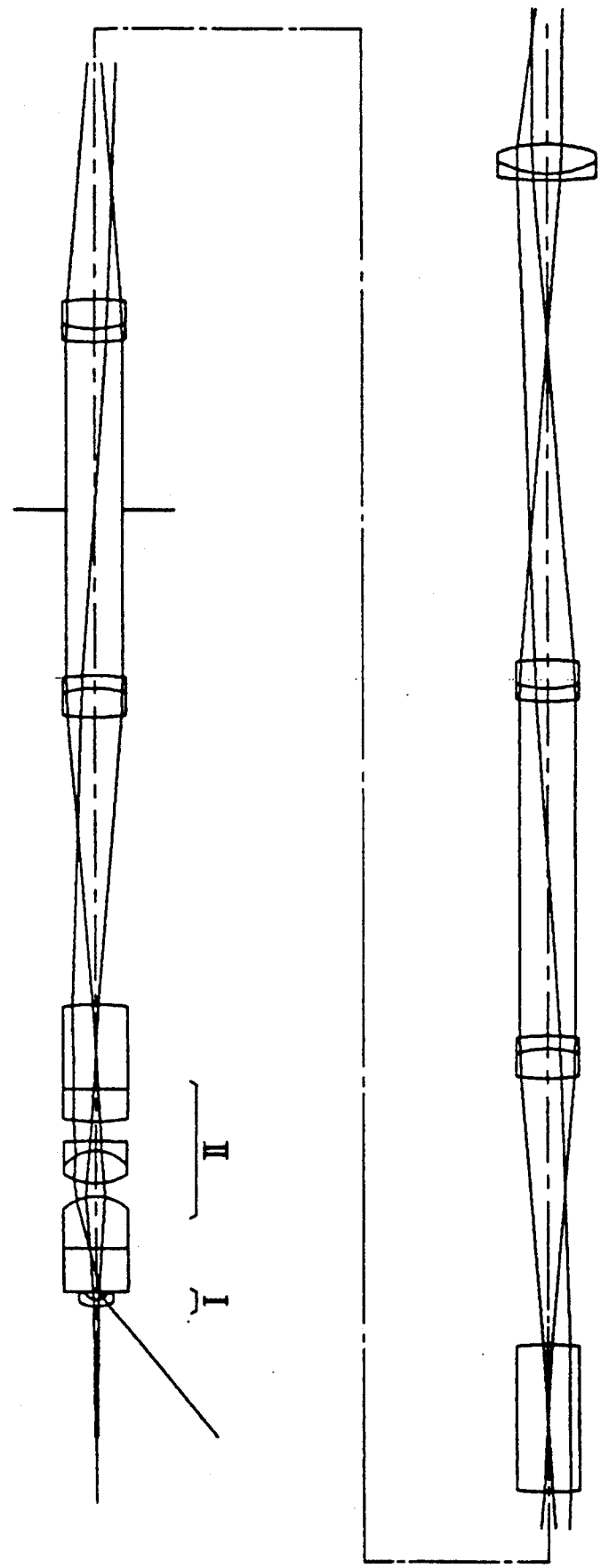
Figure 45:
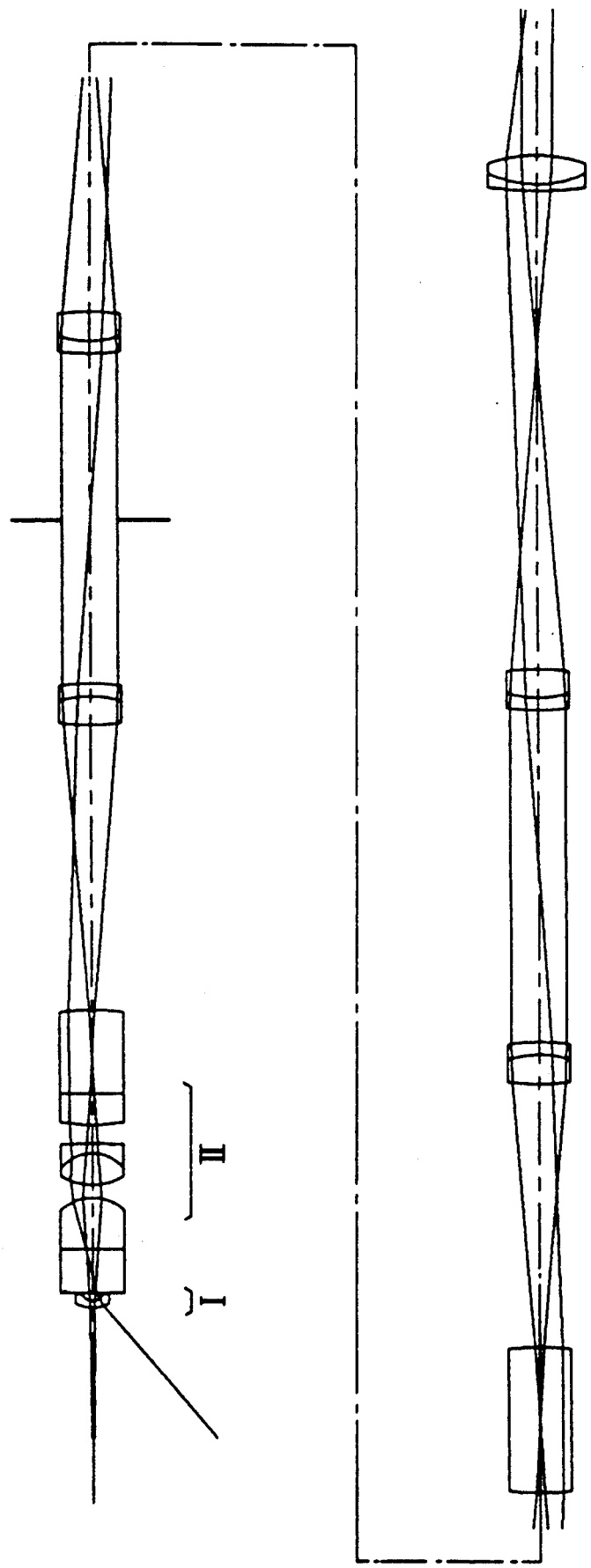
Figure 46:
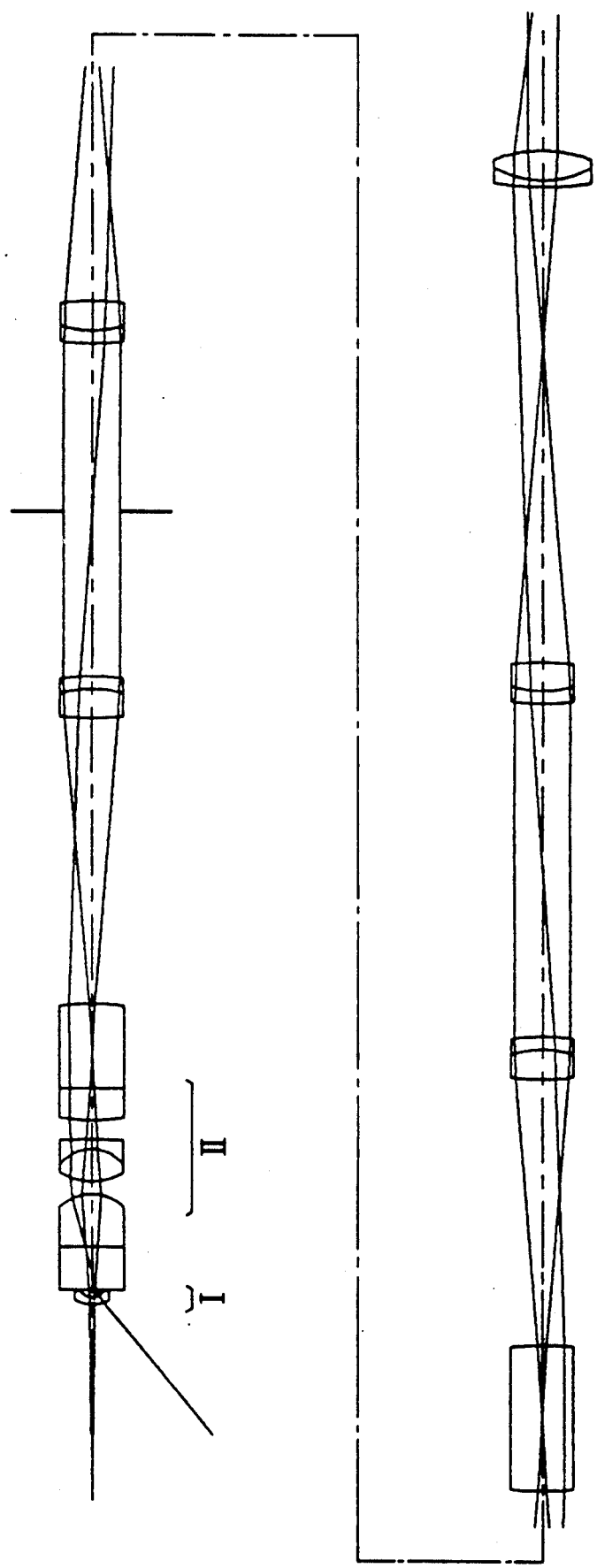
Figure 47:
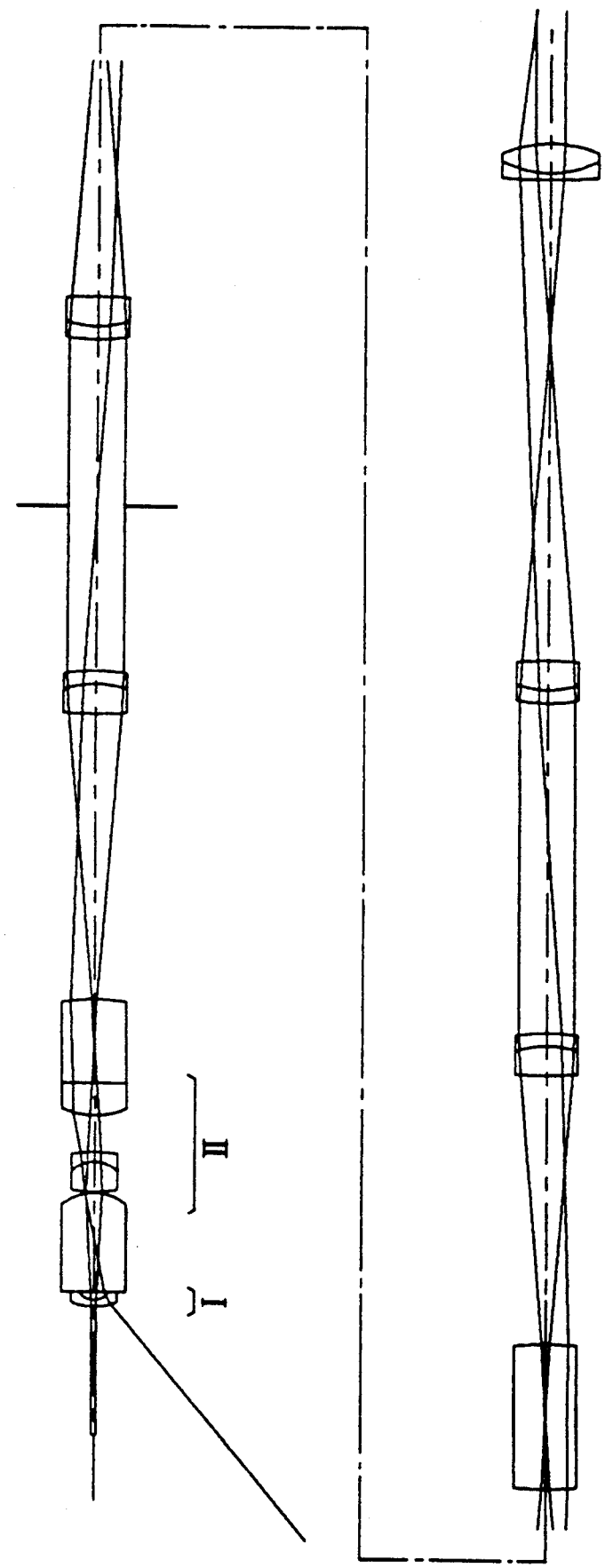
Figure 48:
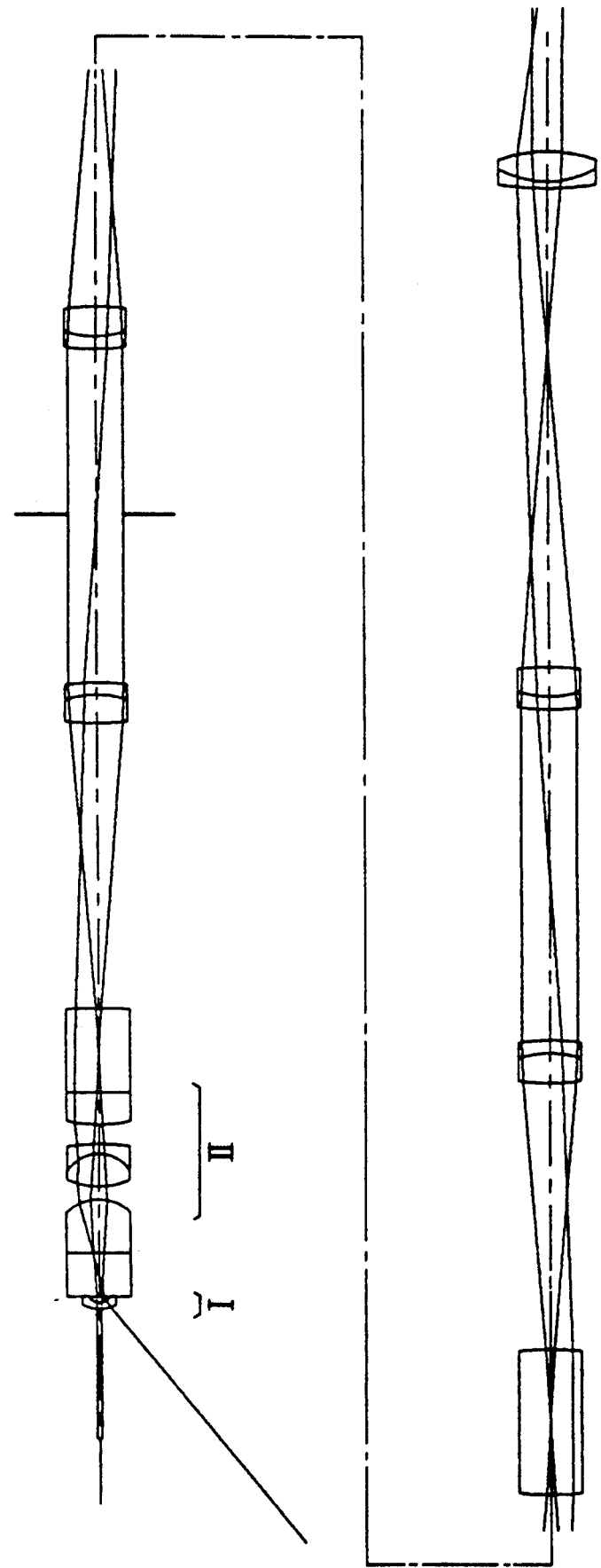
Figure 49:
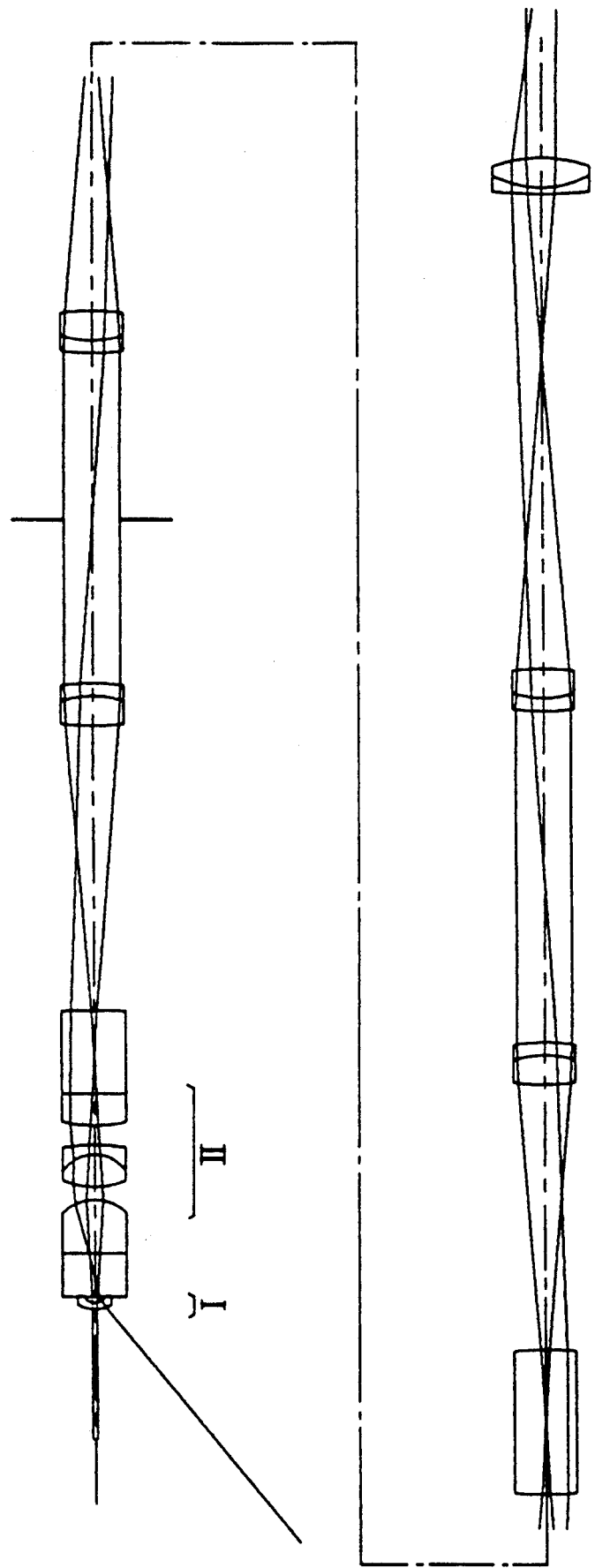
Figure 50:
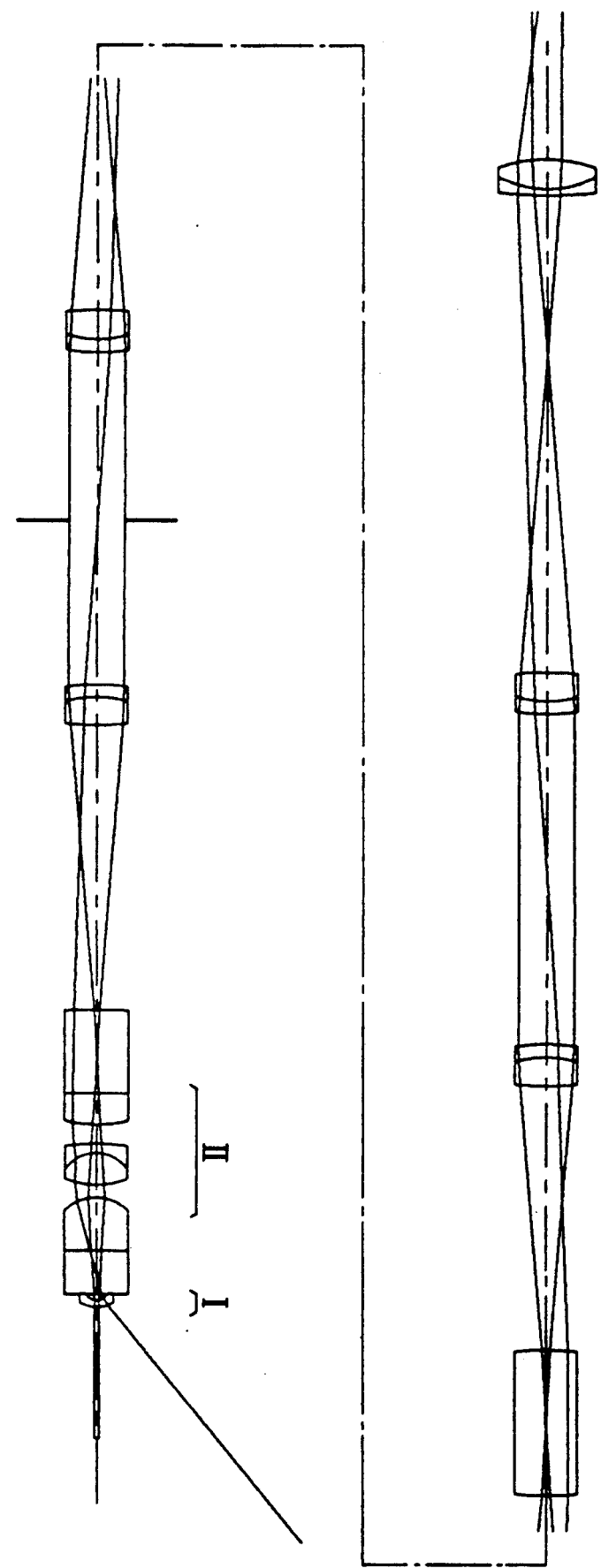
Figure 51:
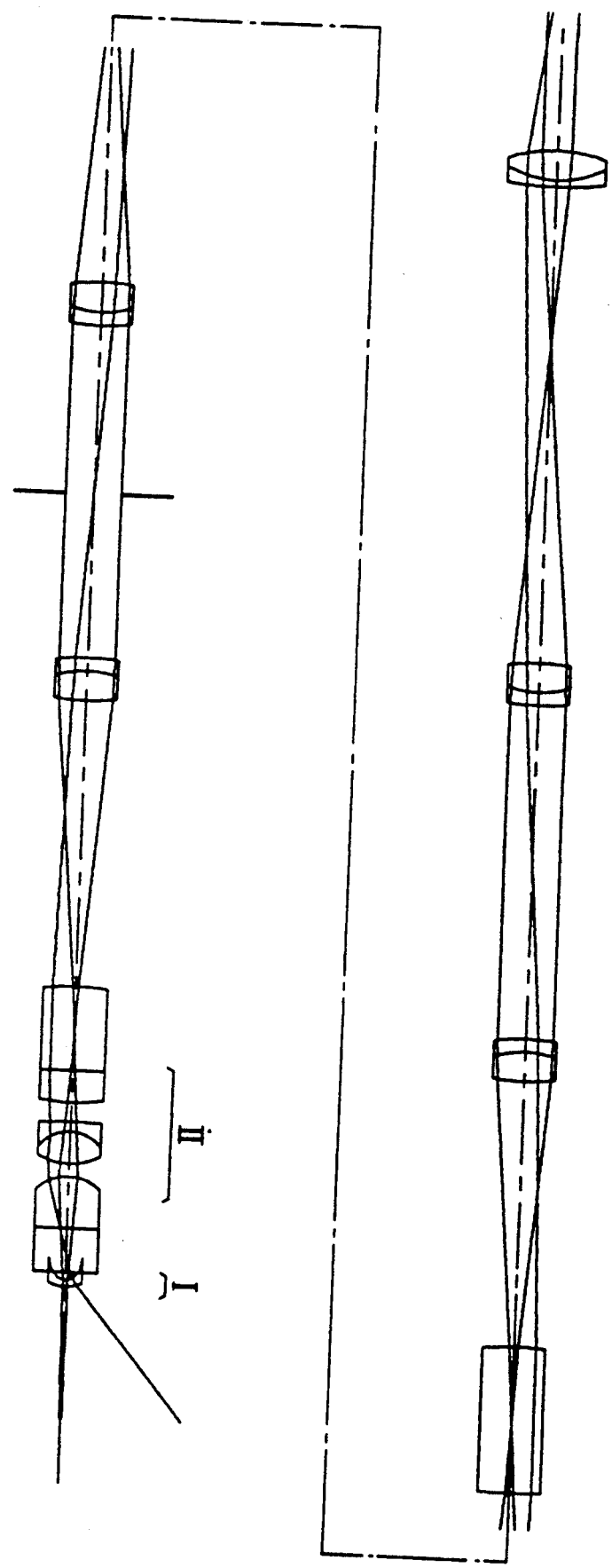
Figure 52:
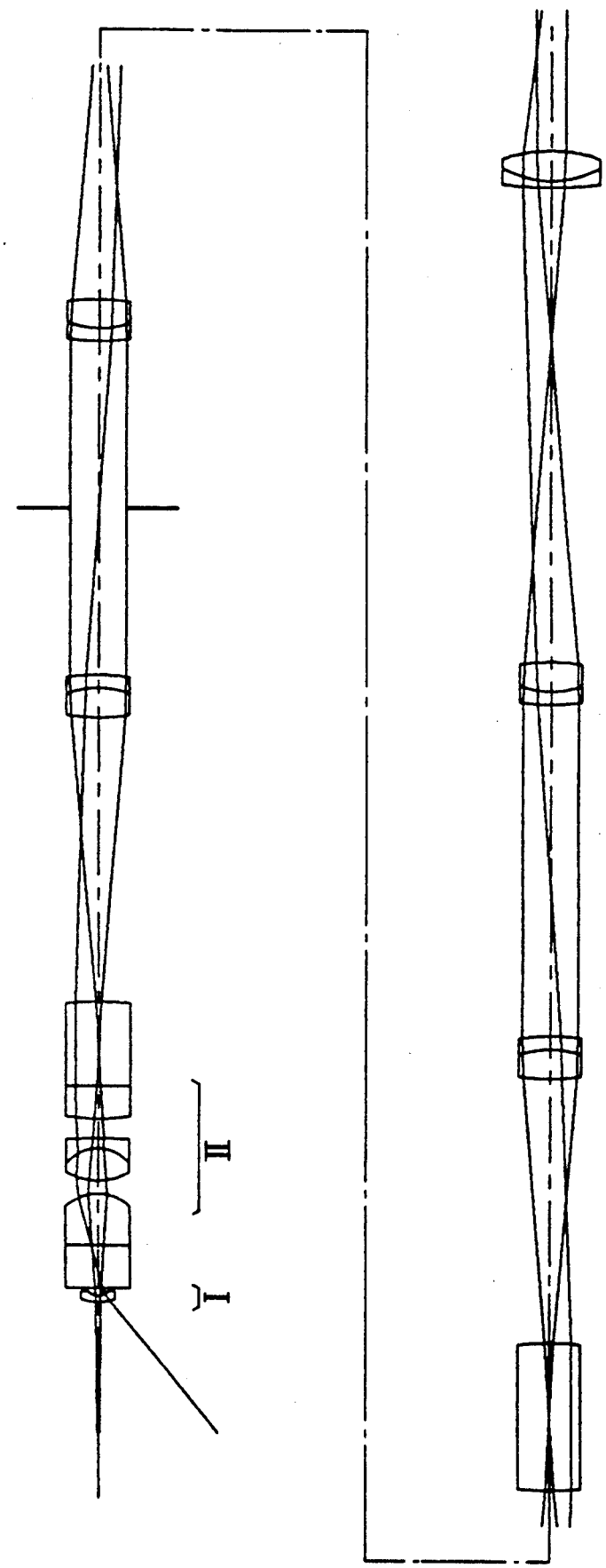
Figure 53:
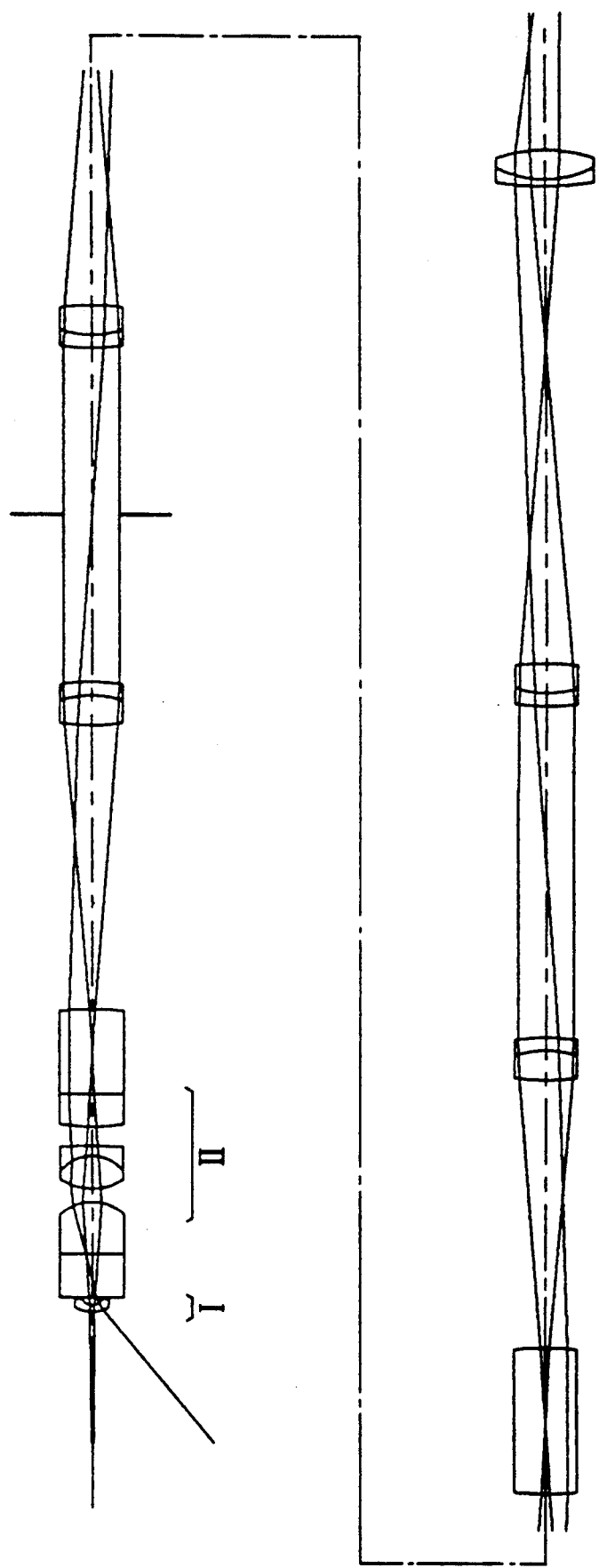

The Embodiment 21 is an optical system having the composition illustrated in FIG. 42. This Embodiment is an objective lens system wherein a portion of the long bar-shaped lens component is replaced with a field direction changing prism. By this means, the Embodiment 21 is designed as an oblique viewing objective lens system for endoscopes. Further, the Embodiment 21 is an optical system for endoscopes in which an image is relayed five times by relay lens systems R. In this drawing, the reference symbol E represents an eyepiece, and the reference symbols $C_1$ and $C_2$ designate cover glasses respectively.

In the Embodiments 1 through 20 out of the Embodiments described above, the cover glass C is made of sapphire.

The Embodiments 22 through 32 are examples wherein the objective lens system for endoscopes according to the present invention is applied to non-flexible endoscopes so adapted as to transmit an image formed by said objective lens system rearward through relay lens systems and allow to observe the transmitted image through an eyepiece. Each of the objective lens systems in these Embodiments comprises a first lens unit consisting of a single lens component having negative refractive function and a second lens unit having negative refractive function. The object side surface of the single lens component having the negative refractive function is designed as an aspherical surface in the Embodiments 22 through 29. Further, the image side surface of said single lens component having the negative refractive function is designed as an aspherical surface in the Embodiments 27 and 28, whereas both the object side surface and the image side surface of said lens components are designed as aspherical surfaces.

Figure 3A:
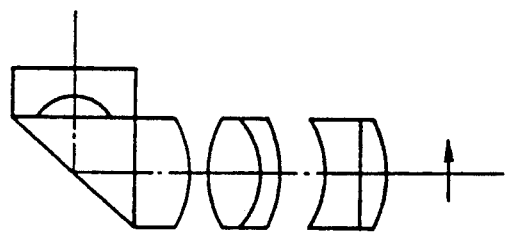
FIG. 3A, FIG. 3B and FIG. 3C show sectional views of the conventional objective lens systems for endoscopes comprising field direction changing prisms.
Figure 3B:
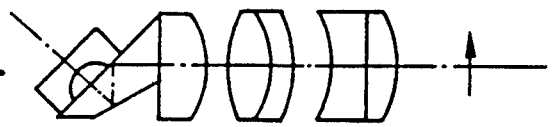
Figure 3C:
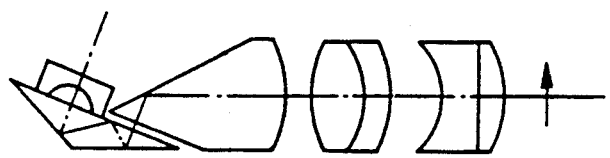
Figure 4:
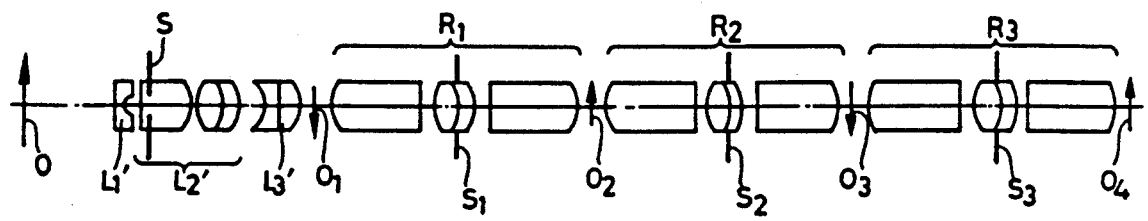
FIG. 4 shows a sectional view illustrating the conventional optical system for non-flexible endoscopes.
Figure 5:
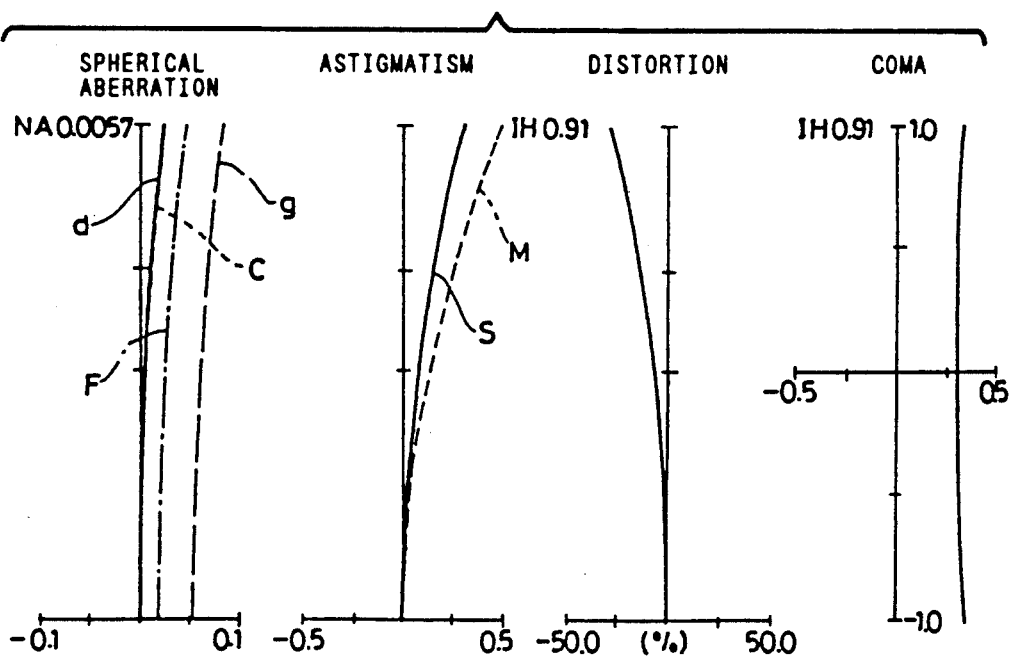
FIG. 5 shows graphs illustrating aberration characteristics of the optical system shown in FIG. 4.
Figure 6:
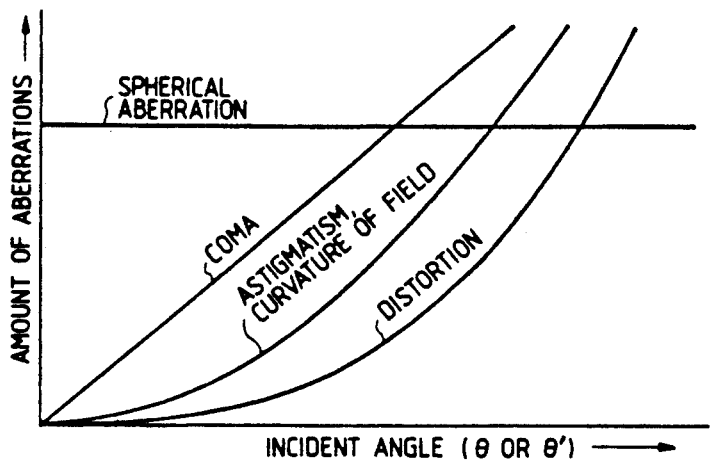
FIG. 6 shows graphs illustrating relationship between inclination angle of the principal ray and aberrations in the conventional objective lens systems for endoscopes.
Figure 7:
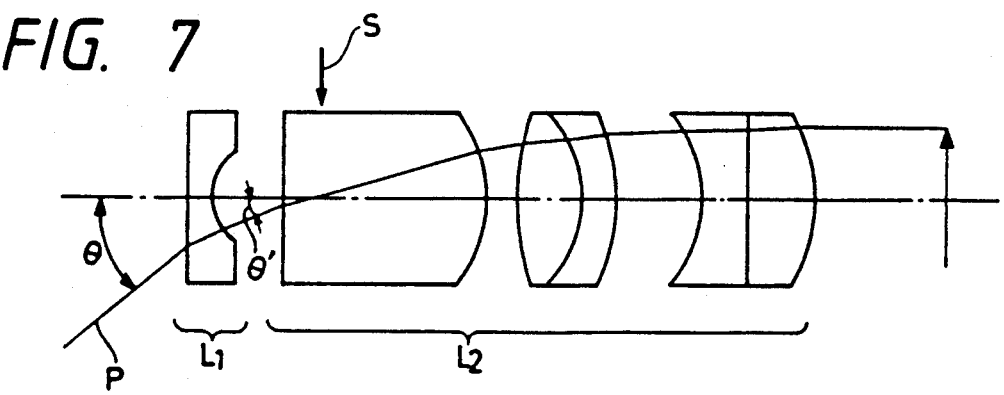
FIG. 7 shows a sectional view illustrating travelling course of the principal ray in the conventional objective lens systems for endoscopes.
Figure 8:
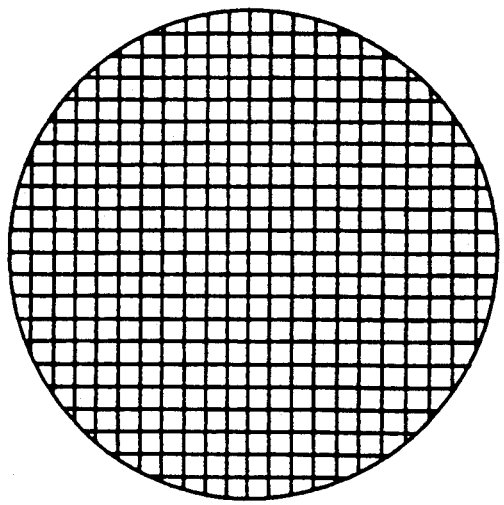
FIG. 8 and FIG. 9 show images of lattice patterns formed by optical systems having 0% and 30% of distortion respectively.
Figure 9:
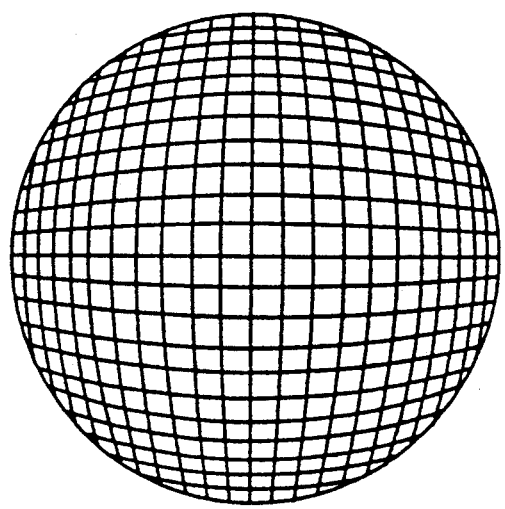
Figure 10:
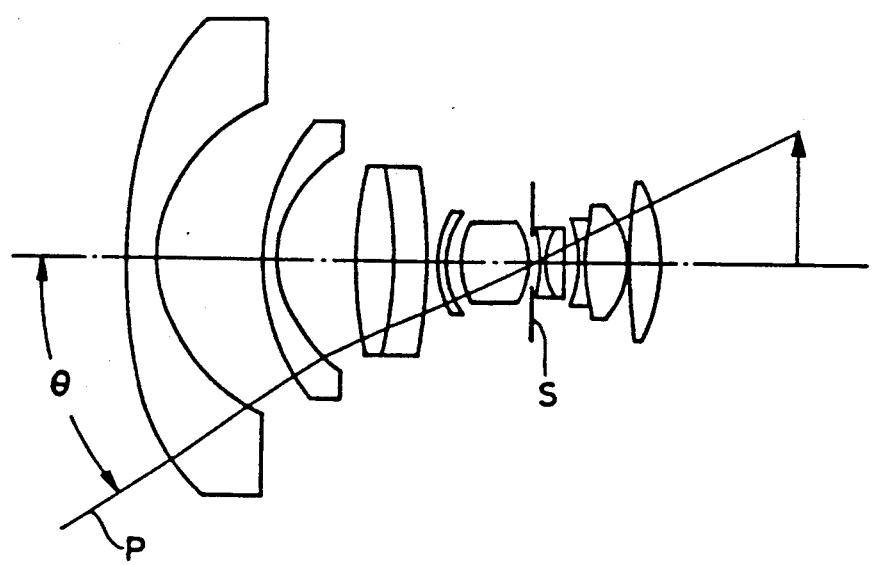
FIG. 10 shows a sectional view illustrating a photographic lens system having little distortion.
Figure 11:
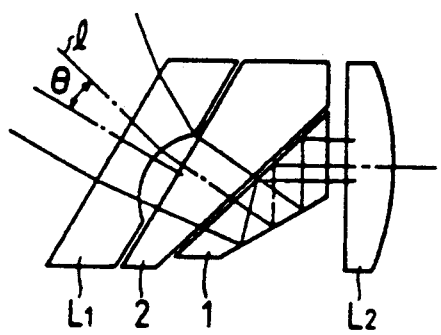
FIG. 11 and FIG. 12 show sectional views illustrating the conventional field direction changing optical systems for oblique viewing.
Figure 12:
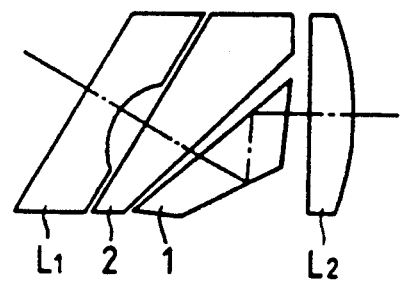
Figure 14A:
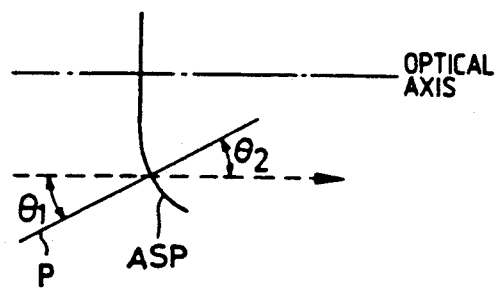
FIG. 14A and FIG. 14B show diagrams illustrating conditions of the principal ray refracted by aspherical surfaces.
Figure 14B:
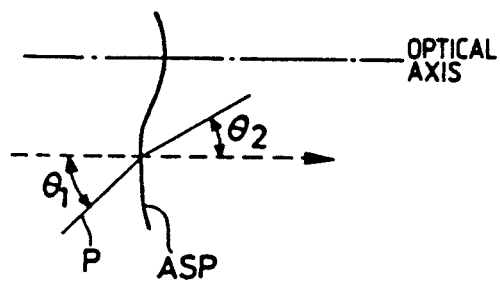
Figure 13:
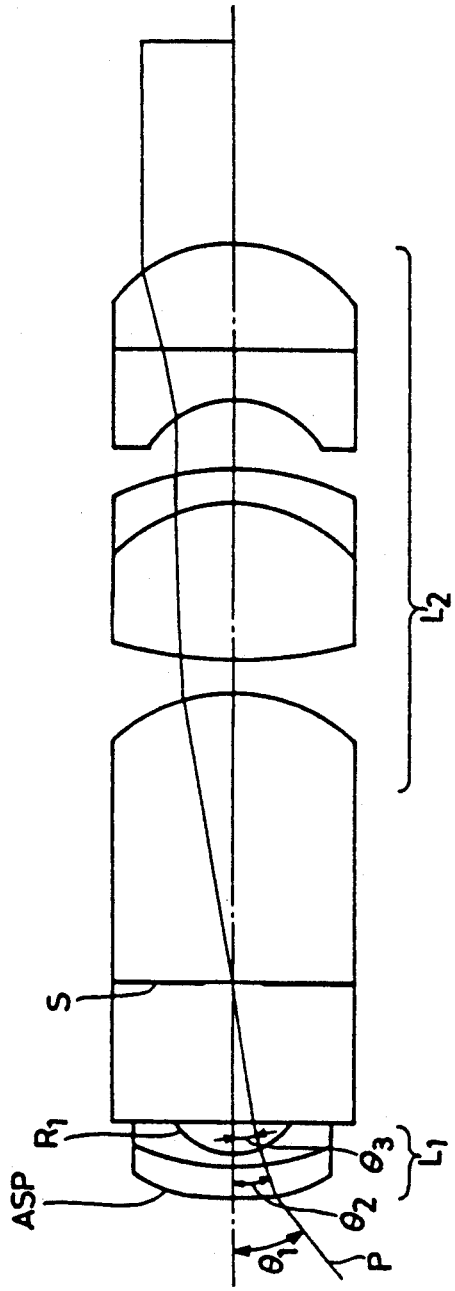
FIG. 13 shows a sectional view illustrating the fundamental composition of the objective lens system for endoscopes according to the present invention.
Figures 15A, 15B, 15C, 15D:
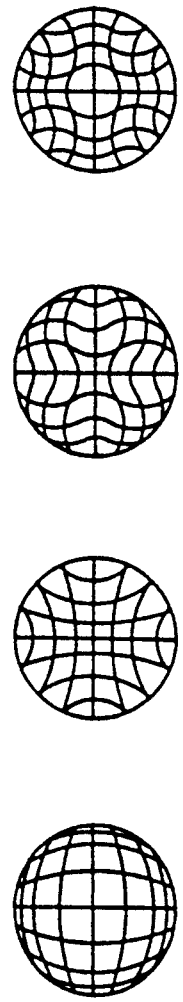
FIG. 15A, FIG. 15B, FIG. 15C and FIG. 15D show distortions corresponding respectively to the conditions of the principal ray refracted by the aspherical surfaces.
Figure 16:
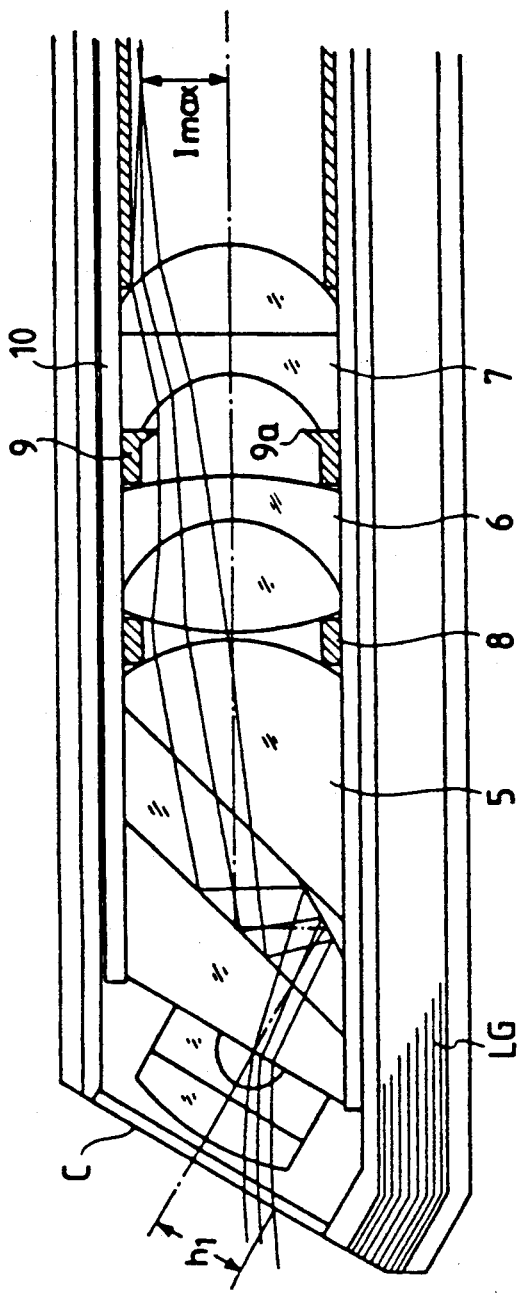
FIG. 16 shows a sectional view illustrating of a distal end of a non-flexible endoscope comprising the objective lens system according to the present invention.
Figure 17:
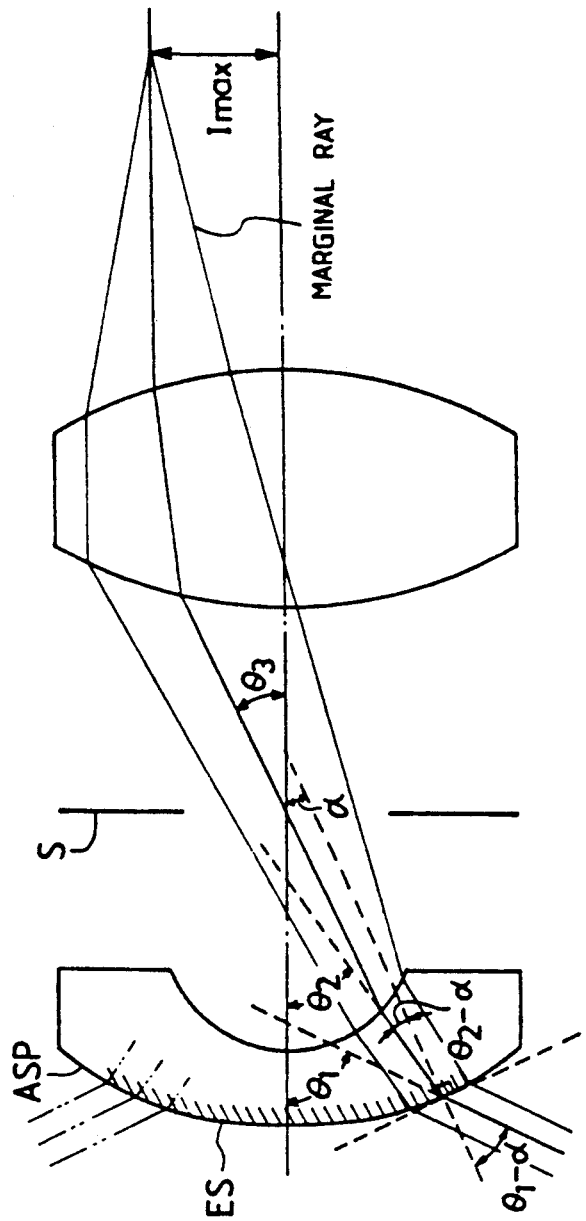
FIG. 17 shows a diagram illustrating relationship between an aspherical surface and travelling course of the principal ray in the objective lens system for endoscopes according to the present invention.

Furthermore, each of the Embodiments 22 through 32 comprises, between the first lens unit and the second lens unit, an airspace d satisfying the condition (10) and permits arranging such a prism for changing the field direction as shown in FIGS. 3, 20 or 21. In addition, an image may be transmitted for an optional relaying times by relay lens systems used in these Embodiments, and it is possible to obtain non-flexible endoscopes having required lengths by selecting numbers of relaying times.

As is understood from the foregoing description, the objective lens system for endoscopes according to the present invention has distortion corrected sufficiently favorably even at a wide field angle and can form images of high quality owing to little loss of light quantity at the marginal portion of the image. Further, the objective lens system for endoscopes according to the present invention permits arranging a field direction changing optical system therein and can be designed as an objective lens system usable for allowing observation in various directions.

What is claimed is:

1. An objective lens system for endoscopes comprising, in the recited order from the object side:
a first lens unit having negative refractive power and
a second lens unit having positive refractive power;
said lens units being arranged in such a manner that a principal ray passes substantially through a front focal point of said second lens unit for making the principal ray emerging from said objective lens system substantially parallel to an optical axis of the objective lens system;
said first lens unit including a negative lens component having a concave surface on the image side thereof, bearing a substantial portion of the negative refractive power of said first lens unit and satisfying the following condition (1), and said objective lens system comprising an aspherical surface satisfying the following condition (2) at 50% or more of the effective area determined depending on the maximum image height:

$$|R_1| \leq 3f \qquad (1)$$

$$\left| \frac{K_I - K_{0.5}}{K_{0.5}} \right| < |\cos \omega_1 - \cos \omega_{0.5}| \qquad (2)$$

wherein the reference symbol $R_1$ represents radius of curvature on said concave surface, the reference symbol f designating focal length of the objective lens system as a whole, the reference symbols $\omega_I$ and $\omega_{0.5}$ denote field angles at an image height of I and at ½ of the maximum image height respectively, and the reference symbols $K_I$ and $K_{0.5}$ represent values of K at the image height of I and at ½ of the maximum image height respectively when K is defined as $K = \sin\theta_2/\tan\theta_1$ (the reference symbol $\theta$ represents an angle formed between the optical axis and the principal ray incident from the object side on said aspherical surface located on the extreme object side, and the reference symbol $\theta$ designates an angle formed between the optical axis and the principal ray immediately after refraction by the aspherical surface located on the extreme image side).

2. An objective lens system for endoscopes according to claim 1 satisfying the following conditions (3), (4) and (5):

$$h_1/I_{max} \leq 2 \qquad (3)$$

$$f \leq f_2 \leq 10f \qquad (4)$$

$$|R_{min}| \leq 1.5f \qquad (5)$$

wherein the reference symbol $h_1$ represents height, on the extreme object side surface of said first lens unit, of the principal ray to attain to the maximum image height, the reference symbol $I_{max}$ designates the maximum height of image formed by said objective lens system, the reference symbol $R_{min}$ denotes the minimum radius of curvature on the concave surfaces including said image side aspherical surface on the first lens unit and the reference symbol $f_2$ represents focal length of said second lens unit.

3. An objective lens system for endoscopes according to claim 1 wherein said aspherical surface is located on the object side and said objective lens system is so designed as to satisfy the following condition (6):

$$0 \leq \tan\alpha \tan\omega_1 \qquad (6)$$

wherein the reference symbol $\alpha$ represents angle formed between the aspherical surface and a plane perpendicular to the optical axis at the intersection between the principal ray having the maximum image height and said aspherical surface, and the reference symbol $\omega_1$ designates field angle of the objective lens system.

4. An objective lens system for endoscopes according to claim 1, 2 or 3 wherein said aspherical surface is expressed by the following formula:

$$x = \frac{cy^2}{1 + \sqrt{1 - pc^2y^2}} + Ey^4 + Fy^6 + Gy^8 + Hy^{10} + \text{etc.}$$

wherein the reference symbols x and y represent values of coordinates when the intersection between the optical axis and said aspherical surface is taken as the origin, the optical axis is taken as the x axis, and the straight line passing through the origin and perpendicular to the optical axis is taken as the y axis, the reference symbol C designates an inverse number of the radius of curvature of the circle in contact with said aspherical surface on the optical axis, and the reference symbols E, F, G, . . . denote the aspherical surface coefficients of the fourth order, sixth order, eighth order, etc.

5. An objective lens system for endoscopes according to claim 4 wherein said aspherical surface is designed as a surface located on the image side and at least one of the aspherical surface coefficients of fourth and higher orders have a negative value.

6. An objective lens system for endoscopes according to claim 4 wherein said aspherical surface is designed as a surface located on the object side and at least one of the aspherical surface coefficients of fourth and higher orders have a positive value.

7. An objective lens system for endoscopes according to claim 1 satisfying the following condition (10):

$$2 \leq d/I_{max} \leq 8 \tag{10}$$

wherein the reference symbol d represents distance as measured from the surface located on the extremely image side out of the surfaces having refractive powers in said first lens unit to the surface located on the extremely object side out of the surfaces having refractive powers in said second lens unit, and the reference symbol $I_{max}$ designates the maximum image height.

8. An objective lens system for endoscopes according to claim 1, 2, or 3 wherein said second lens unit comprises a surface concave on the object side, and optical path length $z_1$ as measured along the optical axis between said surface concave on the image side in said first lens unit and the extreme object side surface having positive refractive power in the second lens unit satisfies the following condition (7):

$$z_1/f \leq 1 \tag{7}$$

9. An objective lens system for endoscopes according to claim 8 further satisfying the following condition (8):

$$z_2/z_1 \leq 0.8 \tag{8}$$

wherein the reference symbol $z_2$ represents optical path length as measured between the surface located on the extremely image side out of the surfaces having negative refractive powers in the first lens unit and the front focal point of the second lens unit.

10. An objective lens system for endoscopes according to claim 9 further satisfying the following condition (9):

$$|f_2/f_1| \leq 8 \tag{9}$$

wherein the reference symbol $f_1$ and $f_2$ represent focal lengths of the first lens unit and the second lens unit respectively.

11. An objective lens system for endoscopes according to claim 1 wherein a field direction changing optical system having reflecting surface for changing the optical axis of the first lens unit toward the optical axis of the second lens unit is arranged between the first lens unit and the second lens unit.

12. An objective lens system for endoscopes according to claim 11 wherein said field direction changing optical system is composed of a prism having said reflecting surface, and shape and size of the sectional surface of said prism perpendicular to the optical axis are nearly equal to those of the second lens unit.

13. An objective lens system for endoscopes according to claim 12 satisfying the following condition:

$$1.2 < T/D < 4$$

wherein the reference symbol T represents distance as measured along the optical axis from the object side surface of said field direction changing prism to the extremely image side surface of the lens component arranged on the object side in the second lens unit, and the reference symbol D designates diameter of said field direction changing prism.

14. An objective lens system for endoscopes according to claim 1 wherein a cover glass made of sapphire is arranged on the object side of said first lens unit.

15. An objective lens system for endoscopes according to claim 14 wherein said cover glass has a shape of a wedge.

16. An objective lens system for endoscopes according to claim 1 comprising a solid-state image pickup device arranged in such a manner that the light-receiving surface thereof is located at the position of an image to be formed by said objective lens system.

17. An objective lens system for endoscopes according to claim 4 wherein said second lens unit comprises a surface concave on the object side, and optical path length $z_1$ as measured along the optical axis between said surface concave on the image side in said first lens unit and the extreme object side surface having positive refractive power in the second lens unit satisfies the following condition (7):

$$z_1/f \geq 1 \tag{7).}$$

18. An objective lens system for endoscopes according to claim 5 wherein said second lens unit comprises a surface concave on the object side, and optical path length $z_1$ as measured along the optical axis between said surface concave on the image side in said first lens unit and the extreme object side surface having positive refractive power in the second lens unit satisfies the following condition (7):

$$z_1/f \geq 1 \tag{7).}$$

* * * * *